United States Patent
Miyahiro et al.

(10) Patent No.: US 9,556,302 B2
(45) Date of Patent: Jan. 31, 2017

(54) GRAFT COPOLYMER, THERMOPLASTIC RESIN COMPOSITION, MOLDED ARTICLE, AND METHOD FOR PRODUCING GRAFT COPOLYMER

(75) Inventors: Takumi Miyahiro, Niihama (JP); Masanori Ito, Niihama (JP); Seiji Tamai, Niihama (JP); Fumitoshi Takeda, Niihama (JP); Kazunori Takahashi, Niihama (JP); Tomoyoshi Akiyama, Niihama (JP); Hajime Tomita, Takaishi (JP); Haruki Okuno, Takaishi (JP); Shunsaku Kubota, Takaishi (JP); Masaaki Okada, Takaishi (JP); Atsushi Hashimoto, Takaishi (JP); Yoshiaki Takada, Takaishi (JP); Nobuyuki Nakashima, Takaishi (JP); Jiichiro Yoshida, Takaishi (JP); Takayoshi Fujiwara, Takaishi (JP); Shouta Kosaka, Takaishi (JP)

(73) Assignee: NIPPON A&L INC., Osaka-shi (JP)

( * ) Notice: Subject to any disclaimer, the term of this patent is extended or adjusted under 35 U.S.C. 154(b) by 435 days.

(21) Appl. No.: 14/232,116

(22) PCT Filed: Jul. 11, 2012

(86) PCT No.: PCT/JP2012/067636
§ 371 (c)(1),
(2), (4) Date: Jan. 10, 2014

(87) PCT Pub. No.: WO2013/008829
PCT Pub. Date: Jan. 17, 2013

(65) Prior Publication Data
US 2014/0147660 A1 May 29, 2014

(30) Foreign Application Priority Data

Jul. 12, 2011 (JP) ................ 2011-168747
Dec. 27, 2011 (JP) ................ 2011-286162
Dec. 27, 2011 (JP) ................ 2011-286505
Mar. 2, 2012 (JP) ................ 2012-047113
Mar. 5, 2012 (JP) ................ 2012-047492
Mar. 30, 2012 (JP) ................ 2012-078815
Mar. 30, 2012 (JP) ................ 2012-078816
May 25, 2012 (JP) ................ 2012-119571

(51) Int. Cl.
*C08L 69/00* (2006.01)
*C08L 77/00* (2006.01)
*C08L 25/12* (2006.01)
*C08F 212/08* (2006.01)
*C08F 285/00* (2006.01)
*C08L 51/04* (2006.01)
*C08F 265/04* (2006.01)
*C08F 297/02* (2006.01)

(52) U.S. Cl.
CPC .......... *C08F 285/00* (2013.01); *C08F 265/04* (2013.01); *C08F 297/02* (2013.01); *C08L 25/12* (2013.01); *C08L 51/04* (2013.01); *C08L 69/00* (2013.01); *C08L 77/00* (2013.01); *Y10T 428/254* (2015.01)

(58) Field of Classification Search
CPC ......... C08L 77/00; C08L 25/12; C08L 51/003; Y10T 428/254; C08F 212/08
See application file for complete search history.

(56) References Cited

U.S. PATENT DOCUMENTS 5,180,786 A   1/1993   Era et al.
5,373,060 A   12/1994  Guentherberg et al.

FOREIGN PATENT DOCUMENTS

| | | | |
|---|---|---|---|
| JP | 59-18716 A | | 1/1984 |
| JP | 63-304042 A | | 12/1988 |
| JP | 3-174420 A | | 7/1991 |
| JP | 4-339850 A | | 11/1992 |
| JP | 6-57063 A | | 3/1994 |
| JP | 07-316243 | * | 5/1994 |
| JP | 6-157688 A | | 6/1994 |
| JP | 6-298878 A | | 10/1994 |
| JP | 7-316243 A | | 12/1995 |
| JP | 8-41143 A | | 2/1996 |
| JP | 08-073701 | * | 3/1996 |
| JP | 8-73701 A | | 3/1996 |
| JP | 8-92465 A | | 4/1996 |
| JP | 10-77383 A | | 3/1998 |
| JP | 10-231416 A | | 9/1998 |
| JP | 11-335512 A | | 12/1999 |
| JP | 2000-212385 A | | 8/2000 |
| JP | 2001-98133 A | | 4/2001 |
| JP | 2001-220487 A | | 8/2001 |
| JP | 2001-261756 A | | 9/2001 |
| JP | 2002-80684 A | | 3/2002 |
| JP | 2002-338777 A | | 11/2002 |
| JP | 2006-241283 A | | 9/2006 |

OTHER PUBLICATIONS

International Search Report issued in PCT/JP2012/067636, dated Sep. 25, 2012.

* cited by examiner

*Primary Examiner* — Charles Boyer
(74) *Attorney, Agent, or Firm* — Birch, Stewart, Kolasch & Birch, LLP

(57) ABSTRACT

Provided is a thermoplastic resin composition having excellent weather resistance, impact resistance, and fluidity and also excellent color developing properties and residence heat stability. A graft copolymer (A) prepared by graft polymerization of a certain amount of a specific monomer (a2) onto a certain amount of composite rubber (a1) composed of a conjugated diene rubber polymer and a cross-linked acrylic ester polymer. The tetrahydrofuran-soluble portion of the composite rubber (a1) has a weight-average molecular weight of 50000 or more in terms of polystyrene and a degree of swelling in toluene of 7.0 or more, or in the composite rubber contained in the graft copolymer, the number of particles having an equivalent-circle diameter of 150 nm or less is 50% or less of the total number of the composite rubber particles.

21 Claims, 1 Drawing Sheet

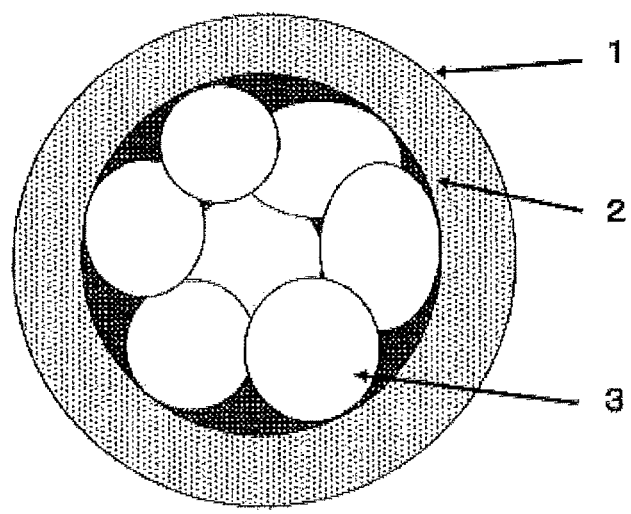

GRAFT COPOLYMER, THERMOPLASTIC RESIN COMPOSITION, MOLDED ARTICLE, AND METHOD FOR PRODUCING GRAFT COPOLYMER

TECHNICAL FIELD

The present invention relates to a graft copolymer used in thermoplastic resin compositions having excellent weather resistance, impact resistance (shock resistance), and fluidity and also having excellent color developing properties and relates to a thermoplastic resin composition prepared from the graft copolymer.

The present invention also relates to a graft copolymer used in thermoplastic resin compositions having excellent weather resistance, impact resistance, and fluidity and also having excellent residence heat stability and relates to a thermoplastic resin composition prepared from the graft copolymer.

The present invention further relates to a graft copolymer used in thermoplastic resin compositions having excellent weather resistance and impact resistance and also having excellent color developing properties and relates to a thermoplastic resin composition prepared from the graft copolymer.

The present invention also relates to a thermoplastic resin composition containing a polycarbonate resin and a graft copolymer comprising a composite rubber having a specific structure and having an excellent balance between physical properties, such as impact resistance, fluidity, and heat resistance (thermal stability), and weather (light) resistance and also having excellent residence heat stability and surface appearance and relates to a molded article produced from the thermoplastic resin composition.

The present invention also relates to a thermoplastic resin composition containing a polyamide resin, a graft copolymer comprising a composite rubber having a specific structure, and an unsaturated carboxylic-modified copolymer and having an excellent balance between physical properties, such as impact resistance, fluidity, and heat resistance, and also having excellent weather resistance and chemical resistance and relates to a molded article produced from the thermoplastic resin composition.

The present invention also relates to a flame-retardant thermoplastic resin composition having excellent flame retardance and also having excellent weather resistance, impact resistance, fluidity, and color developing properties and relates to a molded article produced from the flame-retardant thermoplastic resin composition.

The present invention also relates to a thermoplastic resin composition, for extrusion molding, having excellent elongation, weather resistance, and tensile strength and also having excellent molding workability and relates to an extruded article produced from the thermoplastic resin composition for extrusion molding.

The present invention also relates to a thermoplastic resin composition, used in lighting equipments, having excellent impact resistance, fluidity, and weather resistance and also having excellent tapping strength and deposition appearance.

The present invention also relates to a thermoplastic resin composition having excellent weather resistance, impact resistance, and fluidity and also having excellent color developing properties and gloss.

The present invention also relates to a method for producing such a graft copolymer.

BACKGROUND ART

ABS resins show excellent balance between impact resistance and workability and have been widely used in various fields, e.g., interior and exterior components for vehicles such as automobiles, housings of various home electric appliances and OA equipment, and fields of other miscellaneous goods. The ABS resins are applied not only to injection molding but also to extrusion molding, such as sheet extrusion. The ABS resins, however, have a disadvantage, poor weather resistance, because the butadiene rubber polymer contained as the rubber component can be readily decomposed by, for example, ultraviolet rays. In order to solve such a disadvantage, ASA resins containing an acrylic rubber, which have improved weather resistance, have been used in practice. The ASA resins have excellent weather resistance, but have disadvantages, i.e., low impact resistance, color developing properties, elongation, and tensile strength.

Patent Literature 1 discloses a thermoplastic resin composition that comprises a composite rubber composed of a diene rubber having a specific molecular weight and an acrylic ester polymer and that has improved impact resistance, weather resistance, and molding workability. Unfortunately, the thermoplastic resin composition has disadvantages, i.e., insufficient color developing properties, gloss, and residence heat stability.

Patent Literature 2 discloses a thermoplastic resin composition that comprises a maleimide copolymer and a graft copolymer comprising a composite rubber composed of a conjugated diene rubber polymer and an acrylic ester rubber polymer and that has improved heat resistance, weather resistance, molding workability, and also surface appearance of a molded article. Unfortunately, the thermoplastic resin composition has disadvantages, i.e., insufficient color developing properties, gloss, and residence heat stability.

A composition composed of a polycarbonate resin and an ABS resin (hereinafter may be referred to as PC/ABS resin) has excellent impact resistance, heat resistance, and molding workability and therefore has various uses such as vehicle parts, household appliances, and business machine parts. Since the ABS resin, which contains butadiene rubber segments, is inferior in weather resistance, an AES resin containing an ethylene-propylene-unconjugated diene rubber in place of the diene in the main chain and a composition composed of an ASA resin containing an acrylic rubber and a polycarbonate resin (hereinafter may be referred to as PC/ASA resin) have also been disclosed. For example, Patent Literature 3 discloses a thermoplastic resin composition comprising an ASA resin containing an acrylic rubber having a specific structure and a polycarbonate resin.

Patent Literature 4 discloses a thermoplastic resin composition that comprises an ASA resin containing a siloxane rubber having a specific structure and an acrylic rubber, a polycarbonate resin, and a hard copolymer and that has improved molding workability, weather resistance, and molding appearance and also has improved low temperature impact resistance. Unfortunately, the thermoplastic resin composition has insufficient improvements in the balance between impact resistance (in particular, low temperature impact resistance) and molding workability (fluidity), the defects on appearance such as a pearl-like surface of the molded article, and gloss unevenness. Deterioration of residence heat stability is not mentioned at all.

A resin composition composed of a polyamide resin and an ABS resin (hereinafter may be referred to as PA/ABS resin) has excellent impact resistance, heat resistance, and molding workability and thus has various uses such as interior and exterior components for vehicles, household appliances, and business machine parts. Since the ABS resin, which comprises a butadiene rubber, is inferior in weather resistance, the composition has a disadvantage of significant weathering discoloration. For example, Patent Literature 5 discloses a thermoplastic resin composition composed of a polyamide resin and an imidized ABS resin for an automobile wheel cover. In spite of a composition for an automobile wheel cover, no description is found on any test under rainy conditions and its chemical resistance.

Patent Literature 6 discloses a resin composition composed of an ASA resin including an acrylic rubber not containing a diene polymer in the main chain and a polyamide resin (hereinafter may be referred to as PA/ASA resin). Unfortunately, the molding workability (fluidity) and the balance between impact resistance (in particular, low temperature impact resistance) and weather resistance are still insufficient, and its chemical resistance is not described at all.

Furthermore, the ABS resin is inflammable, and a demand for flame retardation is increasing in light of safety. Accordingly, various flame-retarding technologies have been disclosed. Patent Literature 7 discloses a flame-retardant thermoplastic resin composition that comprises a rubber-reinforced styrene resin, an organic phosphorus compound, and a composite rubber graft copolymer and that has improved flame retardance, impact resistance, light resistance, and molding workability. Unfortunately, the composition has insufficient color developing properties.

In sheet molding or film molding by extrusion molding, as the thickness of the film is reduced, the product is required to have high tear resistance and high strength, i.e., the extruded article is required to have high elongation and high tensile strength. Patent Literature 8 discloses a composite rubber composition for sheet extrusion having excellent weather resistance and appearance. Unfortunately, the composition has insufficient elongation and tensile strength.

CITATION LIST

Patent Literature

[Patent Literature 1] Japanese Patent. Laid-Open No. Hei 10-77383
[Patent Literature 2] Japanese Patent Laid-Open No. Hei 8-73701
[Patent Literature 3] Japanese Patent Laid-Open No. Hei 10-231416
[Patent Literature 4] Japanese Patent Laid-Open No. Hei 11-335512
[Patent Literature 5] Japanese Patent Laid-Open No. Hei 6-57063
[Patent Literature 6] Japanese Patent Laid-Open No. Hei 8-92465
[Patent Literature 7] Japanese Patent Laid-Open No. 2000-212385
[Patent Literature 8] Japanese Patent Laid-Open No. 2002-338777

SUMMARY OF INVENTION

Technical Problem

It is an object of the present invention to provide a graft copolymer used in a thermoplastic resin composition having excellent weather resistance, impact resistance, and fluidity and also having excellent color developing properties and to provide a thermoplastic resin composition prepared from the graft copolymer.

It is another object of the present invention to provide a graft copolymer used in a thermoplastic resin composition having excellent weather resistance, impact resistance, and fluidity and also having excellent residence heat stability and to provide a thermoplastic resin composition prepared from the graft copolymer.

It is another object of the present invention to provide a graft copolymer used in a thermoplastic resin composition having excellent weather resistance and impact resistance and also having excellent color developing properties and to provide a thermoplastic resin composition prepared from the graft copolymer.

It is another object of the present invention to provide a thermoplastic resin composition having an excellent balance between physical properties, such as impact resistance, fluidity, and heat resistance, and weather (light) resistance and also having excellent residence heat stability and surface appearance and to provide a molded article produced from the thermoplastic resin composition.

It is another object of the present invention to provide a thermoplastic resin composition having an excellent balance between physical properties, such as impact resistance, fluidity, and heat resistance and also having excellent weather resistance and chemical resistance and to provide a molded article produced from the thermoplastic resin composition.

It is another object of the present invention to provide a flame-retardant thermoplastic resin composition having excellent flame retardance and also having excellent weather resistance, impact resistance, fluidity, and color developing properties and to provide a molded article produced from the flame-retardant thermoplastic resin composition.

It is another object of the present invention to provide a thermoplastic resin composition, for extrusion molding, having excellent elongation, weather resistance, and tensile strength and also having excellent molding workability and to provide an extruded article produced from the thermoplastic resin composition for extrusion molding.

It is another object of the present invention to provide a thermoplastic resin composition, for a lighting equipment, having excellent impact resistance, fluidity, and weather resistance and also having excellent tapping strength and deposition appearance and to provide a molded article produced from the thermoplastic resin composition for a lighting equipment.

It is another object of the present invention to provide a thermoplastic resin composition having excellent weather resistance, impact resistance, and fluidity and also having excellent color developing properties and gloss.

It is another object of the present invention to provide a graft copolymer used in such a thermoplastic resin composition.

Solution to Problem

The present inventors, who have diligently studied to solve the problems in conventional technologies, have found that the objects can be achieved with a graft copolymer prepared by polymerization of a monomer mixture of, for example, a vinyl cyanide monomer or an aromatic vinyl monomer with a composite rubber having a specific polymer structure or rubber morphology, and have arrived at the present invention.

The present inventors have also found that the objects can be achieved with two different copolymers having specific structures, and have arrived at the present invention.

A first aspect of the present invention provides:

a graft copolymer, wherein the graft copolymer is a graft copolymer (A) prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 300 parts by weight), wherein the composite rubber (a1) has a tetrahydrofuran-soluble portion having a weight-average molecular weight of 50000 or more in terms of polystyrene and has a degree of swelling in toluene of 7.0 or more A second aspect of the present invention provides:

a graft copolymer, wherein the graft copolymer is a graft copolymer (A) prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 100 parts by weight), wherein in the composite rubber contained in the graft copolymer, the number of particles having an equivalent-circle diameter of 150 nm or less is 50% or less of the total number of the composite rubber particles.

A third aspect of the present invention provides:

a graft copolymer, wherein the graft copolymer is a graft copolymer (A) prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 100 parts by weight), wherein the composite rubber (a1) has a multilayer structure comprising an inner layer and an outer layer;

the inner layer is mainly composed of the conjugated diene rubber polymer or a mixture of the conjugated diene rubber polymer and the cross-linked acrylic ester polymer and contains two or more particles of particles of the conjugated diene rubber polymer having a weight-average particle diameter of 50 to 300 nm; and the outer layer is mainly composed of the cross-linked acrylic ester polymer and has an average thickness of 5 to 100 nm.

In the graft copolymers according to the first to third aspects of the present invention, the conjugated diene rubber polymer preferably has a weight-average particle diameter of 150 to 800 nm by agglomeration (aggregation) of a conjugated diene rubber polymer having a weight-average particle diameter of 50 to 300 nm.

A fourth aspect of the present invention provides:

a thermoplastic resin composition comprising:

the graft copolymer (A) according to any one of the first to third aspects of the present invention; and a copolymer (B) if, at least, an aromatic vinyl monomer and a vinyl cyanide monomer.

A fifth aspect of the present invention provides:

a thermoplastic resin composition comprising:

10 to 90 parts by weight of the graft copolymer (A) according to any one of the first to third aspects of the present invention;

0 to 50 parts by weight of a copolymer (B) of, at least, an aromatic vinyl monomer and a vinyl cyanide monomer; and 10 to 90 parts by weight of a polycarbonate resin (C) (provided that the total amount of the graft copolymer (A), the copolymer (B), and the polycarbonate resin (C) is 100 parts by weight).

The thermoplastic resin composition according to the fifth aspect of the present invention is preferably composed of 15 to 70 parts by weight of the graft copolymer (A), 0 to 40 parts by weight of the copolymer (B), and 30 to 80 parts by weight of the polycarbonate resin (C) (provided that the total amount of the graft copolymer (A), the copolymer (B), and the polycarbonate resin (C) is 100 parts by weight).

A sixth aspect of the present invention provides:

a molded article produced from the thermoplastic resin composition according to the fifth aspect of the present invention.

A seventh aspect of the present invention provides:

a thermoplastic resin composition according to the fourth aspect of the present invention further comprising:

a polyamide resin (D); wherein the copolymer (B) includes an unsaturated carboxylic-modified copolymer (E) of, at least, an unsaturated carboxylic acid monomer, in addition to the aromatic vinyl monomer and the vinyl cyanide monomer, wherein the amount of the graft copolymer (A) is 20 to 79 parts by weight, the amount of the copolymer (B) excluding the unsaturated carboxylic-modified copolymer (E) is 0 to 50 parts by weight, the amount of the unsaturated carboxylic-modified copolymer (E) is 1 to 40 parts by weight, and the amount of the polyamide resin (D) is 20 to 79 parts by weight, provided that the total amount of the graft copolymer (A), the copolymer (B), and the polyamide resin (0) is 100 parts by weight.

An eighth aspect of the present invention provides:

a molded article produced from the thermoplastic resin composition according to the seventh aspect of the present invention.

A ninth aspect of the present invention provides:

a flame-retardant thermoplastic resin composition comprising:

100 parts by weight of the thermoplastic resin composition according to the fourth aspect of the present invention, and 1 to 40 parts by weight of a flame retardant (F).

A tenth aspect of the present invention provides:

a molded article produced from the flame-retardant thermoplastic resin composition according to the ninth aspect of the present invention.

An eleventh aspect of the present invention provides:
the thermoplastic resin composition for extrusion molding according to the fourth aspect of the present invention, wherein
the amount of the graft copolymer (A) is 20 to 70 parts by weight, and
the amount of the copolymer (B) is 30 to 80 parts by weight,
provided that the total amount of the graft copolymer (A) and the copolymer (B) is 100 parts by weight.
In the thermoplastic resin composition for extrusion molding according to the eleventh aspect of the present invention,
the copolymer (B) preferably has a die swell ratio of 1.3 to 1.7 measured at 200° C. and a shear velocity of 100 (1/sec).

A twelfth aspect of the present invention provides:
an extruded article produced by extrusion molding of the thermoplastic resin composition for extrusion molding according to the eleventh aspect of the present invention.

A thirteenth aspect of the present invention provides:
the thermoplastic resin composition, for a lighting equipment (lighting fixture), according to the fourth aspect of the present invention, wherein
the amount of the graft copolymer (A) is 20 to 70 parts by weight, and
the amount of the copolymer (B) is 30 to 80 parts by weight,
provided that the total amount of the graft copolymer (A) and the copolymer (B) is 100 parts by weight.

A fourteenth aspect of the present invention provides:
a molded article produced from the thermoplastic resin composition for a lighting equipment according to the thirteenth aspect of the present invention.

A fifteenth aspect of the present invention provides:
a thermoplastic resin composition comprising:
the graft copolymer (A) according to any one of the first to third aspects of the present invention; and
a graft copolymer (G) prepared by graft polymerization of 20 to 90 parts by weight of at least one monomer (g2) selected from aromatic vinyl monomers, vinyl cyanide monomers, and other vinyl monomers copolymerizable with these monomers onto 10 to 80 parts by weight of an acrylic ester rubber polymer (g1) having a weight-average particle diameter of 70 to 200 nm (provided that the total amount of the acrylic ester rubber polymer (g1) and the monomer (g2) is 100 parts by weight), wherein
the amount of the graft copolymer (A) is 20 to 80 parts by weight, and
the amount of the graft copolymer (G) is 20 to 80 parts by weight,
provided that the total amount of the graft copolymer (A) and the graft copolymer (G) is 100 parts by weight.

In the thermoplastic resin composition according to the fifteenth aspect of the present invention, the composite rubber of the graft copolymer (A) preferably has a weight-average particle diameter of 200 to 600 nm.

The thermoplastic resin composition according to the fifteenth aspect of the present invention preferably further comprises a copolymer (B) of, at least, an aromatic vinyl monomer and a vinyl cyanide monomer.

A sixteenth aspect of the present invention provides:
a method for producing the graft copolymer (A) according to the first or second aspect of the present invention, the method comprising:
retaining a composition containing 0 to 0.15 parts by weight of an emulsifier, 5 to 50 parts by weight of a conjugated diene rubber polymer, and 5 to 33 parts by weight of an acrylic ester monomer for 0.5 to 2.0 hours (provided that the total amount of the conjugated diene rubber polymer and the acrylic ester monomer used for producing the composite rubber (a1) is 100 parts by weight); and
successively adding 0.03 to 0.18 parts by weight of a polymerization initiator, 0.2 to 1.5 parts by weight of an emulsifier, and 17 to 90 parts by weight of an acrylic ester monomer to the retained composition in the range of temperature from 35° C. to 60° C. over 1 to 6 hours (provided that the total amount of the conjugated diene rubber polymer and the acrylic ester monomer used for producing the composite rubber (a1) is 100 parts by weight).

Advantageous Effects of Invention

The first and fourth aspects of the present invention can provide a graft copolymer to be used in a thermoplastic resin composition having excellent weather resistance, impact resistance, and fluidity and also having excellent color developing properties and provide a thermoplastic resin composition prepared from the graft copolymer.

The second and fourth aspects of the present invention can provide a graft copolymer to be used in a thermoplastic resin composition having excellent weather resistance, impact resistance, and fluidity and also having excellent residence heat stability and provide a thermoplastic resin composition prepared from the graft copolymer.

The third and fourth aspects of the present invention can provide a graft copolymer to be used in a thermoplastic resin composition having excellent weather resistance, impact resistance and also having excellent color developing properties and provide a thermoplastic resin composition prepared from the graft copolymer.

The fifth and sixth aspects of the present invention can provide a thermoplastic resin composition having an excellent balance between physical properties, such as impact resistance, fluidity, and heat resistance, and weather (light) resistance and also having excellent residence heat stability and surface appearance and provide a molded article produced from the thermoplastic resin.

The seventh and eighth aspects of the present invention can provide a thermoplastic resin composition having an excellent balance between physical properties, such as impact resistance, fluidity, heat resistance and also having excellent weather resistance and chemical resistance and provide a molded article produced from the thermoplastic resin.

The ninth and tenth aspects of the present invention can provide a flame-retardant thermoplastic resin composition having excellent flame retardance and also having excellent weather resistance, impact resistance, fluidity, and color developing properties and provide a molded article produced from the flame-retardant thermoplastic resin composition.

The eleventh and twelfth aspects of the present invention can provide a thermoplastic resin composition, for extrusion molding, having excellent elongation, weather resistance, and tensile strength and also having excellent molding workability and provide an extruded article produced from the thermoplastic resin composition for extrusion molding.

The thirteenth and fourteenth aspects of the present invention can provide a thermoplastic resin composition, for a lighting equipment, having excellent impact resistance, fluidity, and weather resistance and also having excellent tapping strength and deposition appearance and provide a molded article produced from the thermoplastic resin composition for a lighting equipment.

The fifteenth aspect of the present invention can provide a thermoplastic resin composition having excellent weather resistance, impact resistance, and fluidity and also having excellent color developing properties and gloss.

The sixteenth aspect of the present invention can provide a graft copolymer (A) for preparing the thermoplastic resin composition of the present invention.

BRIEF DESCRIPTION OF DRAWING

FIG. 1 is an image of an electromicroscopic photograph of the composite rubber (a-1) of the graft copolymer (A) according to the third aspect of the present invention.

DESCRIPTION OF EMBODIMENTS

The present invention will now be described in detail.
1. Graft Copolymer (A)

The graft copolymer (A) can be prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 100 parts by weight).

The graft copolymer (A) may comprise two or more copolymers prepared by the graft polymerization as above.

A graft copolymer (A) prepared by using less than 10 parts by weight of the composite rubber (a1) is inferior in impact resistance, fluidity, and elongation, whereas a graft copolymer (A) containing larger than 80 parts by weight of the composite rubber (a1) is inferior in impact resistance, fluidity, color developing properties, and tensile strength. The content of the composite rubber (a1) in the graft copolymer (A) is preferably 30 to 70 parts by weight and more preferably 40 to 60 parts by weight.

The graft copolymer (A) may be produced by any polymerization procedure without particular limitation and can be produced by, for example, emulsion polymerization, suspension polymerization, or block polymerization. In the emulsion polymerization, a latex of the graft copolymer (A) can be prepared by graft polymerization of one of monomers mentioned above onto the composite rubber (a1). The latex of the graft copolymer (A) is coagulated by a known method and washed, dehydrated, and dried into a powdered graft copolymer (A). Copolymers prepared by these polymerization processes may be used in combination, or copolymers prepared by different polymerization methods and/or having different compositions may be used in combination.

The graft copolymer (A) may have any graft rate (determined from the amounts of the acetone-soluble and acetone-insoluble portions of the graft copolymer and the weight of the composite rubber in the graft copolymer), and the acetone-soluble portion may have any reduced viscosity (measured with a 0.4 g sample in 100 cc of N,N-dimethylformamide at 30° C.) without particular limitation, and a graft copolymer (A) having an appropriate structure depending on the required performance can be used. From the viewpoint of the balance between physical properties, the graft rate is preferably 5% to 150% and more preferably 10% to 130%, and the reduced viscosity is preferably 0.2 to 2.0 dl/g. The reduced viscosity can be appropriately adjusted by controlling the polymerization temperature, the way to add the monomer, the type of an initiator to be used, and the type and amount of the chain transfer agent such as t-dodecyl mercaptan.

1-1. Composite Rubber (a1)

The composite rubber (a1) comprises 5% to 50% by weight of a conjugated diene rubber polymer and 50% to 95% by weight of a cross-linked acrylic ester polymer, as described above.

Conjugated Diene Rubber Polymer

Examples of the conjugated diene rubber polymer used in the composite rubber (a1) include polybutadiene rubbers, styrene-butadiene rubbers (SBRs), styrene-butadiene-styrene (SBS) block copolymers, styrene-(ethylene-butadiene)-styrene (SEBS) block copolymers, acrylonitrile-butadiene rubbers (NBRs), and methyl methacrylate-butadiene rubbers. In particular, polybutadiene rubbers and styrene-butadiene rubbers are preferred.

The conjugated diene rubber polymer may have any weight-average particle diameter and is preferably in the range of 0.1 to 1.0 μm, more preferably 0.15 to 0.5 μm, and most preferably 0.2 to 0.4 μm from the viewpoint of the balance between physical properties. The weight-average particle diameter of the conjugated diene rubber polymer can be adjusted by a known method. A conjugated diene rubber polymer having a relatively small particle diameter produced in advance may be agglomerated (aggregated) so as to have an intended weight-average particle diameter.

The agglomerated conjugated diene rubber polymer preferably has a weight-average particle diameter of 150 to 800 nm and more preferably 200 to 600 nm. Such an agglomerated conjugated diene rubber polymer can be prepared by, for example, agglomerating a conjugated diene rubber polymer having a weight-average particle diameter of 50 to 300 nm.

Cross-Linked Acrylic Ester Polymer

The cross-linked acrylic ester polymer used in the composite rubber (a1) is prepared by polymerization of one or more acrylic ester monomers having $C_{1-16}$ alkyl groups (alkyl moiety having 1 to 16 carbon atoms), such as methyl acrylate, ethyl acrylate, butyl acrylate, or 2-ethylhexyl acrylate, and optionally one or more other copolymerizable monomers, such as styrene, acrylonitrile, or methyl methacrylate, in the presence of a cross-linking agent.

Examples of the cross-linking agent used for the cross-linked acrylic ester polymer include divinylbenzene, allyl (meth)acrylate, ethylene glycol di(meth)acrylate, diallyl phthalate, dicyclopentadiene di(meth)acrylate, trimethylolpropane tri(meth)acrylate, pentaerythritol hexa(meth)acrylate, 1,4-butanediol di(meth)acrylate, 1,6-hexanediol di(meth)acrylate, triallyl cyanurate, and triallyl isocyanurate.

Usage

With the proportion of the conjugated diene rubber polymer and the cross-linked acrylic ester polymer in the composite rubber (a1), the amount of the conjugated diene rubber polymer is 5% to 50% by weight and the amount of the cross-linked acrylic ester polymer is 50% to 95% by weight. From the viewpoint of the balance between physical properties, the amount of the conjugated diene rubber polymer is preferably 7% to 40% by weight and more preferably 10% to 30% by weight. Similarly, from the viewpoint of the balance between physical properties, the amount of the cross-linked acrylic ester polymer is preferably 60% to 93% by weight and more preferably 70% to 90% by weight.

Each Physical Property

From the viewpoints of the impact resistance, color developing properties, weather resistance, tensile strength, elongation, and light resistance of the resulting thermoplastic resin composition, the tetrahydrofuran-soluble portion of the composite rubber (a1) preferably has a weight-average molecular weight of 50000 or more, more preferably 55000 to 100000, and most preferably 63000 to 80000, in terms of polystyrene.

From the viewpoints of the impact resistance, color developing properties, weather resistance, tensile strength, elongation, and light resistance of the resulting thermoplastic resin composition, the composite rubber (a1) preferably has a degree of swelling in toluene of 7.0 or more, more preferably 7.5 to 13.0, and most preferably 8.5 to 11.0.

The weight-average molecular weight in terms of polystyrene of the tetrahydrofuran-soluble portion of the composite rubber (a1) and the degree of swelling in toluene of the composite rubber (a1) may be adjusted by any method and can be adjusted by, for example, modifying the type and the amount of the polymerization initiator, polymerization temperature, and the type and amount of the chain transfer agent.

From the viewpoint of the residence heat stability of the resulting thermoplastic resin composition, in the graft copolymer, the composite rubber having an equivalent-circle diameter of 150 nm or less is preferably 50% or less, more preferably 40% or less, and most preferably 20% or less, of the total number of composite rubber particles.

In the composite rubber (a1), not all of the cross-linked acrylic ester polymer is polymerized to a conjugated diene rubber polymer, and a part of the cross-linked acrylic ester polymer may be present as a single type of particles. Hereinafter, the term "composite rubber (a1)" refers to not only a composite rubber having a core-shell structure formed by a conjugated diene rubber polymer and a cross-linked acrylic ester polymer but also a composite rubber containing a cross-linked acrylic ester polymer of a single type of particles.

In the composite rubber (a1), the composite rubber particles having an equivalent-circle diameter of 150 nm or less are mainly a single type of particles of the cross-linked acrylic ester polymer, and the single type of particles are a main cause of adversely affecting the residence heat stability of the graft copolymer. Accordingly, in order to reduce the number of particles having an equivalent-circle diameter of 150 nm or less, the production of the composite rubber is required not to generate a single type of particles of the cross-linked acrylic ester polymer as much as possible.

In addition, a composite rubber having an equivalent-circle diameter of 150 nm or less adversely affects the residence heat stability, even if the composite rubber has a core-shell structure. Accordingly, in the present invention, the number of composite rubber particles having an equivalent-circle diameter of 150 nm or less is preferably 50% or less, more preferably 40% or less, and most preferably 20% or less of the total number of the composite rubber particles.

The composite rubber (a1) may be polymerized by any method not generating a single type of particles of the cross-linked acrylic ester polymer. For example, generation of the single type of particles can be avoided by varying the amount of an emulsifier or the rate of addition of a monomer.

The composite rubber (a1) preferably has a weight-average particle diameter of 200 to 600 nm. The weight-average particle diameter is preferably 200 nm or more from the viewpoint of impact resistance; the diameter is preferably 600 nm or less from the viewpoint of gloss; and the weight-average particle diameter is preferably 250 to 500 nm from the viewpoint of the balance between physical properties such as impact resistance and gloss.

The composite rubber (a1) used in the present invention may have any gel content in a toluene solvent without any limitation. From the viewpoint of the balance between physical properties, the gel content of the composite rubber (a1) is preferably 90% or more and more preferably 95% or more.

Structure

The composite rubber (a1) may have a multilayer structure at least including an inner layer and an outer layer. If the multilayer structure is a core-shell structure including a core layer and a shell layer, the core layer is the inner layer, and the shell layer is the outer layer. If the layer structure consists of three or more layers, layers other than the inner layer, which is mainly composed of a conjugated diene rubber polymer, are all referred to as outer layers.

In the case of a composite rubber (a1) having a multilayer structure at least including an inner layer and an outer layer, the inner layer is mainly composed of a conjugated diene rubber polymer or a mixture of a conjugated diene rubber polymer and a cross-linked acrylic ester polymer and contains two or more of particles of the conjugated diene rubber polymer having a weight-average particle diameter of 50 to 300 nm; and the outer layer is mainly composed of a cross-linked acrylic ester polymer and has an average thickness of 5 to 100 nm.

An inner layer mainly composed of a single type of particles of the conjugated diene rubber polymer or having a weight-average particle diameter outside the range of 50 to 300 nm, even if the inner layer contains two or more particles of the conjugated diene rubber polymer, exhibits a poor balance between physical properties, such as impact resistance and color developing properties.

The conjugated diene rubber polymer preferably has a weight-average particle diameter of 70 to 200 nm and more preferably 80 to 150 nm.

An outer layer having an average thickness less than 5 nm gives insufficient weather resistance, because the conjugated diene rubber polymer portion can be readily decomposed by, for example, ultraviolet rays, whereas an outer layer exceeding 100 nm results in insufficient color developing properties. The average thickness of the outer layer is preferably 7 to 80 nm and more preferably 10 to 70 nm.

The thickness of the outer layer can be appropriately adjusted by varying the degree of swelling of an acrylic ester monomer in the conjugated diene rubber polymer particles during emulsion polymerization of the acrylic ester monomer to the conjugated diene rubber polymer, or by replacing a water-soluble polymerization initiator with an oil-soluble one during polymerization, or by modifying the concentration of the initiator during polymerization. Specifically, the thickness can be effectively adjusted by increasing the amount of the acrylic ester monomer in the initial stage of polymerization to impregnate the conjugated diene rubber polymer particles therewith, or by two-stage polymerization using an oil-soluble initiator in the first-stage polymerization and using a water-soluble initiator in the second-stage polymerization, or by varying the concentration of the initiator between the first and second stages of polymerization.

Method of Production

The composite rubber (a1) can be produced by, for example, emulsion polymerization of a monomer (mixture) for forming a cross-linked acrylic ester polymer in the presence of a conjugated diene rubber polymer. The composite rubber (a1) of the present invention may have a core-shell structure having a core of the conjugated diene rubber polymer and a shell of the cross-linked acrylic ester polymer.

In polymerization of the composite rubber (a1), an appropriate polymerization initiator can be used. Examples of the usable polymerization initiator include water-soluble polymerization initiators such as potassium persulfate, sodium persulfate, and ammonium persulfate and oil-soluble polymerization initiators such as cumene hydroperoxide, benzoyl peroxide, t-butyl hydroperoxide, acetyl peroxide, diisopropyl benzene hydroperoxide, and 1,1,3,3-tetramethylbutyl hydroperoxide. Specific examples of more preferred reducing agents include ferrous sulfate heptahydrate, sulfites, bisulfites, pyrosulfites, hydrosulfites, dithionates, thiosulfates, formaldehyde sulfonate, and benzaldehyde sulfonate; carboxylic acids such as L-ascorbic acid, tartaric acid, and citric acid; reducing sugars such as lactose, dextrose, and saccharose; and amines such as dimethylaniline and triethanolamine. Examples of chelating agents include tetrasodium pyrophosphate and sodium ethylenediaminetetraacetate.

In the polymerization of the composite rubber (a1), an emulsifier, such as carboxylate, sulfate, or sulfonate, can be appropriately used. Specific examples of preferred emulsifiers include potassium oleate, dipotassium alkenylsuccinate, sodium rosinate, and sodium dodecylbenzenesulfonate.

1-2. Monomer (a2)

Examples of the aromatic vinyl monomer used as the monomer (a2) include styrene, α-methylstyrene, para-methylstyrene, and bromostyren. These monomers may be used alone or in combination. In particular, styrene and α-methylstyrene are preferred.

Examples of the vinyl cyanide monomer used as the monomer (a2) include acrylonitrile, methacrylonitrile, ethacrylonitrile, and fumaronitrile. These monomers may be used alone or in combination. In particular, acrylonitrile is preferred.

Examples of the other copolymerizable vinyl monomers used as the monomer (a2) include (meth)acrylic ester monomers, maleimide monomers, and amide monomers. These monomers may be used alone or in combination. Examples of the (meth)acrylic ester monomers include methyl (meth) acrylate, ethyl (meth)acrylate, propyl (meth)acrylate, butyl (meth)acrylate, 2-ethylhexyl acrylate, phenyl (meth)acrylate, 4-t-butylphenyl (meth)acrylate, (di)bromophenyl (meth)acrylate, and chlorophenyl (meth)acrylate. Examples of the maleimide monomers include N-phenylmaleimide and N-cyclohexylmaleimide; and examples of amide monomers include acrylamide and methacrylamide.

The monomer (a2) composition may have any proportion of monomers. Preferred examples of the composition rate include a composition composed of 60% to 90% by weight of an aromatic vinyl monomer, 10% to 40% by weight of a vinyl cyanide monomer, and 0% to 30% by weight of another copolymerizable vinyl monomer; a composition composed of 30% to 80% by weight of an aromatic vinyl monomer, 20% to 70% by weight of a (meth)acrylic ester monomer, and 0% to 50% by weight of another copolymerizable vinyl monomer; and a composition composed of 20% to 70% by weight of an aromatic vinyl monomer, 20% to 70% by weight of a (meth)acrylic ester monomer, 10% to 60% by weight of a vinyl cyanide monomer, and 0% to 30% by weight of another copolymerizable vinyl monomer.

2. Thermoplastic Resin Composition

The graft copolymer (A) may be used alone or may be used in the form of a thermoplastic resin composition containing at least one component selected from the group consisting of copolymers (B), polycarbonate resins (C), polyamide resins (D), flame retardants (F), and graft copolymers (G), and additives described below. In a mixture of the graft copolymer (A) and these components, the content of the composite rubber (a1) in the thermoplastic resin composition is preferably 3% to 50% by weight and is more preferably 10% to 30% by weight from the viewpoint of the balance between physical properties.

The thermoplastic resin composition of the present invention can also be used in the form of a mixture with another thermoplastic resin within a range that can achieve the purpose. Examples of such another thermoplastic resin include acrylic resins such as polymethyl methacrylate; and polyester resins such as polybutylene terephthalate resins, polyethylene terephthalate resins, and polylactic resins.

The thermoplastic resin composition of the present invention can be prepared by mixing the above-mentioned components using a known kneading apparatus such as an extruder, roller, Bunbury mixer, or kneader.

The components such as the graft copolymer (A), the copolymer (B), the polycarbonate resin (C), the polyamide resin (B), the flame retardant (F), the graft copolymer (G), and the additive may be mixed in any order and by any method without limitation. Some of these components may be mixed and kneaded in advance, and then a part or all of the remaining components may be mixed and kneaded. The melting and mixing can be performed with any known extruder at 200° C. to 300° C.

The thermoplastic resin composition according to the fifth aspect of the present invention comprises:

10 to 90 parts by weight of a graft copolymer (A) according to any one of the first to third aspects of the present invention;

0 to 50 parts by weight of a copolymer (B) prepared by copolymerization of an aromatic vinyl monomer and a vinyl cyanide monomer; and 10 to 90 parts by weight of a polycarbonate resin (C) (provided that the total amount of the graft copolymer (A), the copolymer (B), and the polycarbonate resin (C) is 100 parts by weight).

If the contents of these components are outside these ranges, an excellent balance between physical properties, such as impact resistance, fluidity, heat resistance, and chemical resistance, is not achieved. From the viewpoint of the balance between physical properties, the content of the graft copolymer (A) is preferably 15 to 80 parts by weight and more preferably 20 to 70 parts by weight, the content of the copolymer (B) is preferably 0 to 45 parts by weight and more preferably 0 to 40 parts by weight; and the content of the polycarbonate resin (C) is preferably 20 to 85 parts by weight and more preferably 30 to 80 parts by weight.

In the thermoplastic resin composition according to the fifteenth aspect of the present invention, the total content of the graft copolymer (A) and the graft copolymer (G) contained in the thermoplastic resin composition is not particularly limited within the range that can achieve the purpose. The thermoplastic resin composition contains 20 to 80 parts by weight of the graft copolymer (A) and 20 to 80 parts by weight of the graft copolymer (G), provided that the total amount of the graft copolymer (A) and the graft copolymer (G) is 100 parts by weight. A content of the graft copolymer (A) less than 20 parts by weight gives insufficient impact resistance, whereas a content greater than 80 parts by weight gives insufficient gloss. The content of the graft copolymer (A) is preferably 30 to 70 parts by weight and more preferably 40 to 60 parts by weight. A content of the graft copolymer (G) less than 20 parts by weight gives insufficient gloss, whereas a content greater than 80 parts by weight gives insufficient impact resistance. The content of the graft copolymer (G) is preferably 30 to 70 parts by weight and more preferably 40 to 60 parts by weight. From the viewpoint of the balance between physical properties, the content of rubbers derived from the graft copolymer (A) and the graft copolymer (G) in the thermoplastic resin composition is preferably 3% to 50% by weight.

The thermoplastic resin composition comprising the graft copolymer (A) and the graft copolymer (G) according to the fifteenth aspect of the present invention may be optionally mixed with the copolymer (B). In the case of mixing with the copolymer (B), the content of rubbers contained in the thermoplastic resin composition is preferably 3% to 50% by weight and is more preferably 10% to 30% by weight from the viewpoint of the balance between physical properties. Furthermore, from the viewpoint of the balance between physical properties, the amount of the copolymer (B) is preferably 30 to 90 parts by weight and more preferably 40 to 80 parts by weight, provided that the total amount of the graft copolymer (A), the copolymer (B), and the graft copolymer (G) is 100 parts by weight.

2-1. Copolymer (B)

The copolymer (B) can be prepared by at least copolymerization of an aromatic vinyl monomer and a vinyl cyanide monomer and may be prepared by further copolymerization with another copolymerizable monomer, as necessary, other than the aromatic vinyl monomer and the vinyl cyanide monomer.

The aromatic vinyl monomer and the vinyl cyanide monomer may be those exemplified in the monomer (a2) used in the graft copolymer (A).

Examples of the other copolymerizable monomer include vinyl monomers other than the aromatic vinyl monomers and the vinyl cyanide monomers and unsaturated carboxylic acid monomers.

Specifically, the vinyl monomers other than the aromatic vinyl monomers and the vinyl cyanide monomers may be those exemplified in the monomer (a2) used in the graft copolymer (A).

Each monomer forming the copolymer (B) may be contained in any proportion. From the viewpoint of the balance between physical properties, the amount of the aromatic vinyl monomer is preferably 50 to 85 parts by weight; the amount of the vinyl cyanide monomer is preferably 15 to 50 parts by weight; and the amount of the other copolymerizable monomer is preferably 0 to 35 parts by weight, provided that the total amount of the monomers forming the copolymer (B) is 100 parts by weight.

The copolymer (B) can be produced by a known polymerization process, such as emulsion polymerization, block polymerization, suspension polymerization, or solution polymerization. Polymers prepared by these polymerization processes may be used in combination, or copolymers prepared by different polymerization methods and/or having different compositions may be used in combination.

The copolymer (B) is may have any reduced viscosity (measured by the above-described method) and preferably has a reduced viscosity within a range of 0.3 to 1.2 dl/g. The reduced viscosity can be appropriately adjusted by controlling the polymerization temperature, the way to add the monomer, the type of an initiator to be used, and the type and amount of the chain polymerization transfer agent such as t-dodecyl mercaptan.

The molecular structure of the copolymer (B) may be a linear or branched structure. The copolymer (B) preferably has a die swell ratio of 1.3 to 1.7 measured at 200° C. and a shear velocity of 100 (1/sec). When the copolymer (B) has a die swell ratio within this range, the resulting extruded article can have less heat shrinkage and enhanced molding workability. The die swell ratio is more preferably 1.4 to 1.6.

The die swell ratio of the copolymer (B) used in the present invention may be adjusted by any method. For example, two or more copolymers having different weight-average molecular weights may be used.

In the thermoplastic resin composition for extrusion molding according to the eleventh aspect of the present invention, the copolymer (B) affects the molding workability during extrusion molding of the thermoplastic resin composition and can control the content of the composite rubber in the thermoplastic resin composition and the heat shrinkage during extrusion molding.

2-1-1. Unsaturated Carboxylic-Modified Copolymer (E)

As described above, the unsaturated carboxylic-modified copolymer (E) can be prepared by copolymerization of at least an unsaturated carboxylic acid monomer, in addition to an aromatic vinyl monomer, a vinyl cyanide monomer. Accordingly, when an unsaturated carboxylic acid monomer is used as the other copolymerizable monomer in the copolymer (B), an unsaturated carboxylic-modified copolymer (E) is provided. The unsaturated carboxylic-modified copolymer (E) will now be described.

The amount of the unsaturated carboxylic-modified copolymer (E) in 100 parts by weight of the thermoplastic resin composition according to the seventh aspect of the present invention is 1 to 50 parts by weight. The composition containing the copolymer (E) in an amount less than 1 part by weight is inferior in the impact resistance and fluidity, whereas an amount greater than 50 parts by weight gives insufficient impact resistance. From the viewpoint of the balance between physical properties, the amount of the unsaturated carboxylic-modified copolymer (E) is preferably 1 to 30 parts by weight and more preferably 2 to 20 parts by weight.

Examples of the unsaturated carboxylic acid monomer used in the unsaturated carboxylic-modified copolymer (E) include acrylic acid, methacrylic acid, maleic acid, fumaric acid, and itaconic acid. These monomers may be used alone or in combination. Methacrylic acid is particularly preferred.

The aromatic vinyl monomer, the vinyl cyanide monomer, and the other copolymerizable monomer used in the unsaturated carboxylic-modified copolymer may be those exemplified in the monomer used in the graft copolymer (A).

The monomers may be used in any proportion in the unsaturated carboxylic-modified copolymer (E). From the viewpoint of the balance between physical properties, the amount of the monomer in 100 parts by weight of the unsaturated carboxylic-modified copolymer (E) is preferably 1 to 20 parts by weight and more preferably 3 to 15 parts by weight, provided that the total amount of the monomers used in the unsaturated carboxylic-modified copolymer (E) is 100 parts by weight. The amount of the aromatic vinyl monomer is preferably 40 to 89 parts by weight; the amount of the vinyl cyanide monomer is 10 to 40 parts by weight; and the amount of the other copolymerizable monomer other than the unsaturated carboxylic acid monomer is preferably 0 to 40 parts by weight.

The unsaturated carboxylic-modified copolymer (E) can be produced by a known polymerization process, such as emulsion polymerization, block polymerization, suspension polymerization, or solution polymerization. Polymers prepared by these polymerization processes may be used in combination, or copolymers prepared by different polymerization methods and/or having different compositions may be used in combination.

The unsaturated carboxylic-modified copolymer (E) may have any reduced viscosity (measured by the above-described method) and preferably has a reduced viscosity of 0.2 to 1.2 dl/g.

2-2. Polycarbonate Resin (C)

The thermoplastic resin composition according to the fifth aspect of the present invention contains 10 to 90 parts by weight of the polycarbonate resin (C) provided that the total amount of the graft copolymer (A), the copolymer (B), and the polycarbonate resin (C) is 100 parts by weight. An amount of the carbonate resin (C) less than 10 parts by weight gives insufficient impact resistance, whereas an amount greater than 90 parts by weight gives insufficient fluidity. From the viewpoint of the balance between physical properties, the amount of the polycarbonate resin (C) is preferably 20 to 85 parts by weight and more preferably 30 to 80 parts by weight.

The polycarbonate resin (C) is a polymer prepared by a method for reacting phosgene with one of variety of dihydroxydiaryl compounds or transesterification involving a reaction of a dihydroxydiaryl compound with a carbonate such as diphenyl carbonate. A typical polycarbonate resin is one produced from 2,2-bis(4-hydroxyphenyl)propane, "Bisphenol A". Polymers produced by different polymerization processes and/or having different compositions may be used in combination.

Examples of the dihydroxydiaryl compound other than bisphenol A include bis(hydroxyaryl)alkanes such as bis(4-hydroxydiphenyl)methane, 1,1-bis(4-hydroxyphenyl)ethane, 2,2-bis(4-hydroxyphenyl)butane, 2,2-bis(4-hydroxyphenyl)octane, bis(4-hydroxydiphenyl)phenylmethane, 2,2-bis(4-hydroxydiphenyl-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide; and dihydroxydiaryl sulfones such as 4,4'-dihydroxydiphenyl sulfone and 4,4'-dihydroxy-3,3'-dimethyldiphenyl sulfone.

The dihydroxydiaryl compound may be used together with a tri- or higher valent phenol compound, of which examples include phloroglucin, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzol, 1,1,1-tri-(4-hydroxyphenyl)-ethane, and 2,2-bis-(4,4'-(4,4'-hydroxydiphenyl)cyclohexyl)-propane. These polycarbonate resins usually have a weight-average molecular weight of 10000 to 80000 and preferably 15000 to 60000. In addition, for example, a molecular weight regulator and a catalyst can be optionally used.

These compounds may be used alone or in combination and may be further used in the form of a mixture with, for example, piperazine, dipiperidyl hydroquinone, resorcin, or 4,4'-dihydroxydiphenyls.

2-3. Polyamide Resin (D)

The thermoplastic resin composition according to the seventh aspect of the present invention contains 20 to 79 parts by weight of the polyamide resin (D) provided that the total amount of the graft copolymer (A), the copolymer (B), and the polyamide resin (D) is 100 parts by weight. An amount of the polyamide resin (D) less than 20 parts by weight gives insufficient impact resistance, fluidity, and chemical resistance, whereas an amount greater than 79 parts by weight gives insufficient impact resistance and weather resistance. From the viewpoint of the balance between physical properties, the amount of the polyamide resin (D) is preferably 25 to 75 parts by weight and more preferably 30 to 70 parts by weight.

Examples of the polyamide resin (D) include nylon 3, nylon 4, nylon 6, nylon 46, nylon 66, nylon 610, nylon 612, nylon 116, nylon 11, nylon 12, nylon 6I, nylon 6/66, nylon 6T/6I, nylon 6/6T, nylon 66/6T, poly(trimethyl hexamethylene terephthalamide), polybis(4-aminocyclohexyl)methane dodecamide, polybis(3-methyl-4-aminocyclohexyl)methane dodecamide, polymethaxylyleneadipamide, nylon 11T, and poly(undecamethylene hexahydroterephthalamide). In the above, "I" refers to an isophthalic acid component, and "T" refers to a terephthalic acid component. Among these resins, particularly preferred are nylon 6, nylon 66, nylon 11, and nylon 12. Polymers prepared by different polymerization processes and/or having different compositions may be used in combination.

2-4. Flame Retardant (F)

The amount of the flame retardant (F) is determined based on the required level of flame retardance within a range of 1 to 40 parts by weight based on 100 parts by weight of the thermoplastic resin composition. An amount less than 1 part by weight does not provide a required flame retardant effect, whereas an amount greater than 40 parts by weight significantly impairs the physical properties of the resin composition. From the viewpoints of flame retardance and the balance between physical properties, the amount of the flame retardant (F) is preferably 2 to 35 parts by weight and more preferably 5 to 30 parts by weight.

The flame retardant (F) may be a known flame retardant appropriately selected based on the required level of flame retardance. Examples of the flame retardant include phosphorus compounds such as red phosphorus, polyphosphate, phosphoric ester, and phosphazene; halogen compounds such as halogenated aromatic triazines and halogenated epoxy resins; silicone compounds such as silicone resins, polyalkylsiloxane, and polyalkylphenylsiloxane; nitrogen-containing compounds such as melamine, cyanuric acid, and melamine cyanurate; metal oxides such as antimony oxides, bismuth oxides, zinc oxides, and tin oxides; inorganic compounds such as aluminum hydroxide and magnesium hydroxide; and carbon fiber, glass fiber, and expanded graphite. Particularly preferred are phosphoric ester flame retardants represented by the following chemical formula (1) and having a weight-average molecular weight of 327 or more; halogenated aromatic triazine compounds represented by the following chemical formula (2); and halogen organic compounds represented by the following chemical formula (3). These compounds may be used alone or in combination.

[Chem 1]

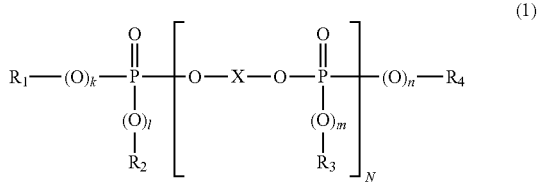

(1)

(wherein $R_1$, $R_2$, $R_3$, and $R_4$ each independently represent a hydrogen atom or a monovalent organic group provided that at least one of $R_1$, $R_2$, $R_3$, and $R_4$ represents a monovalent organic group; X represents a divalent organic group; k, l, m, and n each independently represent 0 or 1; and N represents an integer of 0 to 10).

[Chem 2]

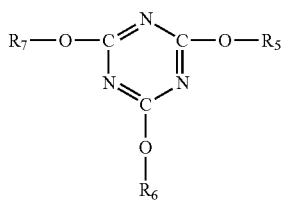

(2)

(wherein $R_5$, $R_6$, and $R_7$ represent different or the same types of halogenated alkyl groups, halogenated aryl groups, and halogenated alkylaryl groups having 1 to 20 carbon atoms).

[Chem 3]

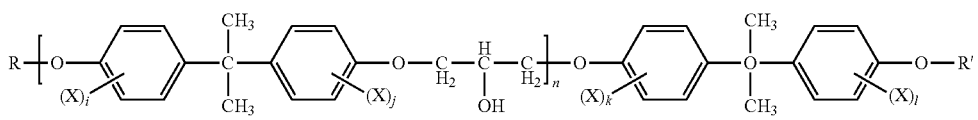

(3)

(wherein n represents 0 or a natural number; Xs each independently represent chlorine atom or bromine atom; i, j, k, and l each represent an integer of 1 to 4; R and R' each independently represent hydrogen, a methyl group, an epoxypropyl group represented by the following formula (4), a phenyl group, or a chemical group represented by the following formula (5):

[Chem 4]

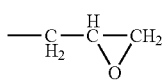

(4)

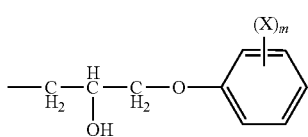

(5)

(in formula (5), m represents 0, 1, 2, or 3; and Xs each independently represent chlorine atom or bromine atom).

In the chemical formula (1), examples of the monovalent group include optionally substituted alkyl groups, aryl groups, and cycloalkyl groups. When these groups are substituted, examples of the substituent include alkyl groups, alkoxy groups, alkylthio groups, aryl groups, aryloxy groups, and arylthio groups. Examples of the substituent also include combinations of these substituents (e.g., arylalkoxyalkyl group) and combinations of these substituents and atoms such as oxygen, sulfur, and nitrogen (e.g., arylsulfonylaryl group). Examples of the divalent organic group include alkylene group and groups induced from optionally substituted phenylene group, polyhydric phenols, and polynuclear phenols (bisphenols). Particularly preferred examples of the divalent organic group include hydroquinone, resorcinol, diphenylol methane, diphenylol dimethylmethane, dihydroxydiphenyl, p,p'-dihydroxydiphenylsulfone, and dihydroxynaphthalene. One or more groups of these groups may be used.

Specific examples of the phosphoric ester flame retardant include tricresyl phosphate, trixylenyl phosphate, hydroxyphenyl diphenyl phosphate, cresyl diphenyl phosphate, xylenyl diphenyl phosphate, and condensed phosphoric esters.

2-5. Graft Copolymer (G)

As described above, the graft copolymer (G) can be prepared by
graft polymerization of 20 to 90 parts by weight of at least one monomer (g2) selected from aromatic vinyl monomers, vinyl cyanide monomers, and other vinyl monomers copolymerizable with these monomers onto 10 to 80 parts by weight of an acrylic ester rubber polymer (g1) having a weight-average particle diameter of 70 to 200 nm (provided that the total amount of the acrylic ester rubber polymer (g1) and the monomer (g2) is 100 parts by weight).

A graft copolymer (G) prepared using less than 10 parts by weight of the acrylic ester rubber polymer (g1) in the graft polymerization gives insufficient impact resistance, whereas an amount greater than 80 parts by weight of the acrylic ester rubber polymer (g1) gives insufficient fluidity. From the viewpoint of the balance between physical properties, the amount of the acrylic ester rubber polymer (g1) used in the graft polymerization is preferably 30 to 70 parts by weight and more preferably 40 to 60 parts by weight.

The procedure of polymerization of the graft copolymer (G), the graft rate, the reduced viscosity of the acetone-soluble portion can be the same as those in the graft copolymer (A).

2-5-1. Acrylic Ester Rubber Polymer (g1)

The acrylic ester rubber polymer (g1) is required to have a weight-average particle diameter of 70 to 200 nm. A weight-average particle diameter less than 70 nm provides insufficient impact resistance, whereas a weight-average particle diameter higher than 200 nm reduces the effect of improving gloss when mixed with the graft copolymer (A). From the viewpoint of impact resistance and the balance between physical properties such as gloss, the weight-average particle diameter is preferably 100 to 160 nm. The weight-average particle diameter of the acrylic ester rubber polymer can be controlled by a known method.

The acrylic ester rubber polymer (g1) may have any structure without particular limitation. For example, the acrylic ester rubber polymer (g1) can be a copolymer prepared by emulsion polymerization of an acrylic ester monomer to a copolymer of an aromatic vinyl monomer and an acrylic ester monomer in the presence of a cross-linking agent. Such an acrylic ester rubber polymer (g1) has a core-shell structure.

The monomers and the cross-linking agent used for preparing the acrylic ester rubber polymer (g1) can be those exemplified in the cross-linked acrylic ester polymer used in the composite rubber (a1).

2-5-2. Monomer (g2)

The types and proportions of the monomers used in the monomer (g2) can be those exemplified in the monomer (a2).

2-6. Additives

Examples of the additives include hindered amine light stabilizers; hindered phenol, sulfur-containing organic compound, or phosphorus-containing organic compound antioxidants; phenol or acrylate heat stabilizers; benzoate, benzotriazole, benzophenone, or salicylate ultraviolet absorbers; organic nickel or higher fatty acid amide lubricants; phosphoric ester plasticizers; halogen-containing compounds such as bromination, e.g., polybromophenyl ether, tetrabromobisphenol-A, and brominated epoxy oligomers; phosphorus compounds; flame retardants and flame retardant aids such as triantimony oxide; odor-masking agents; pigments and dyes such as carbon black and titanium oxide; and reinforcing agents and fillers such as talc, calcium carbonate, aluminum hydroxide, glass fibers, glass flakes, glass beads, carbon fibers, and metal fibers.

From the viewpoints of effect and cost of inhibiting discoloration and deterioration by light, the amount of the light stabilizer is preferably 0.1 to 1.0 parts by weight and more preferably 0.2 to 0.8 parts by weight based on the total amount, 100 parts by weight, of the monomers as monomer units used in the thermoplastic resin composition.

From the viewpoints of effect and cost of inhibiting discoloration and deterioration by ultraviolet, the amount of the ultraviolet absorber is preferably 0.01 to 0.5 parts by weight and more preferably 0.05 to 0.3 parts by weight based on the total amount, 100 parts by weight, of the monomers as monomer units used in the thermoplastic resin composition.

The flame retardant aid is a compound or oxide containing an element belonging to group 15 of the periodic table. Specific examples thereof include nitrogen-containing compounds, phosphorus-containing compounds, antimony oxides, and bismuth oxides. In addition, metal oxides such as iron oxides, zinc oxides, and tin oxides are effective. In particular, antimony oxides, specifically triantimony oxide and pentaantimony oxide, are preferred flame retardant aids. These flame retardant aids may be surface-treated for improving the dispersibility into a resin or enhancing the heat resistance of a resin. From the viewpoint of enhancing the flame retardant effect, the amount of the flame retardant aid is preferably 0.5 to 20 parts by weight and more preferably 1 to 10 parts by weight based on the total amount, 100 parts by weight, of the monomers as monomer units used in the thermoplastic resin composition.

3. Method for Producing Graft Copolymer (A)

The method for producing a graft copolymer (A) of the present invention produces the graft copolymer (A) according to the first or second aspect of the present invention. Any method can be employed that comprises the following steps:

retaining a composition containing 0 to 0.15 parts by weight of an emulsifier, 5 to 50 parts by weight of a conjugated diene rubber polymer, and 5 to 33 parts by weight of an acrylic ester monomer for 0.5 to 2.0 hours (provided that the total amount of the conjugated diene rubber polymer and the acrylic ester monomer used for producing the composite rubber (a1) is 100 parts by weight); and successively adding 0.03 to 0.18 parts by weight of a polymerization initiator, 0.2 to 1.5 parts by weight of an emulsifier, and 17 to 90 parts by weight of an acrylic ester monomer to the retained composition in the range of temperature from 35° C. to 60° C. over 1 to 6 hours (provided that the total amount of the conjugated diene rubber polymer and the acrylic ester monomer used for producing the composite rubber (a1) is 100 parts by weight).

The amount of the emulsifier contained in the composition in the step of retaining is 0 to 0.15 parts by weight, preferably 0 to 0.1 parts by weight, and more preferably 0 to 0.05 parts by weight based on the total amount, 100 parts by weight, of the conjugated diene rubber polymer and the acrylic ester monomer used in the production of the composite rubber (a1). Most preferably, no emulsifier is used.

The amount of the emulsifier contained in the composition in the step of retaining is preferably 0 to 10 parts by weight, more preferably 0 to 5 parts by weight, and more preferably 0 to 1 part by weight based on the total amount, 100 parts by weight, of the emulsifier used in the production of the composite rubber (a1). Most preferably, no emulsifier is used.

The amount of the emulsifier successively added to the composition in the step of successive addition is 0.2 to 1.5 parts by weight, preferably 0.4 to 1.3 parts by weight, and more preferably 0.6 to 1.1 parts by weight based on the total amount, 100 parts by weight, of the conjugated diene rubber polymer and the acrylic ester monomer used in the production of the composite rubber (a1).

The amount of the polymerization initiator successively added to the composition in the step of successive addition is 0.03 to 0.18 parts by weight, preferably 0.04 to 0.15 parts by weight, and more preferably 0.05 to 0.12 parts by weight based on the total amount, 100 parts by weight, of the conjugated diene rubber polymer and the acrylic ester monomer used in the production of the composite rubber (a1).

The method for producing a graft copolymer (A) may further comprise an aging step of retaining the composition in the range of temperature from 35° C. to 60° C. for 1 to 5 hours after the step of successive addition.

The steps of successive addition and aging are performed at 35° C. to 60° C., and the temperature is more preferably 35° C. to 55° C. and most preferably 35° C. to 45° C.

Other preferred conditions for the method, such as the polymerization conditions and the types and amounts of the conjugated diene rubber polymer and the acrylic ester monomer, can be the same as those described in the composite rubber (a1).

EXAMPLES

The present invention will now be described in further detail, but is not limited to the following examples. Note that the "part(s)" and "%" used in the following examples are based on weight.

Examples 1-1 to 1-8 and Comparative Examples 1-1 to 1-7

Production of Styrene-Butadiene Rubber Latex Having Small Particle Diameter

A 10-L pressure resistant container was purged with nitrogen and was then charged with 95 parts by weight of 1,3-butadiene, 5 parts by weight of styrene, 0.5 parts by weight of n-dodecyl mercaptan, 0.3 parts by weight of potassium persulfate, 1.8 parts by weight of disproportionated sodium rosinate, 0.1 parts by weight of sodium hydroxide, and 145 parts by weight of deionized water, followed by reaction with stirring at 70° C. for 8 hours. Subsequently, 0.2 parts by weight of disproportionated sodium rosinate, 0.1 parts by weight of sodium hydroxide, and 5 parts by weight of deionized water were added to the reaction mixture. The resulting mixture was further stirred for 6 hours while the temperature was being maintained at 70° C., and then the reaction was stopped. Remaining 1,3-butadiene was removed by reducing the pressure to yield a styrene-butadiene rubber latex (1). The styrene-butadiene rubber latex (1) was stained with osmium tetraoxide ($OsO_4$) and was photographed with a transmission electron microscope after drying. The areas of 1000 rubber particles were measured with an image processor (device name: IP-1000PC manufactured by Asahi Kasei Corporation). The equivalent-circle sizes (diameters) were determined, and the weight-average particle diameter of the styrene-butadiene rubber was calculated. The weight-average particle diameter was 120 nm.

Production of Agglomerated Styrene-Butadiene Rubber Latex

A 10-L pressure resistant container was filled with 270 parts by weight of the styrene-butadiene rubber latex (1) prepared above and 0.1 parts by weight of sodium dodecylbenzenesulfonate, followed by stirring for 10 minutes. Subsequently, 20 parts by weight of a 5% aqueous phosphoric acid solution was added to the mixture over 10 minutes, and 10 parts by weight of a 10% aqueous potassium hydroxide solution was then added to the mixture to yield an agglomerated styrene-butadiene rubber latex (1) (hereinafter, referred to as agglomerated rubber polymer (1)). The weight-average particle diameter of the agglomerated styrene-butadiene rubber was calculated by the above-described method. The weight-average particle diameter was 330 nm.

A 10-L pressure resistant container was filled with 270 parts by weight of the styrene-butadiene rubber latex (1) prepared above and 0.3 parts by weight of sodium dodecylbenzenesulfonate, followed by stirring for 10 minutes. Subsequently, 20 parts by weight of a 5% aqueous phosphoric acid solution was added to the mixture over 10 minutes, and 10 parts by weight of a 10% aqueous potassium hydroxide solution was then added to the mixture to yield an agglomerated styrene-butadiene rubber latex (2) (hereinafter, referred to as agglomerated rubber polymer (2)). The weight-average particle diameter of the agglomerated styrene-butadiene rubber was calculated by the above-described method. The weight-average particle diameter was 250 nm.

Production of Cross-Linked Butyl Acrylate Rubber Latex

A nitrogen-purged glass reactor was charged with 180 parts by weight of deionized water, 15 parts by weight of butyl acrylate, 0.1 parts by weight of allyl methacrylate, 0.16 parts by weight (in terms of solid content) of dipotassium alkenylsuccinate, and 0.15 parts by weight of potassium persulfate, followed by reaction at 65° C. for 1 hour. Subsequently, a mixture of 85 parts by weight of butyl acrylate and 0.53 parts by weight of allyl methacrylate and an aqueous emulsifier solution prepared by dissolving 0.64 parts by weight (in terms of solid content) of dipotassium alkenylsuccinate in 20 parts by weight of deionized water were successively dropwise added to the reaction mixture over 3 hours. After the dropping, the mixture was retained for 3 hours to yield a cross-linked butyl acrylate rubber latex (1).

The weight-average particle diameter of the resulting cross-linked butyl acrylate rubber latex (1) was calculated as follows. A graft copolymer was prepared by graft copolymerization of 15 parts of the resulting cross-linked butyl acrylate rubber latex (1), 64 parts of styrene, and 21 parts of acrylonitrile. A powder of the graft copolymer was melted and kneaded into pellets. The pellet was cut into ultrathin sections with a cryomicrotome in a −85° C. atmosphere. The sections were stained with ruthenium tetraoxide ($RuO_4$) and were photographed with a transmission electron microscope (JEM-1400, manufactured by JEOL Ltd.). The areas of 1000 composite rubber (a1) particles were measured with an image processor (IP-1000PC manufactured by Asahi Kasei Corporation). The equivalent-circle sizes (diameters) were determined, and the weight-average particle diameter of the cross-linked butyl acrylate rubber was calculated. The weight-average particle diameter was 200 nm.

Production of Composite Rubber (a-1-1)

A 10-L glass reactor was charged with 20 parts by weight (solid content) of the agglomerated styrene-butadiene rubber latex (1) and 140 parts by weight of deionized water, followed by nitrogen purging. The inner temperature of the nitrogen-purged tank was increased to 35° C., and then an aqueous solution prepared by dissolving 0.05 parts by weight of sodium formaldehyde sulfoxylate, 0.01 parts by weight of sodium ethylenediaminetetraacetate, and 0.001 parts by weight of ferrous sulfate in 20 parts by weight of deionized water was added to the container. Furthermore, 16 parts by weight of butyl acrylate and 0.1 parts by weight of allyl methacrylate were added. The inner temperature of the tank was increased to 40° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 64 parts by weight of butyl acrylate, and 0.4 parts by weight of allyl methacrylate were successively dropwise added to the reaction mixture over 3 hours while the temperature was being maintained at 40° C. After the dropping, the reaction mixture was retained at 40° C. for 3 hours to yield a composite rubber latex composed of an enlarged styrene-butadiene rubber and a cross-linked butyl acrylate polymer.

The resulting composite rubber latex was dried, and 1.0 g of the latex was immersed in 20 mL of tetrahydrofuran for 24 hours. The insoluble portion was removed through a 300-mesh metal gauze, followed by filtration through a disposable filter having a pore size of 0.45 μm. The filtrate was applied to gel permeation chromatography (GPO) to determine the weight-average molecular weight of the tetrahydrofuran-soluble portion in terms of polystyrene. The weight-average molecular weight of the tetrahydrofuran-soluble portion of the composite rubber (a-1-1) measured by this method was 65000.

The degree of swelling in toluene of the composite rubber was determined as follows: The composite rubber latex described above was dried, and 0.25 g of the latex was immersed in 100 mL of toluene for 48 hours, followed by filtration through a 300-mesh metal gauze. The weight ($W_1$) of the insoluble portion before drying and the weight ($W_2$) of the insoluble portion after drying were measured. The degree of swelling was determined by the following expression:

$$\text{Degree of swelling} = W_1/W_2.$$

The degree of swelling of the resulting composite rubber (a-1-1) determined by this method was 9.5.

Production of Composite Rubber (a-1-2)

A 10-L glass reactor was charged with 10 parts by weight (solid content) of the agglomerated styrene-butadiene rubber latex (1) and 140 parts by weight of deionized water, followed by nitrogen purging. The inner temperature of the nitrogen-purged tank was increased to 35° C., and then an aqueous solution prepared by dissolving 0.05 parts by weight of sodium formaldehyde sulfoxylate, 0.01 parts by weight of sodium ethylenediaminetetraacetate, and 0.001 parts by weight of ferrous sulfate in 20 parts by weight of deionized water was added to the container. Furthermore, 16 parts by weight of butyl acrylate and 0.1 parts by weight of allyl methacrylate were added. The inner temperature of the tank was increased to 40° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 74 parts by weight of butyl acrylate, and 0.46 parts by weight of allyl methacrylate were successively dropwise added to the reaction mixture over 3 hours while the temperature was being maintained at 40° C. After the dropping, the reaction mixture was retained at 40° C. for 3 hours to yield a composite rubber latex composed of an enlarged styrene-butadiene rubber and a cross-linked butyl acrylate polymer. The tetrahydrofuran-soluble portion prepared above had a weight-average molecular weight of 68000 in terms of polystyrene and a degree of swelling in toluene of 10.3.

Production of Composite Rubber (a-1-3)

A 10-L glass reactor was charged with 30 parts by weight (solid content) of the agglomerated styrene-butadiene rubber latex (1) and 140 parts by weight of deionized water, followed by nitrogen purging. The inner temperature of the nitrogen-purged tank was increased to 35° C., and then an aqueous solution prepared by dissolving 0.05 parts by weight of sodium formaldehyde sulfoxylate, 0.01 parts by weight of sodium ethylenediaminetetraacetate, and 0.001 parts by weight of ferrous sulfate in 20 parts by weight of deionized water was added to the container. Furthermore, 16 parts by weight of butyl acrylate and 0.1 parts by weight of allyl methacrylate were added. The inner temperature of the tank was increased to 40° C., and the mixture was retained at this temperature for 1 hour. Subsequently, an aqueous solution prepared by dissolving 0.9 parts by weight of dipotassium alkenylsuccinate and 0.07 parts by weight of potassium persulfate in 25 parts by weight of deionized water, 54 parts by weight of butyl acrylate, and 0.34 parts by weight of allyl methacrylate were successively dropwise added to the reaction mixture over 3 hours while the temperature was being maintained at 40° C. After the dropping, the reaction mixture was retained at 40° C. for 3 hours to yield a composite rubber latex composed of an enlarged styrene-butadiene rubber and a cross-linked butyl acrylate polymer. The tetrahydrofuran-soluble portion prepared above had a weight-average molecular weight of 61000 in terms of polystyrene and a degree of swelling in toluene of 7.5.

Production of Composite Rubber (a-1-4)

A 10-L glass reactor was charged with 20 parts by weight (solid content) of the agglomerated styrene-butadiene rubber latex (2) and 140 parts by weight of deionized water, followed by nitrogen purging. The inner temperature of the nitrogen-purged tank was increased to 35° C., and then an aqueous solution prepared by dissolving 0.05 parts by weight of sodium formaldehyde sulfoxylate, 0.01 parts by weight of sodium ethylenediaminetetraacetate, and 0.001 parts by weight of ferrous sulfate in 20 parts by weight of deionized water was added to the container. Furthermore, 16 parts by weight of butyl acrylate and 0.1 parts by weight of allyl methacrylate were added. The inner temperature of the tank was increased to 40° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 64 parts by weight of butyl acrylate, and 0.4 parts by weight of allyl methacrylate were successively dropwise added to the reaction mixture over 3 hours while the temperature was being maintained at 40° C. After the dropping, the reaction mixture was retained at 40° C. for 3 hours to yield a composite rubber latex composed of an enlarged styrene-butadiene rubber and a cross-linked butyl acrylate polymer. The tetrahydrofuran-soluble portion prepared above had a weight-average molecular weight of 64000 in terms of polystyrene and a degree of swelling in toluene of 9.7.

Production of Composite Rubber (a-1-5)

A 10-L glass reactor was charged with 20 parts by weight (solid content) of the agglomerated styrene-butadiene rubber latex (1) and 140 parts by weight of deionized water, followed by nitrogen purging. The inner temperature of the nitrogen-purged tank was increased to 65° C., and then 16 parts by weight of butyl acrylate and 0.1 parts by weight of allyl methacrylate were added to the container. The inner temperature of the tank was increased to 70° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 64 parts by weight of butyl acrylate, and 0.4 parts by weight of allyl methacrylate were successively dropwise added to the reaction mixture over 3 hours while the temperature was being maintained at 70° C. After the dropping, the reaction mixture was retained at 70° C. for 3 hours to yield a composite rubber latex composed of an enlarged styrene-butadiene rubber and a cross-linked butyl acrylate polymer. The tetrahydrofuran-soluble portion prepared above had a weight-average molecular weight of 62000 in terms of polystyrene and a degree of swelling in toluene of 6.1.

Production of Composite Rubber (a-1-6)

A 10-L glass reactor was charged with 20 parts by weight (solid content) of the agglomerated styrene-butadiene rubber latex (1) and 140 parts by weight of deionized water, followed by nitrogen purging. The inner temperature of the nitrogen-purged tank was increased to 65° C., and then 16 parts by weight of butyl acrylate and 0.1 parts by weight of allyl methacrylate were added to the container. The inner temperature of the tank was increased to 70° C., and the mixture was retained at this temperature for 1 hour. Subsequently, an aqueous solution prepared by dissolving 0.9 parts by weight of dipotassium alkenylsuccinate and 0.2 parts by weight of potassium persulfate in 25 parts by weight of deionized water, 64 parts by weight of butyl acrylate, and 0.4 parts by weight of allyl methacrylate were successively dropwise added to the reaction mixture over 3 hours while the temperature was being maintained at 70° C. After the dropping, the reaction mixture was retained at 70° C. for 3 hours to yield a composite rubber latex composed of an enlarged styrene-butadiene rubber and a cross-linked butyl acrylate polymer. The tetrahydrofuran-soluble portion prepared above had a weight-average molecular weight of 43000 in terms of polystyrene and a degree of swelling in toluene of 5.2.

Production of Composite Rubber (a-1-7)

A 10-L glass reactor was charged with 10 parts by weight (solid content) of the agglomerated styrene-butadiene rubber latex (1) and 140 parts by weight of deionized water, followed by nitrogen purging. The inner temperature of the nitrogen-purged tank was increased to 65° C., and then 16 parts by weight of butyl acrylate and 0.1 parts by weight of allyl methacrylate were added to the container. The inner temperature of the tank was increased to 70° C., and the mixture was retained at this temperature for 1 hour. Subsequently, an aqueous solution prepared by dissolving 0.9 parts by weight of dipotassium alkenylsuccinate and 0.2 parts by weight of potassium persulfate in 25 parts by weight of deionized water, 74 parts by weight of butyl acrylate, and 0.46 parts by weight of allyl methacrylate were successively dropwise added to the reaction mixture over 3 hours while the temperature was being maintained at 70° C. After the dropping, the reaction mixture was retained at 70° C. for 3 hours to yield a composite rubber latex composed of an enlarged styrene-butadiene rubber and a cross-linked butyl acrylate polymer. The tetrahydrofuran-soluble portion prepared above had a weight-average molecular weight of 45000 in terms of polystyrene and a degree of swelling in toluene of 5.5.

Production of Graft Copolymer (A-1-1)

A glass reactor was charged with 50 parts by weight (solid content) of the composite rubber latex (a-1-1), followed by nitrogen purging. The inner temperature of the nitrogen-purged tank was increased to 65° C., and then an aqueous solution prepared by dissolving 0.2 parts by weight of lactose, 0.1 parts by weight of sodium pyrophosphate dehydrate, and 0.005 parts by weight of ferrous sulfate in 10 parts by weight of deionized water was added to the container, followed by heating to 70° C. Subsequently, a liquid mixture composed of 15 parts by weight of acrylonitrile, 35 parts by weight of styrene, 0.05 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained at 70° C. for 3 hours to yield a graft copolymer latex (A-1-1), which was then salted out, dehydrated, and dried into a powdered graft polymer (A-1-1).

Production of Graft Copolymers (A-1-2) to (A-1-7)

Graft copolymer latexes (A-1-2) to (A-1-7) were prepared as in graft copolymer (A-1-1) except that composite rubbers (a-1-2) to (a-1-7) were respectively used instead of the composite rubber latex (a-1-1) and were then salted out, dehydrated, and dried into powdered graft polymers (A-1-2) to (A-1-7).

Production of Graft Copolymer (A-1-8)

A glass reactor was charged with 50 parts by weight in terms of solid content of the agglomerated styrene-butadiene rubber latex (1), followed by nitrogen purging. The inner temperature of the nitrogen-purged tank was increased to 65° C., and then an aqueous solution prepared by dissolving 0.2 parts by weight of lactose, 0.1 parts by weight of sodium pyrophosphate dehydrate, and 0.005 parts by weight of ferrous sulfate in 10 parts by weight of deionized water was added to the container, followed by heating to 70° C. Subsequently, a liquid mixture composed of 15 parts by weight of acrylonitrile, 35 parts by weight of styrene, 0.05 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained for 3 hours to yield a graft copolymer latex (A-1-8), which was then salted out, dehydrated, and dried into a powdered graft polymer (A-1-8).

Production of Graft Copolymer (A-1-9)

A glass reactor was charged with 10 parts by weight in terms of solid content of the agglomerated styrene-butadiene rubber latex (1) and 40 parts by weight in terms of solid content of the cross-linked butyl acrylate rubber latex, followed by nitrogen purging. The inner temperature of the nitrogen-purged tank was increased to 65° C., and then an aqueous solution prepared by dissolving 0.2 parts by weight of lactose, 0.1 parts by weight of sodium pyrophosphate dehydrate, and 0.005 parts by weight of ferrous sulfate in 10 parts by weight of deionized water was added to the container, followed by heating to 70° C. Subsequently, a liquid mixture composed of 15 parts by weight of acrylonitrile, 35 parts by weight of styrene, 0.05 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained for 3 hours to yield a graft copolymer latex (A-1-9), which was then salted out, dehydrated, and dried into a powdered graft polymer (A-1-9).

Production of Copolymer (B-1)

A nitrogen-purged glass reactor was charged with 150 parts by weight of deionized water, 7 parts by weight of styrene, 3 parts by weight of acrylonitrile, 0.02 parts by weight of tertiary-dodecyl mercaptan, 0.5 parts by weight (in terms of solid content) of sodium dodecylbenzenesulfonate, and 0.3 parts by weight of potassium persulfate, followed by polymerization at 65° C. for 1 hour. Subsequently, 63 parts by weight of styrene, 27 parts by weight of acrylonitrile, 0.18 parts by weight of tertiary-dodecyl mercaptan, and 30 parts by weight of an aqueous emulsifier solution containing 2.5 parts by weight (in terms of solid content) of sodium dodecylbenzenesulfonate were successively dropwise added to the reaction mixture over 3 hours. After the dropping, the reaction mixture was retained for 2 hours to yield a copolymer latex (B-1), which was then salted out, dehydrated, and dried into a powdered copolymer (B-1).

Additive

Light stabilizer: Adeka Stab LA77Y manufactured by ADEKA Corporation

Ultraviolet absorber: Sumisorb 200 manufactured by manufactured by Sumitomo Chemical Co., Ltd.

Preparation of Sample

Pellet samples were each produced by mixing a graft copolymer (A), a copolymer (B), and additives shown in Table 1 and then melting and kneading the mixture with a 40-mm twin-screw extruder at 240° C. The resulting pellet samples were molded with an injection molding machine set at 250° C. The resulting molded articles were evaluated for physical properties. The results are shown in Table 1.

The evaluations were performed as follows.

Impact Resistance

Test pieces were molded from the pellet samples prepared in Examples and Comparative Examples in accordance with ISO Test Method 294 and were applied to measurement of impact resistance. The impact resistance was determined by measuring the notched Charpy impact value (unit: $kJ/m^2$) at a thickness of 4 mm in accordance with ISO179. The results are shown in Table 1. The impact resistance was evaluated at 23° C. unless otherwise specified.

Fluidity

The pellet samples prepared in Examples and Comparative Examples were subjected to measurement of melt volume flow rate (unit: $cm^3/10$ min) in accordance with ISO1133 at 220° C. under a load of 10 kg. The results are shown in Table 1.

Color Developing Property

Color developing property was evaluated using molded articles (60 mm×60 mm×2 mm) produced from the pellet samples prepared in Examples and Comparative Examples with an injection molding machine (J-150EP manufactured by The Japan Steel Works, Ltd., cylinder temperature: 230° C., die temperature: 60° C.). The color developing property of each molded article was determined based on the hue difference between the hues of the molded article on a white back and a black back measured in accordance with JIS-Z8729 (a larger value means better color developing property). The results are shown in Table 1. The spectrophotometer used was CMS-35SP manufactured by Murakami Color Research Laboratory.

Weather Resistance

Weather resistance was evaluated using molded articles (90 mm×55 mm×2.5 mm) produced from the pellet samples prepared in Examples and Comparative Examples with an injection molding machine (SAV-30-30 manufactured by Sanjo Seiki Co., Ltd., cylinder temperature: 210° C., die temperature: 50° C.). An accelerated weathering test was performed with a sunshine super long life weather meter, WEL-SUN-HCH-B, manufactured by Suga Test Instruments Co., Ltd. at 63° C. under rain for 500 hours. Colors before and after the exposure were measured with a colorimeter, and the color difference (ΔE) was determined (a smaller difference means higher weather resistance). The results are shown in Table 1.

TABLE 1

|  |  | Example | | | | | | | | Comparative Example | | | | | | |
|---|---|---|---|---|---|---|---|---|---|---|---|---|---|---|---|---|
|  |  | 1-1 | 1-2 | 1-3 | 1-4 | 1-5 | 1-6 | 1-7 | 1-8 | 1-1 | 1-2 | 1-3 | 1-4 | 1-5 | 1-6 | 1-7 |
| Graft copolymer (A) | A-1-1 | 20 | 30 | 50 | | | | | | | | | | | | |
|  | A-1-2 | | | | 30 | | | | | | | | | | | |
|  | A-1-3 | | | | | 30 | 50 | | | | | | | | | |
|  | A-1-4 | | | | | | | 20 | 30 | | | | | | | |
|  | A-1-5 | | | | | | | | | 30 | | | | | | |
|  | A-1-6 | | | | | | | | | | 30 | 20 | | | | |
|  | A-1-7 | | | | | | | | | | | | 30 | 60 | | |
|  | A-1-8 | | | | | | | | | | | | | | 30 | |
|  | A-1-9 | | | | | | | | | | | | | | | 30 |
| Copolymer (B-1) | | 80 | 70 | 50 | 70 | 70 | 50 | 80 | 70 | 70 | 70 | 80 | 70 | 50 | 70 | 70 |
| Light stabilizer | | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Physical properties | Impact resistance | 8 | 13 | 21 | 14 | 11 | 19 | 8 | 12 | 8 | 6 | 4 | 5 | 13 | 22 | 13 |
|  | Fluidity | 24 | 17 | 9 | 19 | 16 | 8 | 26 | 17 | 16 | 16 | 25 | 19 | 10 | 17 | 18 |
|  | Color developing property | 12.3 | 9.1 | 7.1 | 8.3 | 10.7 | 8.5 | 12.5 | 9.0 | 7.8 | 7.4 | 9.7 | 6.7 | 5.5 | 20.2 | 9.3 |
|  | Weather resistance (color difference) | 4.2 | 4.4 | 4.7 | 3.8 | 4.6 | 4.9 | 4.0 | 4.3 | 6.5 | 7.0 | 6.0 | 5.8 | 6.2 | 10.3 | 8.3 |

As shown in Table 1, the thermoplastic resin compositions of Examples 1-1 to 1-8 according to the present invention exhibit excellent weather resistance, impact resistance, fluidity, and color developing properties.

As shown in Table 1, the thermoplastic resin compositions of Comparative Examples 1-1 to 1-5 containing composite rubbers each having a tetrahydrofuran-soluble portion having a weight-average molecular weight and/or a degree of swelling outside the specified ranges exhibit poor balances between the impact resistance, color developing properties, and weather resistance. The composition of Comparative Example 1-6 containing an ABS resin as the graft copolymer exhibits insufficient weather resistance. The composition of Comparative Example 1-7 not containing a conjugated diene rubber polymer or acrylic ester polymer as the composite rubber exhibits insufficient weather resistance.

A thermoplastic resin composition having excellent weather resistance does not discolor even under severe conditions and can maintain fine appearance. Such a composition is therefore believed to have high versatility for, in particular, exterior parts for vehicles and outdoor products. This consideration, however, should not restrict the present invention.

Examples 2-1 to 2-10 and Comparative Examples 2-1 to 2-4

The styrene-butadiene rubber latex having a small particle diameter, the agglomerated styrene-butadiene rubber latexes (1) and (2), and the cross-linked butyl acrylate rubber latex were the same as those used in Examples 1-1 to 1-8 and Comparative Examples 1-1 to 1-7.

Composite rubbers (a-2-1) to (a-2-8) were produced as follows. The compositions of these composite rubbers are summarized in Table 2.

TABLE 2

|  |  | Composite rubber (a) | | | | | | | |
|---|---|---|---|---|---|---|---|---|---|
|  |  | a-2-1 | a-2-2 | a-2-3 | a-2-4 | a-2-5 | a-2-6 | a-2-7 | a-2-8 |
| Conjugated diene rubber | Agglomerated rubber polymer (1) | 20 | 10 | 30 | | 20 | 20 | 20 | 20 |
|  | Agglomerated rubber polymer (2) | | | | 20 | | | | |
| Butyl acrylate | | 80 | 90 | 70 | 80 | 80 | 80 | 80 | 80 |
| Rate (%) of number of particles having particle diameter of 150 nm or less | | 9 | 13 | 4 | 7 | 30 | 40 | 55 | 90 |

Production of Composite Rubber (a-2-1)

A 10-L glass reactor was charged with 20 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 20 parts by weight of butyl acrylate and 0.1 parts by weight of allyl methacrylate were added. The inner temperature of the tank was increased to 50° C., and the mixture was retained at this temperature for 1 hour. Subsequently, an aqueous solution prepared by dissolving 0.9 parts by weight of dipotassium alkenylsuccinate and 0.1 parts by weight of tertiary-butyl hydroperoxide in 25 parts by weight of deionized water, 60 parts by weight of butyl acrylate, and 0.4 parts by weight of allyl methacrylate were successively dropwise added to the reaction mixture over 5 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-2)

A 10-L glass reactor was charged with 10 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 15 parts by weight of butyl acrylate and 0.1 parts by weight of allyl methacrylate were added. The inner temperature of the tank was increased to 50° C., and the mixture was retained at this temperature for 1 hour. Subsequently, an aqueous solution prepared by dissolving 0.9 parts by weight of dipotassium alkenylsuccinate and 0.1 parts by weight of tertiary-butyl hydroperoxide in 25 parts by weight of deionized water, 75 parts by weight of butyl acrylate, and 0.46 parts by weight of allyl methacrylate were successively dropwise added to the reaction mixture over 6 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-3)

A 10-L glass reactor was charged with 30 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 25 parts by weight of butyl acrylate and 0.2 parts by weight of allyl methacrylate were added. The inner temperature of the tank was increased to 50° C., and the mixture was retained at this temperature for 1 hour. Subsequently, an aqueous solution prepared by dissolving 0.9 parts by weight of dipotassium alkenylsuccinate and 0.075 parts by weight of tertiary-butyl hydroperoxide in 25 parts by weight of deionized water, 45 parts by weight of butyl acrylate, and 0.24 parts by weight of allyl methacrylate were successively dropwise added to the reaction mixture over 3 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-4)

A 10-L glass reactor was charged with 20 parts by weight (solid content) of the agglomerated styrene-butadiene rubber latex (2) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 20 parts by weight of butyl acrylate and 0.1 parts by weight of allyl methacrylate were added. The inner temperature of the tank was increased to 50° C., and the mixture was retained at this temperature for 1 hour. Subsequently, an aqueous solution prepared by dissolving 0.9 parts by weight of dipotassium alkenylsuccinate and 0.1 parts by weight of tertiary-butyl hydroperoxide in 25 parts by weight of deionized water, 60 parts by weight of butyl acrylate, and 0.4 parts by weight of allyl methacrylate were successively dropwise added to the reaction mixture over 5 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-5)

A 10-L glass reactor was charged with 20 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 5% of an emulsifier solution prepared by dissolving 0.9 parts by weight of dipotassium alkenylsuccinate and 0.1 parts by weight of tertiary-butyl hydroperoxide in 25 parts by weight of deionized water, 16 parts by weight of butyl acrylate, and 0.1 parts by weight of allyl methacrylate were added. The inner temperature of the tank was increased to 50° C., and the mixture was retained at this temperature for 1 hour. Subsequently, the remaining emulsifier solution, 64 parts by weight of butyl acrylate, and 0.4 parts by weight of allyl methacrylate were successively dropwise added to the reaction mixture over 5 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-6)

A 10-L glass reactor was charged with 20 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 10% of an emulsifier solution prepared by dissolving 0.9 parts by weight of dipotassium alkenylsuccinate and 0.1 parts by weight of tertiary-butyl hydroperoxide in 25 parts by weight of deionized water, 16 parts by weight of butyl acrylate, and 0.1 parts by weight of allyl methacrylate were added. The inner temperature of the tank was increased to 50° C., and the mixture was retained at this temperature for 1 hour. Subsequently, the remaining emulsifier solution, 64 parts by weight of butyl acrylate, and 0.4 parts by weight of allyl methacrylate were successively dropwise added to the reaction mixture over 5 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-7)

A 10-L glass reactor was charged with 20 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 20% of an emulsifier solution prepared by dissolving 0.9 parts by weight of dipotassium alkenylsuccinate and 0.1 parts by weight of tertiary-butyl hydroperoxide in 25 parts by weight of deionized water, 16 parts by weight of butyl acrylate, and 0.1 parts by weight of allyl methacrylate were added. The inner temperature of the tank was increased to 50° C., and the mixture was retained at this temperature for 1 hour. Subsequently, the remaining emulsifier solution, 64 parts by weight of butyl acrylate, and 0.4 parts by weight of allyl methacrylate were successively dropwise added to the reaction mixture over 5 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Production of Composite Rubber (a-2-8)

A 10-L glass reactor was charged with 20 parts by weight (solid content) of the agglomerated styrene-butadiene rubber latex (1) and 160 parts by weight of deionized water, followed by nitrogen purging. The inner temperature of the nitrogen-purged tank was increased to 45° C., and then an aqueous solution prepared by dissolving 0.2 parts by weight of glucose, 0.03 parts by weight of sodium pyrophosphate dehydrate, and 0.001 parts by weight of ferrous sulfate in 20 parts by weight of deionized water was added to the container. Furthermore, 40% of an emulsifier solution prepared by dissolving 0.9 parts by weight of dipotassium alkenylsuccinate and 0.1 parts by weight of tertiary-butyl hydroperoxide in 25 parts by weight of deionized water, 16 parts by weight of butyl acrylate, and 0.1 parts by weight of allyl methacrylate were added. The inner temperature of the tank was increased to 50° C., and the mixture was retained at this temperature for 1 hour. Subsequently, the remaining emulsifier solution, 64 parts by weight of butyl acrylate, and 0.4 parts by weight of allyl methacrylate were successively dropwise added to the reaction mixture over 5 hours while the temperature was being maintained at 50° C. After the dropping, the reaction mixture was retained at 50° C. for 3 hours to yield a composite rubber latex composed of an enlarged styrene-butadiene rubber and a cross-linked butyl acrylate polymer.

Graft copolymers (A-2-1) to (A-2-10) were produced as follows. The compositions of these graft copolymers (A) are summarized in Table 3.

Production of Graft Copolymer (A-2-1)

A glass reactor was charged with 60 parts by weight (solid content) of the composite rubber latex (a-2-1), followed by nitrogen purging. The inner temperature of the nitrogen-purged tank was increased to 60° C., and then an aqueous solution prepared by dissolving 0.2 parts by weight of glucose, 0.1 parts by weight of sodium pyrophosphate dehydrate, and 0.005 parts by weight of ferrous sulfate in 10 parts by weight of deionized water was added to the container, followed by heating to 65° C. Subsequently, a liquid mixture composed of 12 parts by weight of acrylonitrile, 28 parts by weight of styrene, 0.1 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 5 hours. After the dropping, the reaction mixture was retained for 3 hours to yield a graft copolymer latex (A-2-1), which was then salted out, dehydrated, and dried into a powdered graft polymer (A-2-1).

Production of Graft Copolymers (A-2-2) to (A-2-8)

Graft copolymer latexes (A-2-2) to (A-2-8) were prepared as in graft copolymer (A-2-1) except that composite rubbers (a-2-2) to (a-2-8) were respectively used instead of the composite rubber latex (a-2-1) and were then salted out, dehydrated, and dried into powdered graft polymers (A-2-2) to (A-2-8).

Production of Graft Copolymer (A-2-9)

A glass reactor was charged with 60 parts by weight in terms of solid content of the agglomerated styrene-butadiene rubber latex (1), followed by nitrogen purging. The inner temperature of the nitrogen-purged tank was increased to 60° C., and then an aqueous solution prepared by dissolving 0.2 parts by weight of glucose, 0.1 parts by weight of sodium pyrophosphate dehydrate, and 0.005 parts by weight of ferrous sulfate in 10 parts by weight of deionized water was added to the container, followed by heating to 65° C. Subsequently, a liquid mixture composed of 12 parts by weight of acrylonitrile, 28 parts by weight of styrene, 0.1 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained for 3 hours to yield a graft copolymer latex (A-2-9), which was then salted out, dehydrated, and dried into a powdered graft polymer (A-2-9).

TABLE 3

|  |  | Graft copolymer (A) | | | | | | | | | |
|---|---|---|---|---|---|---|---|---|---|---|---|
|  |  | A-2-1 | A-2-2 | A-2-3 | A-2-4 | A-2-5 | A-2-6 | A-2-7 | A-2-8 | A-2-9 | A-2-10 |
| Composite | a-2-1 | 60 | | | | | | | | | |
| rubber | a-2-2 | | 60 | | | | | | | | |
| (a1) | a-2-3 | | | 60 | | | | | | | |
|  | a-2-4 | | | | 60 | | | | | | |
|  | a-2-5 | | | | | 60 | | | | | |
|  | a-2-6 | | | | | | 60 | | | | |
|  | a-2-7 | | | | | | | 60 | | | |
|  | a-2-8 | | | | | | | | 60 | | |
| Agglomerated rubber polymer (1) | | | | | | | | | | 60 | 15 |
| Monomer | BA rubber | | | | | | | | | | 45 |
| (a2) | Styrene | 28 | 28 | 28 | 28 | 28 | 28 | 28 | 28 | 28 | 28 |
|  | Nitrile | 12 | 12 | 12 | 12 | 12 | 12 | 12 | 12 | 12 | 12 |

Production of Graft Copolymer (A-2-10)

A glass reactor was charged with 15 parts by weight in terms of solid content of the agglomerated styrene-butadiene rubber latex (1) and 45 parts by weight in terms of solid content of the cross-linked butyl acrylate rubber latex, followed by nitrogen purging. The inner temperature of the nitrogen-purged tank was increased to 60° C., and then an aqueous solution prepared by dissolving 0.2 parts by weight of glucose, 0.1 parts by weight of sodium pyrophosphate dehydrate, and 0.005 parts by weight of ferrous sulfate in 10 parts by weight of deionized water was added to the container, followed by heating to 65° C. Subsequently, a liquid mixture composed of 12 parts by weight of acrylonitrile, 28 parts by weight of styrene, 0.1 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained for 3 hours to yield a graft copolymer latex (A-2-10), which was then salted out, dehydrated, and dried into a powdered graft polymer (A-2-10).

Production of Copolymer (B-2)

A copolymer (B) composed of 70 parts by weight of styrene and 30 parts by weight of acrylonitrile was prepared by a known block polymerization process. The reduced viscosity of the resulting copolymer (B-2) was measured by the above-described method. The reduced viscosity was 0.60 dl/g.

Additive

The light stabilizer and the ultraviolet absorber were the same as those described above.

Preparation of Sample

Pellet samples of the thermoplastic resin compositions in Examples 2-1 to 2-10 and Comparative Examples 2-1 to 2-4 were each produced by mixing a graft copolymer (A), a copolymer (B), and additives shown in Table 4 and then melting and kneading the mixture with a 40-mm twin-screw extruder at 240° C. The resulting pellet samples were molded with an injection molding machine set at 250° C. The resulting molded articles were evaluated for physical properties. The evaluations were performed as follows.

The pellet samples were cut into ultrathin sections with a cryomicrotome at a low temperature of −85° C. The sections were stained with ruthenium tetraoxide ($RuO_4$) and were observed and photographed with a transmission electron microscope (JEM-1400, manufactured by JEOL Ltd.). The areas of 1000 particles were measured with an image processor (IP-1000PC manufactured by Asahi Kasei Corporation). The equivalent-circle sizes (diameters) were determined, and the proportion of composite rubber particles having a diameter of 150 nm or less was calculated. The results are shown in Table 4.

The impact resistance, fluidity, and weather resistance were evaluated by the same methods as in Examples 1-1 to 1-8 and Comparative Examples 1-1 to 1-7, and the residence heat stability was evaluated by the following method. The results are shown in Table 4.

Residence Heat Stability

Each of the pellet samples produced in Examples and Comparative Examples was allowed to stay in the cylinder of an injection molding machine set at 260° C. for 0 min or 20 min and was then molded into a plate. The gloss of the plate was measured to calculate the gloss retention. Gloss retention=(gloss of the plate molded after staying for 20 min/gloss of the plate without staying)×100

TABLE 4

| | | Example | | | | | | | | | | Comparative Example | | | |
|---|---|---|---|---|---|---|---|---|---|---|---|---|---|---|---|
| | | 2-1 | 2-2 | 2-3 | 2-4 | 2-5 | 2-6 | 2-7 | 2-8 | 2-9 | 2-10 | 2-1 | 2-2 | 2-3 | 2-4 |
| Graft copolymer (A) | A-2-1 | 15 | 25 | 45 | | | | | | | | | | | |
| | A-2-2 | | | | 25 | | | | | | | | | | |
| | A-2-3 | | | | | 25 | 45 | | | | | | | | |
| | A-2-4 | | | | | | | 15 | 25 | | | | | | |
| | A-2-5 | | | | | | | | | 25 | | | | | |
| | A-2-6 | | | | | | | | | | 25 | | | | |
| | A-2-7 | | | | | | | | | | | 25 | | | |
| | A-2-8 | | | | | | | | | | | | 25 | | |
| | A-2-9 | | | | | | | | | | | | | 25 | |
| | A-2-10 | | | | | | | | | | | | | | 25 |
| Copolymer (B-2) | | 85 | 75 | 55 | 75 | 75 | 55 | 85 | 75 | 75 | 75 | 75 | 75 | 75 | 75 |
| Light stabilizer | | 0.4 | 0.4 | 0.4 | 0.4 | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 | 0.1 | 0.1 | 0.1 | 0.1 |
| Rate (%) of number of particles having particle diameter of 150 nm or less | | 9 | 9 | 9 | 13 | 4 | 4 | 7 | 7 | 30 | 40 | 55 | 90 | 3 | 5 |
| Physical properties | Impact resistance | 7 | 10 | 18 | 11 | 8 | 16 | 7 | 10 | 9 | 9 | 8 | 7 | 21 | 12 |
| | Fluidity | 26 | 20 | 11 | 20 | 18 | 10 | 27 | 21 | 19 | 18 | 18 | 17 | 16 | 17 |
| | Residence heat stability | 94 | 94 | 94 | 92 | 97 | 97 | 95 | 95 | 90 | 86 | 77 | 67 | 97 | 96 |
| | Weather resistance (color difference) | 4.3 | 4.4 | 4.8 | 3.8 | 4.6 | 5.0 | 4.1 | 4.2 | 4.1 | 4.1 | 4.4 | 4.3 | 10.3 | 8.3 |

As shown in Table 4, the thermoplastic resin compositions of Examples 2-1 to 2-10 according to the present invention exhibit excellent weather resistance, impact resistance, fluidity, and residence heat stability. The compositions of Examples 2-1 to 2-3 and 2-5 to 2-8 each containing composite rubber particles having an equivalent-circle diameter of 150 nm or less in an amount of 10% or less exhibit particularly excellent residence heat stability.

As shown in Table 4, the thermoplastic resin compositions of Comparative Examples 2-1 and 2-2 each containing composite rubber particles having an equivalent-circle diameter of 150 nm or less in an amount exceeding 50% exhibit insufficient residence heat stability. The composition of Comparative Example 2-3 containing an ABS resin as the graft copolymer exhibits insufficient weather resistance. The composition of Comparative Example 2-4 not containing a conjugated diene rubber polymer or acrylic ester polymer as the composite rubber exhibits insufficient weather resistance.

Examples 3-1 to 3-7 and Comparative Examples 3-1 to 3-5

Pellet samples were each produced by preparing a graft copolymer (A) using a composite rubber shown in Table 5, mixing a graft copolymer (A), a copolymer (B), and additives at proportions shown in Table 6, and then melting and kneading the mixture with a 40-mm twin-screw extruder at 240° C. The resulting pellet samples were molded with an injection molding machine at 240° C. The components shown in Tables 5 and 6 are as follows.
Production of Conjugated Diene Rubber Polymer Latex
Production of Styrene-Butadiene Rubber Latex Having Small Particle Diameter
A 10-L pressure resistant container was purged with nitrogen and was then charged with 97 parts by weight of 1,3-butadiene, 3 parts by weight of styrene, 0.45 parts by weight of n-dodecyl mercaptan, 0.3 parts by weight of potassium persulfate, 1.85 parts by weight of disproportionated sodium rosinate, 0.1 parts by weight of sodium hydroxide, and 155 parts by weight of deionized water, followed by a reaction with stirring at 70° C. for 8 hours. Subsequently, 0.21 parts by weight of disproportionated sodium rosinate, 0.1 parts by weight of sodium hydroxide, and 5 parts by weight of deionized water were added to the reaction mixture. The resulting mixture was further stirred for 6 hours while the temperature was being maintained at 70° C., and then the reaction was stopped. The remaining 1,3-butadiene was removed by reducing the pressure to yield a styrene-butadiene rubber latex. The weight-average particle diameter of the styrene-butadiene rubber was calculated by the same method described above except that the areas of 800 rubber particles were measured. The weight-average particle diameter was 105 nm.
Production of Agglomerated Styrene-Butadiene Rubber Latex (3-1)
A 10-L pressure resistant container was filled with 185 parts by weight of polywater, 100 parts by weight (solid content) of the styrene-butadiene rubber latex having a small particle diameter, and 0.02 parts by weight of sodium dodecylbenzenesulfonate, followed by stirring for 10 minutes. Subsequently, 20 parts by weight of a 5% aqueous phosphoric acid solution was added to the mixture over 10 minutes, and 10 parts by weight of a 10% aqueous potassium hydroxide solution was then added to the mixture to yield an agglomerated styrene-butadiene rubber latex (3-1). The weight-average particle diameter of the styrene-butadiene rubber was calculated by the same method described above except that the areas of 800 rubber particles were measured. The weight-average particle diameter was 450 nm.
Production of Agglomerated Styrene-Butadiene Rubber Latex (3-2)
A 10-L pressure resistant container was filled with 185 parts by weight of polywater, 100 parts by weight (solid content) of the styrene-butadiene rubber latex having a small particle diameter, and 0.05 parts by weight of sodium dodecylbenzenesulfonate, followed by stirring for 10 minutes. Subsequently, 20 parts by weight of a 5% aqueous phosphoric acid solution was added to the mixture over 10 minutes, and 10 parts by weight of a 10% aqueous potassium hydroxide solution was then added to the mixture to yield an agglomerated styrene-butadiene rubber latex (3-2). The weight-average particle diameter of the styrene-butadiene rubber was calculated by the same method described above except that the areas of 800 rubber particles were measured. The weight-average particle diameter was 233 nm.
Production of Non-Agglomerated Styrene-Butadiene Rubber Latex (3-3)
A 10-L pressure resistant container was purged with nitrogen and was then charged with 90 parts by weight of 1,3-butadiene, 10 parts by weight of styrene, 0.3 parts by weight of n-dodecyl mercaptan, 0.31 parts by weight of potassium persulfate, 0.20 parts by weight of disproportionated sodium rosinate, 0.10 parts by weight of sodium hydroxide, and 73 parts by weight of deionized water, followed by stirring at 65° C. for reaction. Furthermore, 0.35 parts by weight of disproportionated sodium rosinate, 0.10 parts by weight of sodium hydroxide, and 7.5 parts by weight of deionized water were added to the mixture at 10, 20, 30, and 40 hours from the start of the reaction, and the reaction was continued for 45 hours in total. Subsequently, 0.2 parts by weight of disproportionated sodium rosinate, 0.1 parts by weight of sodium hydroxide, and 5 parts by weight of deionized water were added to the reaction mixture. The resulting mixture was further stirred for 7 hours while the temperature was being maintained at 70° C., and then the reaction was stopped. The remaining 1,3-butadiene was removed by reducing the pressure to yield a non-agglomerated styrene-butadiene rubber latex (3-3). The weight-average particle diameter of the styrene-butadiene rubber was calculated by the same method described above except that the areas of 800 rubber particles were measured. The weight-average particle diameter was 420 nm.
Production of Composite Rubber
Production of Composite Rubber (a-3-1)
A 10-L glass reactor was charged with 20 parts by weight (solid content) of the agglomerated styrene-butadiene rubber latex (3-1) and 100 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 30 parts by weight of butyl acrylate and 0.1 parts by weight of allyl methacrylate were added. The inner temperature of the tank was increased to 48° C., and the mixture was retained at this temperature for 1 hour. Furthermore, the inner temperature of the tank was increased to 50° C., and first stage polymerization was performed by adding 0.2 parts by weight of cumene hydroperoxide at once to the mixture and then successively dropwise adding an aqueous solution prepared by dissolving 0.9 parts by weight of dipotassium alkenylsuccinate and 0.08 parts by weight of sodium formaldehyde sulfoxylate in 20 parts by weight of deionized water, 30 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.04 parts by weight of sodium formaldehyde sulfoxylate at once to the reaction mixture and then successively dropwise adding an aqueous solution prepared by dissolving 0.4 parts by weight of potassium persulfate in 20 parts by weight of deionized water, 20 parts by weight of butyl acrylate, and 0.05 parts by weight of allyl methacrylate over 4 hours. After the dropping, the polymerization was stopped when the conversion rate reached 97% or more to yield a composite rubber latex (a-3-1) composed of an agglomerated styrene-butadiene rubber (3-1) and a cross-linked butyl acrylate polymer.

The thickness of the outer layer of the composite rubber (a-3-1) was measured by the following method. A pellet of the thermoplastic resin composition having composition proportion shown in Example 1 in Table 6 was cut with a cryomicrotome at a low temperature of −85° C. into a ultrathin section. The ultrathin section was stained with ruthenium tetraoxide ($RuO_4$) and was observed and photographed with a transmission electron microscope (JEM-1400, manufactured by JEOL Ltd.). In the photograph, the boundary between an outer layer and an inner layer of a composite rubber particle is observed as deep color. Accordingly, the equivalent-circle size (radius) of a composite rubber particle was determined by measuring the area including the outer layer of each composite rubber particle with an image processor (IP-1000PC manufactured by Asahi Kasei Corporation), and the equivalent-circle size (radium) of the inner layer portion excluding the outer layer of each particle was similarly determined. The difference between both radii refers to the thickness of the outer layer. In the present invention, 15 or more composite rubber particles were measured to determine the average thickness of the outer layer. The results of image analysis demonstrate that the outer layer of the composite rubber (a-3-1) had an average thickness of 48 nm.

Production of Composite Rubber (a-3-2)

A 10-L glass reactor was charged with 20 parts by weight (solid content) of the agglomerated styrene-butadiene rubber latex (1) and 100 parts by weight of deionized water, followed by nitrogen purging. The inner temperature of the nitrogen-purged tank was increased to 45° C., and then an aqueous solution prepared by dissolving 0.35 parts by weight of lactose, 0.09 parts by weight of tetrasodium pyrophosphate, 0.003 parts by weight of ferrous sulfate heptahydrate, and 0.001 parts by weight of sodium β-naphthalenesulfonate formalin condensate in 20 parts by weight of deionized water was added to the container. Furthermore, 20 parts by weight of butyl acrylate and 0.1 parts by weight of allyl methacrylate were added. The inner temperature of the tank was increased to 48° C., and the mixture was retained at this temperature for 0.5 hours. Furthermore, the inner temperature of the tank was increased to 50° C., and first stage polymerization was performed by adding 0.15 parts by weight of cumene hydroperoxide at once to the mixture and then successively dropwise adding an aqueous solution prepared by dissolving 0.9 parts by weight of dipotassium alkonylsuccinate and 0.08 parts by weight of sodium formaldehyde sulfoxylate in 20 parts by weight of deionized water, 25 parts by weight of butyl acrylate, and 0.1 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.05 parts by weight of sodium formaldehyde sulfoxylate at once to the reaction mixture and then successively dropwise adding an aqueous solution prepared by dissolving 0.5 parts by weight of potassium persulfate in 20 parts by weight of deionized water, 35 parts by weight of butyl acrylate, and 0.15 parts by weight of allyl methacrylate over 4 hours. After the dropping, the polymerization was stopped when the conversion rate reached 97% or more to yield a composite rubber latex (a-3-2) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Example 3-4 of Table 6 was used. The average thickness of the outer layer was 82 nm.

Production of Composite Rubber (a-3-3)

A 10-L glass reactor was charged with 48 parts by weight (solid content) of the agglomerated styrene-butadiene rubber latex (3-1) and 100 parts by weight of deionized water, followed by nitrogen purging. The inner temperature of the nitrogen-purged tank was increased to 45° C., and then an aqueous solution prepared by dissolving 0.35 parts by weight of lactose, 0.09 parts by weight of tetrasodium pyrophosphate, and 0.003 parts by weight of ferrous sulfate heptahydrate in 20 parts by weight of deionized water was added to the container. Furthermore, 22 parts by weight of butyl acrylate and 0.05 parts by weight of allyl methacrylate were added. The inner temperature of the tank was increased to 48° C., and the mixture was retained at this temperature for 1 hour. Furthermore, the inner temperature of the tank was increased to 52° C., and first stage polymerization was performed by adding 0.15 parts by weight of cumene hydroperoxide at once to the mixture and then successively dropwise adding an aqueous solution prepared by dissolving 0.45 parts by weight of dipotassium alkenylsuccinate and 0.08 parts by weight of sodium formaldehyde sulfoxylate in 19 parts by weight of deionized water, 20 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.02 parts by weight of sodium formaldehyde sulfoxylate at once to the reaction mixture and then successively dropwise adding an aqueous solution prepared by dissolving 0.1 parts by weight of t-butyl hydroperoxide and 0.25 parts by weight of dipotassium alkenylsuccinate in 20 parts by weight of deionized water, 10 parts by weight of butyl acrylate, and 0.01 parts by weight of allyl methacrylate over 5 hours. After the dropping, the polymerization was stopped when the conversion rate reached 97% or more to yield a composite rubber latex (a-3-3) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Example 3-5 of Table 6 was used. The average thickness of the outer layer was 10 nm.

Production of Composite Rubber (a-3-4)

A 10-L glass reactor was charged with 20 parts by weight (solid content) of the agglomerated styrene-butadiene rubber latex (3-2) and 100 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 30 parts by weight of butyl acrylate and 0.1 parts by weight of allyl methacrylate were added. The inner temperature of the tank was increased to 48° C., and the mixture was retained at this temperature for 1 hour. Furthermore, the inner temperature of the tank was increased to 50° C., and first stage polymerization was performed by adding 0.2 parts by weight of cumene hydroperoxide at once to the mixture and then successively dropwise adding an aqueous solution prepared by dissolving 0.55 parts by weight of dipotassium alkenylsuccinate and 0.08 parts by weight of sodium formaldehyde sulfoxylate in 20 parts by weight of deionized water, 30 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.04 parts by weight of sodium formaldehyde sulfoxylate at once to the reaction mixture and then successively dropwise adding an aqueous solution prepared by dissolving 0.25 parts by weight of t-butyl hydroperoxide and 0.35 parts by weight of dipotassium alkenylsuccinate in 20 parts by weight of deionized water, 20 parts by weight of butyl acrylate, and 0.05 parts by weight of allyl methacrylate over 4 hours. After the dropping, the polymerization was stopped when the conversion rate reached 97% or more to yield a composite rubber latex (a-3-4) composed of an agglomerated styrene-butadiene rubber (3-2) and a cross-linked butyl acrylate polymer. The average thickness of the outer layer was determined as in the composite rubber (a-3-1) except that a pellet of the thermoplastic resin composition having a composition proportion shown in Example 3-6 of Table 6 was used. The average thickness of the outer layer was 33 nm.

Production of Composite Rubber (a-3-5)

A 10-L glass reactor was charged with 20 parts by weight (solid content) of the agglomerated styrene-butadiene rubber latex (3-1) and 100 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 30 parts by weight of butyl acrylate and 0.1 parts by weight of allyl methacrylate were added. The inner temperature of the tank was increased to 48° C., and the mixture was retained at this temperature for 1 hour. Furthermore, the inner temperature of the tank was increased to 50° C., and first stage polymerization was performed by adding 0.2 parts by weight of potassium persulfate at once to the mixture and then successively dropwise adding an aqueous solution prepared by dissolving 0.9 parts by weight of dipotassium alkenylsuccinate and 0.08 parts by weight of sodium formaldehyde sulfoxylate in 20 parts by weight of deionized water, 30 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.04 parts by weight of sodium formaldehyde sulfoxylate at once to the reaction mixture and then successively dropwise adding an aqueous solution prepared by dissolving 0.65 parts by weight of potassium persulfate in 20 parts by weight of deionized water, 20 parts by weight of butyl acrylate, and 0.05 parts by weight of allyl methacrylate over 4 hours. After the dropping, the polymerization was stopped when the conversion rate reached 97% or more to yield a composite rubber latex (a-3-5) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Example 7 of Table 2 was used. The average thickness of the outer layer was 61 nm.

Production of Composite Rubber (a-3-6)

A composite rubber latex (a-3-6) was produced by polymerization as in production of composite rubber latex (a-3-1) except that a non-agglomerated styrene-butadiene latex (3-3) was used instead of the agglomerated styrene-butadiene rubber latex (3-1). The average thickness of the outer layer was determined as in the composite rubber (a-3-1) except that a pellet of the thermoplastic resin composition having a composition proportion shown in Comparative Example 3-1 of Table 6 was used. The average thickness of the outer layer was 44 nm.

Production of Composite Rubber (a-3-7)

A 10-L glass reactor was charged with 20 parts by weight (solid content) of the agglomerated styrene-butadiene rubber latex (3-1) and 110 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 50 parts by weight of butyl acrylate and 0.1 parts by weight of allyl methacrylate were added. The inner temperature of the tank was increased to 48° C., and the mixture was retained at this temperature for 2 hours. At the inner temperature of 48° C., first stage polymerization was performed by adding 0.4 parts by weight of cumene hydroperoxide at once to the mixture and then successively dropwise adding an aqueous solution prepared by dissolving 0.8 parts by weight of dipotassium alkenylsuccinate and 0.1 parts by weight of sodium formaldehyde sulfoxylate in 20 parts by weight of deionized water, 27 parts by weight of butyl acrylate, and 0.1 parts by weight of allyl methacrylate over 6 hours. After the dropping, the reaction mixture was retained for 3 hours, and then the first stage polymerization was stopped. Furthermore, the inner temperature of the tank was increased to 65° C., and second stage polymerization was performed by adding 0.4 parts by weight of cumene hydroperoxide at once to the reaction mixture and then successively dropwise adding an aqueous solution prepared by dissolving 0.025 parts by weight of sodium formaldehyde sulfoxylate and 0.1 parts by weight of dipotassium alkenylsuccinate in 10 parts by weight of deionized water and 3 parts by weight of butyl acrylate over 0.5 hours. After the dropping, the polymerization was stopped when the conversion rate reached 97% or more to yield a composite rubber latex (a-3-7) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Comparative Example 3-2 of Table 6 was used. The average thickness of the outer layer was 4 nm.

Production of Composite Rubber (a-3-8)

A 10-L glass reactor was charged with 20 parts by weight (solid content) of the agglomerated styrene-butadiene rubber latex (3-1) and 100 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 3 parts by weight of butyl acrylate and 0.05 parts by weight of allyl methacrylate were added. The inner temperature of the tank was increased to 48° C., and the mixture was retained at this temperature for 0.1 hours. Furthermore, the inner temperature of the tank was increased to 50° C., and first stage polymerization was performed by adding 0.2 parts by weight of potassium persulfate at once to the mixture and then successively dropwise adding an aqueous solution prepared by dissolving 0.9 parts by weight of dipotassium alkenylsuccinate and 0.08 parts by weight of sodium formaldehyde sulfoxylate in 20 parts by weight of deionized water, 30 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.05 parts by weight of sodium formaldehyde sulfoxylate at once to the reaction mixture and then successively dropwise adding an aqueous solution prepared by dissolving 0.65 parts by weight of potassium persulfate in 20 parts by weight of deionized water, 47 parts by weight of butyl acrylate, and 0.15 parts by weight of allyl methacrylate over 4 hours. After the dropping, the polymerization was stopped when the conversion rate reached 97% or more to yield a composite rubber latex (a-3-8) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Comparative Example 3-3 of Table 6 was used. The average thickness of the outer layer was 105 nm.

Production of Composite Rubber (a-3-9)

A 10-L glass reactor was charged with 60 parts by weight (solid content) of the agglomerated styrene-butadiene rubber latex (3-1) and 100 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 10 parts by weight of butyl acrylate and 0.1 parts by weight of allyl methacrylate were added. The inner temperature of the tank was increased to 48° C., and the mixture was retained at this temperature for 1 hour. Furthermore, the inner temperature of the tank was increased to 50° C., and first stage polymerization was performed by adding 0.2 parts by weight of cumene hydroperoxide at once to the mixture and then successively dropwise adding an aqueous solution prepared by dissolving 0.5 parts by weight of dipotassium alkenylsuccinate and 0.08 parts by weight of sodium formaldehyde sulfoxylate in 20 parts by weight of deionized water, 25 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.04 parts by weight of sodium formaldehyde sulfoxylate at once to the reaction mixture and then successively dropwise adding an aqueous solution prepared by dissolving 0.4 parts by weight of potassium persulfate in 20 parts by weight of deionized water, 5 parts by weight of butyl acrylate, and 0.05 parts by weight of allyl methacrylate over 0.5 hours. After the dropping, the polymerization was stopped when the conversion rate reached 97% or more to yield a composite rubber latex (a-3-9) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Comparative Example 3-4 of Table 6 was used. The average thickness of the outer layer was 10 nm.

Production of Composite Rubber (a-3-10)

A 10-L glass reactor was charged with 5 parts by weight (solid content) of the agglomerated styrene-butadiene rubber latex (3-1) and 100 parts by weight of deionized water, followed by nitrogen purging. The inner temperature of the nitrogen-purged tank was increased to 45° C., and then an aqueous solution prepared by dissolving 0.3 parts by weight of lactose, 0.08 parts by weight of tetrasodium pyrophosphate, and 0.001 parts by weight of ferrous sulfate heptahydrate in 20 parts by weight of deionized water was added to the container. Furthermore, 30 parts by weight of butyl acrylate and 0.1 parts by weight of allyl methacrylate were added. The inner temperature of the tank was increased to 48° C., and the mixture was retained at this temperature for 1 hour. Furthermore, the inner temperature of the tank was increased to 50° C., and first stage polymerization was performed by adding 0.2 parts by weight of cumene hydroperoxide at once to the mixture and then successively dropwise adding an aqueous solution prepared by dissolving 0.9 parts by weight of dipotassium alkenylsuccinate and 0.08 parts by weight of sodium formaldehyde sulfoxylate in 20 parts by weight of deionized water, 30 parts by weight of butyl acrylate, and 0.05 parts by weight of allyl methacrylate over 2 hours. After the dropping, the reaction mixture was retained for 1 hour, and then the first stage polymerization was stopped. Furthermore, the inner temperature of the tank was increased to 65° C., and second stage polymerization was performed by adding 0.04 parts by weight of sodium formaldehyde sulfoxylate at once to the reaction mixture and then successively dropwise adding an aqueous solution prepared by dissolving 0.4 parts by weight of potassium persulfate in 20 parts by weight of deionized water, 35 parts by weight of butyl acrylate, and 0.05 parts by weight of allyl methacrylate over 4 hours. After the dropping, the polymerization was stopped when the conversion rate reached 97% or more to yield a composite rubber latex (a-3-10) composed of an agglomerated styrene-butadiene rubber (3-1) and a cross-linked butyl acrylate polymer. The average thickness of the outer layer was determined as in the composite rubber (a-3-1) except that a pellet of the thermoplastic resin composition having a composition proportion shown in Comparative Example 3-5 of Table 6 was used. The average thickness of the outer layer was 110 nm.

TABLE 5

|  |  | Composite rubber | | | | | | | | | |
|---|---|---|---|---|---|---|---|---|---|---|---|
|  |  | a-3-1 | a-3-2 | a-3-3 | a-3-4 | a-3-5 | a-3-6 | a-3-7 | a-3-8 | a-3-9 | a-3-10 |
| Conjugated diene rubber polymer | Agglomerated rubber polymer (3-1) | 20 | 20 | 20 |  | 20 |  | 20 | 20 | 60 | 5 |
|  | Agglomerated rubber polymer (3-2) |  |  |  | 20 |  |  |  |  |  |  |
|  | Non-Agglomerated rubber polymer (3-3) |  |  |  |  |  | 20 |  |  |  |  |
| Butyl acrylate |  | 80 | 80 | 80 | 80 | 80 | 80 | 80 | 80 | 40 | 95 |
| Average thickness of outer layer (nm) |  | 48 | 82 | 10 | 33 | 61 | 44 | 4 | 105 | 10 | 110 |

Production of Graft Copolymer
Production of Graft Copolymer (A-3-1)

A glass reactor was charged with 45 parts by weight (solid content) of the composite rubber latex (a-3-1), followed by nitrogen purging. The inner temperature of the nitrogen-purged tank was increased to 63° C., and then an aqueous solution prepared by dissolving 1 part by weight of acrylonitrile, 3 parts by weight of styrene, 0.2 parts by weight of lactose, 0.1 parts by weight of sodium pyrophosphate dehydrate, and 0.005 parts by weight of ferrous sulfate in 15 parts by weight of deionized water was added to the container, followed by heating to 70° C. Subsequently, a liquid mixture composed of 15 parts by weight of acrylonitrile, 36 parts by weight of styrene, and 0.09 parts by weight of tertiary-dodecyl mercaptan and an aqueous emulsifier solution prepared by dissolving 1.0 parts by weight of potassium oleate and 0.18 parts by weight of cumene hydroperoxide in 20 parts by weight of deionized water were successively dropwise added to the container over 4 hours. After the dropping, the reaction mixture was retained for 3 hours to yield a graft copolymer latex (A-3-1), which was then salted out, dehydrated, and dried into a powdered graft polymer (A-3-1).

Production of Graft Copolymers (A-3-2) to (A-3-10)

Graft copolymer latexes (A-3-2) to (A-3-10) were produced as in graft copolymer (A-3-1) except that composite rubbers (a-3-2) to (a-3-10) were respectively used instead of the composite rubber latex (a-3-1) and were then salted out, dehydrated, and dried into powdered graft polymers (A-3-2) to (A-3-10).

Production Copolymer (B-3)

A nitrogen-purged glass reactor was charged with 149 parts by weight of deionized water, 7 parts by weight of styrene, 3 parts by weight of acrylonitrile, 0.03 parts by weight of tertiary-dodecyl mercaptan, 1.0 parts by weight of potassium oleate, and 0.3 parts by weight of potassium persulfate, followed by polymerization at 65° C. for 1 hour. Subsequently, 63 parts by weight of styrene, 27 parts by weight of acrylonitrile, 0.15 parts by weight of tertiary-dodecyl mercaptan, and 29 parts by weight of an aqueous emulsifier solution containing 1.5 parts by weight of potassium oleate were successively dropwise added to the reaction mixture over 3 hours. After the dropping, the reaction mixture was retained for 2 hours to yield a copolymer latex (B-3), which was then salted out, dehydrated, and dried into a powdered copolymer (B-3).

The light stabilizer and the ultraviolet absorber used were the same as those described above.

Preparation of Sample

Pellet samples of Examples 3-1 to 3-7 and Comparative Examples 3-1 to 3-5 were each produced by mixing a graft copolymer (A), a copolymer (B), and additives shown in Table 6 and then melting and kneading the mixture with a twin-screw extruder, Toshiba TEM-35B, at 240° C. The pellet sample of each Example and each Comparative Example was subjected to the following evaluation. The results are shown in Table 6.

The impact resistance (unit: kJ/m²), weather resistance, and color developing properties of the pellet sample prepared in each Example and each Comparative Example were measured as in above. The results are shown in Table 6.

TABLE 6

|  |  | Example | | | | | | | Comparative Example | | | | |
|---|---|---|---|---|---|---|---|---|---|---|---|---|---|
|  |  | 3-1 | 3-2 | 3-3 | 3-4 | 3-5 | 3-6 | 3-7 | 3-1 | 3-2 | 3-3 | 3-4 | 3-5 |
| Graft copolymer (A) | A-3-1 | 20 | 30 | 40 |  |  |  |  |  |  |  |  |  |
|  | A-3-2 |  |  |  | 30 |  |  |  |  |  |  |  |  |
|  | A-3-3 |  |  |  |  | 30 |  |  |  |  |  |  |  |
|  | A-3-4 |  |  |  |  |  | 30 |  |  |  |  |  |  |
|  | A-3-5 |  |  |  |  |  |  | 20 |  |  |  |  |  |
|  | A-3-6 |  |  |  |  |  |  |  | 20 |  |  |  |  |
|  | A-3-7 |  |  |  |  |  |  |  |  | 30 |  |  |  |
|  | A-3-8 |  |  |  |  |  |  |  |  |  | 30 |  |  |
|  | A-3-9 |  |  |  |  |  |  |  |  |  |  | 30 |  |
|  | A-3-10 |  |  |  |  |  |  |  |  |  |  |  | 30 |
| Copolymer (B-3) |  | 80 | 70 | 60 | 70 | 70 | 70 | 80 | 80 | 70 | 70 | 70 | 70 |
| Light stabilizer |  | 0.4 | 0.4 | 0.4 | 0.4 | 0.4 | 0.4 | 0.4 | 0.4 | 0.4 | 0.4 | 0.4 | 0.4 |
| Ultraviolet absorber |  | 0.1 | 0.1 | 0.1 | 0.1 | 0.1 | 0.1 | 0.1 | 0.1 | 0.1 | 0.1 | 0.1 | 0.1 |

TABLE 6-continued

|  |  | Example | | | | | | | Comparative Example | | | | |
|---|---|---|---|---|---|---|---|---|---|---|---|---|---|
|  |  | 3-1 | 3-2 | 3-3 | 3-4 | 3-5 | 3-6 | 3-7 | 3-1 | 3-2 | 3-3 | 3-4 | 3-5 |
| Physical properties | Impact resistance | 10 | 13 | 18 | 14 | 15 | 14 | 10 | 7 | 10 | 11 | 10 | 4.8 |
|  | Weather resistance (color difference) | 4.3 | 4.7 | 5.5 | 4.5 | 4.9 | 4.5 | 4.4 | 4.5 | 10.3 | 4.2 | 10.9 | 4.4 |
|  | Color developing property | 12.3 | 10.8 | 8.1 | 9.1 | 8.1 | 8.3 | 11.9 | 5.5 | 8.9 | 5.6 | 6.9 | 5.2 |

As shown in Table 6, the thermoplastic resin compositions of Examples 3-1 to 3-7 according to the present invention exhibit excellent weather resistance, impact resistance, and color developing properties.

As shown in Table 6, the thermoplastic resin composition of Comparative Example 3-1 containing a composite rubber having an inner layer formed of a single type of particles of a conjugated diene rubber polymer exhibits insufficient impact resistance and color developing properties. The composition of Comparative Example 3-2 containing composite rubber particles having outer layers having an average thickness of 4 nm exhibits insufficient weather resistance. The composition of Comparative Example 3-3 containing composite rubber particles having outer layers having an average thickness exceeding 100 nm exhibits insufficient color developing properties. The composition of Comparative Example 3-4 containing a composite rubber including 60% by weight of a conjugated diene rubber polymer exhibits insufficient weather resistance. The composition in Comparative Example 3-5 containing a composite rubber including 5% by weight of a conjugated diene rubber polymer exhibits insufficient impact resistance and color developing properties.

Examples 4-1 to 4-5 and Comparative Examples 4-1 to 4-7

Production of Composite Rubber (a-4-1)

A 10-L glass reactor was charged with 30 parts by weight (solid content) of the agglomerated styrene-butadiene rubber latex (2) and 140 parts by weight of deionized water, followed by nitrogen purging. The inner temperature of the nitrogen-purged tank was increased to 35° C., and then an aqueous solution prepared by dissolving 0.05 parts by weight of sodium formaldehyde sulfoxylate, 0.01 parts by weight of sodium ethylenediaminetetraacetate, and 0.001 parts by weight of ferrous sulfate in 20 parts by weight of deionized water was added to the container. Furthermore, 16 parts by weight of butyl acrylate and 0.1 parts by weight of allyl methacrylate were added. The inner temperature of the tank was increased to 40° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 54 parts by weight of butyl acrylate, and 0.34 parts by weight of allyl methacrylate were successively dropwise added to the reaction mixture over 3 hours while the temperature was being maintained at 40° C. After the dropping, the reaction mixture was retained at 40° C. for 3 hours to yield a composite rubber latex (a-4-1). The tetrahydrofuran-soluble portion of the composite rubber (a-4-1) had a weight-average molecular weight of 61000 in terms of polystyrene and a degree of swelling in toluene of 7.5 measured by the above-described methods.

Production of Composite Rubber (a-4-2)

A 10-L glass reactor was charged with 20 parts by weight (solid content) of the agglomerated styrene-butadiene rubber latex (2) and 140 parts by weight of deionized water, followed by nitrogen purging. The inner temperature of the nitrogen-purged tank was increased to 35° C., and then an aqueous solution prepared by dissolving 0.05 parts by weight of sodium formaldehyde sulfoxylate, 0.01 parts by weight of sodium ethylenediaminetetraacetate, and 0.001 parts by weight of ferrous sulfate in 20 parts by weight of deionized water was added to the container. Furthermore, 16 parts by weight of butyl acrylate and 0.1 parts by weight of allyl methacrylate were added. The inner temperature of the tank was increased to 40° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 64 parts by weight of butyl acrylate, and 0.4 parts by weight of allyl methacrylate were successively dropwise added to the reaction mixture over 3 hours while the temperature was being maintained at 40° C. After the dropping, the reaction mixture was retained at 40° C. for 3 hours to yield a composite rubber latex (a-4-2). The tetrahydrofuran-soluble portion of the composite rubber (a-4-2) had a weight-average molecular weight of 65000 in terms of polystyrene and a degree of swelling in toluene of 9.5 measured by the above-described methods.

Production of Composite Rubber (a-4-3)

A 10-L glass reactor was charged with 20 parts by weight (solid content) of the agglomerated styrene-butadiene rubber latex (2) and 140 parts by weight of deionized water, followed by nitrogen purging. The inner temperature of the nitrogen-purged tank was increased to 65° C., and then 16 parts by weight of butyl acrylate and 0.1 parts by weight of allyl methacrylate were added to the container. The inner temperature of the tank was increased to 70° C., and the mixture was retained at this temperature for 1 hour. Subsequently, an aqueous solution prepared by dissolving 0.9 parts by weight of dipotassium alkenylsuccinate and 0.09 parts by weight of potassium persulfate in 25 parts by weight of deionized water, 64 parts by weight of butyl acrylate, and 0.4 parts by weight of allyl methacrylate were successively dropwise added to the reaction mixture over 3 hours while the temperature was being maintained at 70° C. After the dropping, the reaction mixture was retained at 70° C. for 3 hours to yield a composite rubber latex (a-4-3). The tetrahydrofuran-soluble portion of the composite rubber (a-4-3) had a weight-average molecular weight of 62000 in terms of polystyrene and a degree of swelling in toluene of 6.1 measured by the above-described methods.

Production of Butyl Acrylate Rubber Latex (4-1)

A nitrogen-purged glass reactor was charged with 180 parts by weight of deionized water, 15 parts by weight of butyl acrylate, 0.1 parts by weight of allyl methacrylate, 0.35 parts by weight (in terms of solid content) of dipotassium alkenylsuccinate, and 0.15 parts by weight of potassium persulfate, followed by reaction at 65° C. for 1 hour. Subsequently, a mixture of 85 parts by weight of butyl acrylate and 0.53 parts by weight of allyl methacrylate and an aqueous emulsifier solution prepared by dissolving 0.65 parts by weight (in terms of solid content) of dipotassium alkenylsuccinate in 20 parts by weight of deionized water were successively dropwise added to the reaction mixture over 3 hours. After the dropping, the reaction mixture was retained for 3 hours to yield a butyl acrylate rubber latex (4-1). The weight-average particle diameter of the butyl acrylate rubber latex (4-1) was calculated as in the cross-linked butyl acrylate rubber latex (1). The weight-average particle diameter was 120 nm.

Production of Butyl Acrylate Rubber Latex (4-2)

A nitrogen-purged glass reactor was charged with 180 parts by weight of deionized water, 15 parts by weight of butyl acrylate, 0.1 parts by weight of allyl methacrylate, 0.03 parts by weight (in terms of solid content) of dipotassium alkenylsuccinate, and 0.15 parts by weight of potassium persulfate, followed by reaction at 65° C. for 1 hour. Subsequently, a mixture of 85 parts by weight of butyl acrylate and 0.53 parts by weight of allyl methacrylate and an aqueous emulsifier solution prepared by dissolving 0.8 parts by weight (in terms of solid content) of dipotassium alkenylsuccinate in 20 parts by weight of deionized water were successively dropwise added to the reaction mixture over 3 hours. After the dropping, the reaction mixture was retained for 3 hours to yield a butyl acrylate rubber latex (4-2). The weight-average particle diameter of the butyl acrylate rubber latex (4-2) was calculated as in the cross-linked butyl acrylate rubber latex (1). The weight-average particle diameter was 310 nm.

The agglomerated rubber polymer (2) described above was used as the agglomerated styrene-butadiene rubber latex.

Production of Graft Copolymer (A-4-1)

A glass reactor was charged with 50 parts by weight (solid content) of the composite rubber latex (a-4-1), followed by nitrogen purging. The inner temperature of the nitrogen-purged tank was increased to 65° C., and then an aqueous solution prepared by dissolving 0.2 parts by weight of lactose, 0.1 parts by weight of sodium pyrophosphate dehydrate, and 0.005 parts by weight of ferrous sulfate in 10 parts by weight of deionized water was added to the container, followed by heating to 70° C. Subsequently, a liquid mixture composed of 15 parts by weight of acrylonitrile, 35 parts by weight of styrene, 0.05 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained for 3 hours to yield a graft copolymer latex (A-4-1), which was then salted out, dehydrated, and dried into a powdered graft polymer (A-4-1).

Production of Graft Copolymers (A-4-2) to (A-4-6)

Graft copolymer latexes (A-4-2) to (A-4-6) were produced as in the graft copolymer (A-4-1) except that the composite rubber (a-4-2), the composite rubber (a-4-3), the butyl acrylate rubber latex (4-1), the butyl acrylate rubber latex (4-2), and the agglomerated rubber polymer (2) were respectively used instead of the composite rubber (a-4-1) and were then salted out, dehydrated, and dried into powdered graft polymers (A-4-2) to (A-4-6).

Production of Copolymer (B-4)

A nitrogen-purged glass reactor was charged with 150 parts by weight of deionized water, 7 parts by weight of styrene, 3 parts by weight of acrylonitrile, 0.02 parts by weight of tertiary-dodecyl mercaptan, 0.5 parts by weight (in terms of solid content) of sodium dodecylbenzenesulfonate, and 0.3 parts by weight of potassium persulfate, followed by reaction at 65° C. for 1 hour. Subsequently, 63 parts by weight of styrene, 27 parts by weight of acrylonitrile, 0.18 parts by weight of tertiary-dodecyl mercaptan, and 30 parts by weight of an aqueous emulsifier solution containing 2.5 parts by weight (in terms of solid content) of sodium dodecylbenzenesulfonate were successively dropwise added to the reaction mixture over 3 hours. After the dropping, the reaction mixture was retained for 2 hours to yield a copolymer latex (B-4), which was then salted out, dehydrated, and dried into a powdered polymer (B-4).

Polycarbonate Resin (C)

The polycarbonate resin (C) used was "Calibre 300-15" (trade name, manufactured by Sumika Styron Polycarbonate Limited).

Additive

Benzotriazole ultraviolet absorber: "TINUVIN 329" (trade name, manufactured by BASF SE)

Hindered amine light stabilizer: "UVINUL 5050H" (trade name, manufactured by BASF SE)

Preparation of Sample

Pellet samples were each produced by mixing a graft copolymer (A), a copolymer (B-4), a polycarbonate resin (C), and additives shown in Table 7 and then melting and kneading the mixture with a twin-screw extruder, Toshiba TEM-35B, at 250° C. The pellet samples were evaluated for physical properties. The results are shown in Table 7. The evaluations were performed as follows.

Impact Resistance and Fluidity

The impact resistance (unit: $kJ/m^2$) and fluidity of the pellet sample prepared in each Example and each Comparative Example were measured as in above. The results are shown in Table 7, wherein impact resistance (23° C.) and impact resistance (−30° C.) show the results of measurement of impact resistance at 23° C. and −30° C., respectively.

Heat Resistance

Test pieces were formed from the pellet samples prepared in Examples and Comparative Examples in accordance with ISO Test Method 294 and were applied to measurement of heat resistance. The heat resistance was determined by measuring the deflection temperature under a load of 1.8 MPa in accordance with ISO75. The results are shown in Table 7 with a unit of (° C.).

Residence Heat Stability

The pellet sample of each of Examples and Comparative Examples was molded into a molded article (90 mm×55 mm×2.5 mm) at a molding cycle of 30 seconds and a molded article at a molding cycle of 10 minutes with an injection molding machine (SAV-30-30 manufactured by Sanjo Seiki Co., Ltd., cylinder temperature: 270° C., die temperature: 60° C.). The gloss of each molded article was measured with a gloss meter. The gloss at a molding cycle of 10 minutes relative to that at a molding cycle of 30 seconds was determined as the gloss retention. The results are shown in Table 7. A higher gloss retention means higher residence heat stability.

A: a gloss retention of 90% or more

B: a gloss retention of less than 90%

Light Resistance

The pellet sample of each of Examples and Comparative Examples was molded into a molded article (90 mm×55 mm×2.5 mm) with an injection molding machine (SAV-30-

30 manufactured by Sanjo Seiki Co., Ltd., cylinder temperature: 250° C., die temperature: 60° C.). Each molded article was subjected to an accelerated weathering test with a UV Auto-fade-meter, U48AU, manufactured by Suga Test Instruments Co., Ltd. at 83° C. under no rain for 400 hours. Colors before and after the exposure were measured in accordance with JIS 28729. The results are shown in Table 7. A smaller difference in the color means higher light resistance.

A: a color difference ΔE of less than 4
B: a color difference ΔE of not less than 4

Surface Appearance

The surface appearance of each molded article for evaluation of light resistance was visually inspected to judge whether pearl-like appearance was observed on the surface. The results are shown in Table 7.

A: no pearl-like appearance is observed
B: pearl-like appearance is observed impact resistance and light resistance. The compositions of Comparative Examples 4-2, 4-3, and 4-7 each containing an acrylic rubber exhibit insufficient impact resistance, fluidity, and surface appearance. The composition of Comparative Example 4-4 containing a conjugated diene rubber and the composition of Comparative Example 4-5 containing both an acrylic rubber and a conjugated diene rubber exhibit insufficient light resistance. The composition of Comparative Example 4-6 containing a polycarbonate resin in an amount less than 10 parts by weight exhibits insufficient impact resistance and heat resistance.

Examples 5-1 to 5-5 and Comparative Examples 5-1 to 5-5

Each of the graft copolymers (A-2-1) to (A-2-10) was used as a graft copolymer (A), and the copolymer (B-2) was used as a copolymer (B), whereas the polycarbonate resin

TABLE 7

|  |  | Example | | | | | Comparative Example | | | | | | |
| --- | --- | --- | --- | --- | --- | --- | --- | --- | --- | --- | --- | --- | --- |
|  |  | 4-1 | 4-2 | 4-3 | 4-4 | 4-5 | 4-1 | 4-2 | 4-3 | 4-4 | 4-5 | 4-6 | 4-7 |
| Graft | A-4-1 | 30 |  | 25 | 40 |  |  |  |  |  |  | 50 |  |
| copolymer | A-4-2 |  | 30 |  |  | 20 |  |  |  |  |  |  |  |
| (A) | A-4-3 |  |  |  |  |  | 30 |  |  |  |  |  | 25 |
|  | A-4-4 |  |  |  |  |  |  | 30 |  |  |  |  |  |
|  | A-4-5 |  |  |  |  |  |  |  | 30 |  | 20 |  |  |
|  | A-4-6 |  |  |  |  |  |  |  |  | 30 | 10 |  |  |
| Copolymer (B-4) |  | 10 | 10 |  | 20 | 15 | 10 | 10 | 10 | 5 | 10 | 42 |  |
| Polycarbonate resin (C) |  | 60 | 60 | 75 | 40 | 65 | 60 | 60 | 60 | 65 | 60 | 8 | 75 |
| Light stabilizer |  | 0.4 | 0.4 | 0.4 | 0.4 | 0.4 | 0.4 | 0.4 | 0.4 | 0.4 | 0.4 | 0.4 | 0.4 |
| Ultraviolet absorber |  | 0.4 | 0.4 | 0.4 | 0.4 | 0.4 | 0.4 | 0.4 | 0.4 | 0.4 | 0.4 | 0.4 | 0.4 |
| Physical | Impact resistance (23° C.) | 55 | 63 | NB | 60 | 76 | 40 | 35 | 42 | NB | 66 | 33 | 58 |
| properties | Impact resistance (−30° C.) | 16 | 18 | 35 | 25 | 21 | 10 | 6 | 8 | 44 | 24 | 7 | 16 |
|  | Fluidity | 10 | 11 | 5 | 14 | 8 | 10 | 11 | 12 | 8 | 12 | 5 | 4 |
|  | Heat resistance | 100 | 100 | 115 | 94 | 102 | 100 | 100 | 100 | 100 | 100 | 83 | 115 |
|  | Residence heat stability | A | A | A | A | A | A | B | A | A | A | A | B |
|  | Light resistance | A | A | A | A | A | B | A | A | B | B | A | A |
|  | Surface appearance | A | A | A | A | A | A | B | B | A | A | A | B |

As shown in Table 7, the thermoplastic resin compositions (Examples 4-1 to 4-5) of the present invention exhibit not only excellent impact resistance, light resistance, and residence heat stability but also excellent surface appearance.

The thermoplastic resin composition of Comparative Example 4-1 containing a composite rubber having a degree of swelling in toluene of less than 7.0 exhibits insufficient (C) and additives (light stabilizer and ultraviolet absorber) were the same as those used in Examples 4-1 to 4-5. The formulations of the thermoplastic resin compositions in Examples and Comparative Examples are shown in Table 8. The impact resistance, fluidity, heat resistance, residence heat stability, light resistance, and surface appearance were evaluated as in Examples 4-1 to 4-5.

TABLE 8

|  |  | Example | | | | | Comparative Example | | | | |
| --- | --- | --- | --- | --- | --- | --- | --- | --- | --- | --- | --- |
|  |  | 5-1 | 5-2 | 5-3 | 5-4 | 5-5 | 5-1 | 5-2 | 5-3 | 5-4 | 5-5 |
| Graft | A-2-1 | 25 |  | 21 | 33 |  | 41 |  |  |  |  |
| copolymer | A-2-2 |  |  |  |  |  |  |  |  |  |  |
| (A) | A-2-3 |  |  |  |  |  |  |  |  |  |  |
|  | A-2-4 |  | 25 |  |  |  |  |  |  |  |  |
|  | A-2-5 |  |  |  |  | 25 |  |  |  |  |  |
|  | A-2-6 |  |  |  |  |  |  |  |  |  |  |
|  | A-2-7 |  |  |  |  |  |  | 25 |  |  |  |
|  | A-2-8 |  |  |  |  |  |  |  | 25 |  |  |
|  | A-2-9 |  |  |  |  |  |  |  |  | 25 |  |
|  | A-2-10 |  |  |  |  |  |  |  |  |  | 25 |
| Copolymer (B-2) |  | 15 | 15 |  | 27 | 15 | 51 | 15 | 15 | 15 | 15 |
| Polycarbonate resin (C) |  | 60 | 60 | 79 | 40 | 60 | 8 | 60 | 60 | 60 | 60 |
| Light stabilizer |  | 0.4 | 0.4 | 0.4 | 0.4 | 0.4 | 0.4 | 0.4 | 0.4 | 0.4 | 0.4 |
| Ultraviolet absorber |  | 0.4 | 0.4 | 0.4 | 0.4 | 0.4 | 0.4 | 0.4 | 0.4 | 0.4 | 0.4 |
| Physical | Impact resistance (23° C.) | 61 | 56 | NB | 48 | 53 | 31 | 40 | 36 | NB | NB |
| properties | Impact resistance (−30° C.) | 20 | 18 | 27 | 25 | 18 | 9 | 10 | 7 | 40 | 33 |

TABLE 8-continued

|  | Example | | | | | Comparative Example | | | | |
| --- | --- | --- | --- | --- | --- | --- | --- | --- | --- | --- |
|  | 5-1 | 5-2 | 5-3 | 5-4 | 5-5 | 5-1 | 5-2 | 5-3 | 5-4 | 5-5 |
| Fluidity | 13 | 12 | 3 | 14 | 10 | 8 | 10 | 9 | 8 | 9 |
| Heat resistance | 100 | 100 | 117 | 94 | 99 | 84 | 99 | 98 | 98 | 98 |
| Residence heat stability | A | A | A | A | A | A | B | B | A | A |
| Light resistance | A | A | A | A | A | A | A | A | B | B |
| Surface appearance | A | A | A | A | A | A | B | B | A | A |

As shown Table 8, the thermoplastic resin compositions (Examples 5-1 to 5-5) of the present invention exhibit not only excellent impact resistance, light resistance, and residence heat stability but also excellent surface appearance.

The thermoplastic resin composition of Comparative Example 5-1 containing a small amount of a polycarbonate resin (C) exhibits insufficient impact resistance. The compositions of Comparative Examples 5-2 and 5-3 containing the graft copolymers (A-2-7) and (A-2-8), respectively, containing composite rubber particles having an equivalent-circle diameter of 150 nm or less in an amount exceeding 50% exhibit insufficient impact resistance and also insufficient residence heat stability and surface appearance. The composition of Comparative Example 5-4 containing the graft copolymer (A-2-9) containing a conjugated diene rubber and the composition of Comparative Example 5-5 containing the graft copolymer (A-2-10) containing an acrylic rubber and a conjugated diene rubber exhibit insufficient light resistance.

Examples 6-1 to 6-4 and Comparative Examples 6-1 to 6-4

Graft Copolymer (A)

The styrene-butadiene rubber latex (1) was used as a styrene-butadiene rubber latex having a small particle diameter.

Production of Agglomerated Styrene-Butadiene Rubber Latex

A 10-L pressure resistant container was filled with 270 parts by weight of the styrene-butadiene rubber latex (1) as a styrene-butadiene rubber latex having a small particle diameter and 0.2 parts by weight of a sodium dodecylbenzenesulfonate, followed by stirring for 10 minutes. Subsequently, 20 parts by weight of a 5% aqueous phosphoric acid solution was added to the mixture over 10 minutes, and 10 parts by weight of a 10% aqueous potassium hydroxide solution was then added to the mixture to yield an agglomerated styrene-butadiene rubber latex (6-1). The weight-average particle diameter of the agglomerated styrene-butadiene rubber (6-1) was calculated by the same method described above. The weight-average particle diameter was 350 nm.

Production of Composite Rubber (a-6-1)

A composite rubber latex (a-6-1) was produced as in the composite rubber latex (a-4-1) except that the agglomerated styrene-butadiene rubber (6-1) was used. The tetrahydrofuran-soluble portion of the composite rubber (a-6-1) had a weight-average molecular weight of 61000 in terms of polystyrene and a degree of swelling in toluene of 7.5 measured by the methods described above.

Production of Composite Rubber (a-6-2)

A composite rubber latex (a-6-2) was produced as in the composite rubber latex (a-4-2) except that the agglomerated styrene-butadiene rubber (6-1) was used. The tetrahydrofuran-soluble portion of the composite rubber (a-6-2) had a weight-average molecular weight of 65000 in terms of polystyrene and a degree of swelling in toluene of 9.5 measured by the methods described above.

Production of Composite Rubber (a-6-3)

A composite rubber latex (a-6-3) was produced as in the composite rubber latex (a-4-3) except that the agglomerated styrene-butadiene rubber (6-1) was used. The tetrahydrofuran-soluble portion of the composite rubber (a-6-3) had a weight-average molecular weight of 62000 in terms of polystyrene and a degree of swelling in toluene of 6.1 measured by the methods described above.

The butyl acrylate rubber latex (4-1) was used as a butyl acrylate rubber latex.

Production of Graft Copolymer (A-6-1)

A graft copolymer latex (A-6-1) was produced as in the graft copolymer (A-4-1) except that the composite rubber latex (a-6-1) was used and was then salted-out, dehydrated, and dried into a powdered graft polymer (A-6-1).

Production of Graft Copolymers (A-6-2) to (A-6-5)

Graft copolymer latexes (A-6-2) to (A-6-5) were produced as in the graft copolymer (A-6-1) except that the composite rubbers (a-6-2) to (a-6-4) and the agglomerated styrene-butadiene rubber (6-1) were respectively used instead of the composite rubber (a-6-1) and were then salted-out, dehydrated, and dried into powdered graft polymers (A-6-2) to (A-6-5).

Copolymer (B)

An unsaturated carboxylic-modified copolymer (E) was prepared by the following method and was mixed with the copolymer (B-4) at weight ratios shown in Table 9 to give each copolymer (B).

Production of Unsaturated Carboxylic-Modified Copolymer (E)

A nitrogen-purged glass reactor was charged with 120 parts of pure water and 0.3 parts of potassium persulfate, followed by heating to 65° C. with stirring. Subsequently, a solution of a monomer mixture composed of 67 parts of styrene, 30 parts of acrylonitrile, 3 parts of methacrylic acid, and 1.5 parts of t-dodecyl mercaptan and 30 parts of an aqueous emulsifier solution containing 2 parts of sodium dodecylbenzenesulfonate were successively added to the reaction mixture over 5 hours. Subsequently, the temperature of the polymerization system was increased to 70° C., followed by aging for 3 hours to complete the polymerization. Subsequently, salting out with potassium chloride, dehydration, and drying were performed to yield an unsaturated carboxylic-modified copolymer (E). The unsaturated carboxylic-modified copolymer (E) had a reduced viscosity of 0.31.

Polyamide Resin (D)

Unitika nylon 6 A1030BRL manufactured by Unitika Limited.

Additive

Benzotriazole ultraviolet absorber: "TINUVIN 234" (trade name, manufactured by BASF SE)

Hindered amine light stabilizer: "TINUVIN 770" (trade name, manufactured by BASF SE)

Preparation of Sample

Pellet samples were each produced by mixing a graft copolymer (A), a copolymer (B), a polyamide resin (D), and additives at proportions shown in Table 9 and then melting and kneading the mixture with a twin-screw extruder, Toshiba TEM-35B, at 250° C. The physical properties of the pellet samples were evaluated. The results are shown in Table 9. The evaluations were performed as follows.

Impact Resistance and Heat Resistance

The impact resistance and heat resistance were evaluated as in above. The results are shown in Table 9.

Fluidity

The pellet samples prepared in Examples and Comparative Examples were subjected to measurement of melt volume flow rate (unit: cm$^3$/10 min) at 240° C. under a load of 10 kg. The results are shown in Table 9.

Weather Resistance (Color Difference and Gloss Retention)

The pellet sample of each of Examples and Comparative Examples was molded into a molded article (90 mm×55 mm×2.5 mm) with an injection molding machine (SAV-30-30 manufactured by Sanjo Seiki Co., Ltd., cylinder temperature: 250° C., die temperature: 60° C.). Each molded article was subjected to an accelerated weathering test with a UV Auto-fade-meter, U48AU, manufactured by Suga Test Instruments Co., Ltd. at 63° C. under rain for 500 hours. Colors and surface glossiness)(60° before and after the exposure were measured in accordance with JIS Z8729. A smaller difference in the color and a higher gloss retention mean higher weather resistance.

A: a color difference ΔE of less than 4
B: a color difference ΔE of not less than 4

Gloss retention (%)=glossiness after weather resistance test/initial glossiness×100

A: a gloss retention of 50% or more
B: a gloss retention or less than 50%

Chemical Resistance

The pellet sample of each of Examples and Comparative Examples was molded into a molded article (150 mm×230 mm×3 mm) with an injection molding machine (J150E-P manufactured by The Japan Steel Works, Ltd., cylinder temperature: 260° C., die temperature: 60° C.). An aromatic or gasoline was applied to the molded article, and a change in appearance after leaving to stand at room temperature for 1 day was inspected.

A: no change was observed
B: swelling, melting, or significant deterioration was observed

TABLE 9

|  |  | Example | | | | Comparative Example | | | |
| --- | --- | --- | --- | --- | --- | --- | --- | --- | --- |
|  |  | 6-1 | 6-2 | 6-3 | 6-4 | 6-1 | 6-2 | 6-3 | 6-4 |
| Graft copolymer (A) | A-6-1 | 40 |  | 30 |  | 35 |  |  |  |
|  | A-6-2 |  | 40 |  | 30 |  |  |  |  |
|  | A-6-3 |  |  |  |  |  | 40 |  |  |
|  | A-6-4 |  |  |  |  |  |  | 25 |  |
|  | A-6-5 |  |  |  |  |  |  |  | 30 |
| Copolymer (B) | Copolymer (B-4) | 25 | 25 | 0 | 0 | 47 | 25 | 5 | 0 |
|  | Carboxylic-modified copolymer (E) | 5 | 5 | 10 | 10 | 3 | 5 | 10 | 10 |
| Polyamide resin (D) |  | 30 | 30 | 60 | 60 | 15 | 30 | 60 | 60 |
| Light stabilizer |  | 0.4 | 0.4 | 0.4 | 0.4 | 0.4 | 0.4 | 0.4 | 0.4 |
| Ultraviolet absorber |  | 0.4 | 0.4 | 0.4 | 0.4 | 0.4 | 0.4 | 0.4 | 0.4 |
| Physical properties | Impact resistance (23° C.) | 20 | 18 | 18 | 16 | 14 | 9 | 8 | 32 |
|  | Impact resistance (−30° C.) | 5 | 5 | 5 | 4 | 4 | 2 | 2 | 10 |
|  | Fluidity | 42 | 43 | 65 | 66 | 30 | 55 | 40 | 41 |
|  | Heat resistance | 94 | 94 | 97 | 97 | 92 | 93 | 97 | 97 |
|  | Weather resistance (gloss retention) | A | A | A | A | A | B | A | B |
|  | Weather resistance (color difference) | A | A | A | A | A | A | A | B |
|  | Chemical resistance (aromatic) | A | A | A | A | B | A | A | A |
|  | Chemical resistance (gasoline) | A | A | A | A | B | A | A | A |

As shown in Table 9, the thermoplastic resin compositions of the present invention exhibit not only excellent impact resistance, fluidity, and heat resistance but also highly excellent weather resistance and chemical resistance.

The thermoplastic resin composition of Comparative Example 6-1 containing a polyamide resin in an amount less than 20 parts by weight exhibits insufficient impact resistance, fluidity, and chemical resistance. The composition of Comparative Example 6-2 containing a composite rubber having a degree of swelling in toluene of less than 7.0 exhibits insufficient impact resistance and weather resistance. The composition of Comparative Example 6-3 containing an acrylic rubber exhibits insufficient impact resistance. The composition of Comparative Example 6-4 containing a conjugated diene rubber exhibits insufficient weather resistance.

Examples 7-1 to 7-5 and Comparative Examples 7-1 to 7-5

Each of the graft copolymers (A-2-1) to (A-2-10) was used as a graft copolymer (A), the copolymer (B-2) was used as a copolymer (B), whereas the copolymer (B) mixed with the unsaturated carboxylic-modified copolymer (E), the polyamide resin (D), and the additives (light stabilizer and ultraviolet absorber) were the same as those used in Examples 6-1 to 6-4. The formulations of the thermoplastic resin compositions used in Examples and Comparative Examples are shown in Table 10. The impact resistance (23°

C.), impact resistance (−30° C.), fluidity, heat resistance, residence heat stability, and weather resistance were evaluated as in Examples 6-1 to 6-4.

F-4: "Pratherm EP-16" (trade name of brominated epoxy resin manufactured by DIC Corporation, softening point: 116° C., bromine content: 50% by weight)

TABLE 10

|  |  | Example | | | | | Comparative Example | | | | |
|---|---|---|---|---|---|---|---|---|---|---|---|
|  |  | 7-1 | 7-2 | 7-3 | 7-4 | 7-5 | 7-1 | 7-2 | 7-3 | 7-4 | 7-5 |
| Graft copolymer (A) | A-2-1 | 33 |  | 25 |  |  | 30 |  |  |  |  |
|  | A-2-2 |  |  |  | 25 |  |  |  |  |  |  |
|  | A-2-4 |  | 33 |  |  |  |  |  |  |  |  |
|  | A-2-5 |  |  |  |  | 33 |  |  |  |  |  |
|  | A-2-7 |  |  |  |  |  |  | 33 |  |  |  |
|  | A-2-8 |  |  |  |  |  |  |  | 33 |  |  |
|  | A-2-9 |  |  |  |  |  |  |  |  | 25 |  |
|  | A-2-10 |  |  |  |  |  |  |  |  |  | 25 |
| Copolymer (B) | Copolymer (B-2) | 32 | 32 | 5 |  | 32 | 47 | 32 | 32 | 5 |  |
|  | Carboxylic-modified copolymer (E) | 5 | 5 | 10 | 10 | 5 | 5 | 5 | 5 | 10 | 10 |
| Polyamide resin (D) |  | 30 | 30 | 60 | 65 | 30 | 18 | 30 | 30 | 60 | 65 |
| Light stabilizer |  | 0.4 | 0.4 | 0.4 | 0.4 | 0.4 | 0.4 | 0.4 | 0.4 | 0.4 | 0.4 |
| Ultraviolet absorber |  | 0.4 | 0.4 | 0.4 | 0.4 | 0.4 | 0.4 | 0.4 | 0.4 | 0.4 | 0.4 |
| Physical properties | Impact resistance (23° C.) | 21 | 22 | 20 | 18 | 20 | 14 | 10 | 9 | 24 | 20 |
|  | Impact resistance (−30° C.) | 6 | 6 | 5 | 5 | 5 | 4 | 3 | 3 | 9 | 8 |
|  | Fluidity | 42 | 42 | 67 | 68 | 41 | 31 | 38 | 36 | 38 | 39 |
|  | Heat resistance | 94 | 94 | 97 | 98 | 94 | 92 | 93 | 93 | 97 | 98 |
|  | Weather resistance (gloss retention) | A | A | A | A | A | A | A | A | B | B |
|  | Weather resistance (color difference) | A | A | A | A | A | A | B | B | A | A |
|  | Chemical resistance (aromatic) | A | A | A | A | A | B | A | A | A | A |
|  | Chemical resistance (gasoline) | A | A | A | A | A | B | A | A | A | A |

As shown in Table 10, the thermoplastic resin compositions (Examples 7-1 to 7-5) of the present invention exhibit not only excellent impact resistance, fluidity, and heat resistance but also excellent weather resistance and chemical resistance.

The thermoplastic resin composition of Comparative Example 7-1 containing a small amount of a polyamide resin (D) exhibits insufficient chemical resistance. The compositions of Comparative Examples 7-2 and 7-3 containing the graft copolymers (A-2-7) and (A-2-8), respectively, containing composite rubber particles having an equivalent-circle diameter of 150 nm or less in an amount exceeding 50% exhibit insufficient weather resistance (gloss retention) and impact resistance. The composition of Comparative Example 7-4 containing the graft copolymer (A-2-9) containing a conjugated diene rubber and the composition of Comparative Example 7-5 containing the graft copolymer (A-2-10) containing an acrylic rubber and a conjugated diene rubber exhibit insufficient weather resistance (color difference).

Examples 8-1 to 8-13 and Comparative Examples 8-1 to 8-10

Each of the graft copolymers (A-1-1) to (A-1-9) was used as a graft copolymer (A), and the copolymer (B-1) was used as a copolymer (B).

Flame Retardant (F)

F-1: "PX-200" (trade name of condensed phosphoric ester manufactured by Daihachi Chemical Industry Co., Ltd.)

F-2: "CR-741" (trade name of condensed phosphoric ester manufactured by Daihachi Chemical Industry Co., Ltd.)

F-3: "SR-245" (trade name of 2,4,6-tris(2,4,6-tribromophenoxy)-1,3,5-triazine manufactured by Dai-ichi F R Co., Ltd., melting point: 232° C., bromine content: 67% by weight)

F-5: "Pratherm EC-20" (trade name of brominated epoxy resin manufactured by DIC Corporation, softening point: 115° C., bromine content: 56% by weight)

F-6: "SAYTEX CP-2000" (trade name of tetrabromobisphenol A manufactured by Albemarle Japan Corporation, melting point: 181° C., bromine content: 59% by weight)

Additive

Flame retardant aid: "Patox-M" (trade name of antimony trioxide manufactured by Nihon Seiko Co., Ltd.)

Light stabilizer: "Adeka Stab LA77Y" (trade name, manufactured by ADEKA Corporation)

Ultraviolet absorber: "Sumisorb 200" (trade name, manufactured by Sumitomo Chemical Co., Ltd.)

Preparation of Sample

Pellet samples of flame-retardant thermoplastic resin compositions were each produced by mixing a graft copolymer (A), a copolymer (B), a flame retardant (F), and additives at proportions shown in Tables 11 and 12 and then melting and kneading the mixture with a 40-mm twin-screw extruder at 240° C. The resulting pellet samples were molded, and the molded articles were evaluated for physical properties. The results are shown in Tables 11 and 12. The evaluations were performed as follows.

The impact resistance, fluidity, and color developing properties were evaluated as described above. The results are shown in Tables 11 and 12. The weather resistance and flame retardance evaluated by the following procedures are also shown in Tables 11 and 12.

Weather Resistance

Colored pellet samples were each prepared by mixing 100 parts of a pellet sample produced in each of Examples and Comparative Examples with 1 part of titanium oxide (RTC-30) and melting and kneading the mixture with a 40-mm single screw extruder at 240° C. The colored pellet samples were molded with an injection molding machine (SAV-30-30 manufactured by Sanjo Seiki Co., Ltd., cylinder temperature: 210° C., die temperature: 50° C.). The molded articles (90 mm×55 mm×2.5 mm) were subjected to an accelerated weathering test with a Sunshine Super Long Life Weather Meter, WEL-SUN-HCH-B, manufactured by Suga Test Instruments Co., Ltd. at 63° C. under rain for 200 hours. Colors before and after the exposure were measured with a colorimeter, and the color difference (ΔE) was determined to evaluate weather resistance.

Flame Retardance

Test pieces having a thickness of 1.6 mm were prepared in accordance with the UL94 standard from the pellet samples produced in Examples and Comparative Examples and were applied to a flammability test to evaluate the flame retardance. The results are shown in Tables 11 and 12.

As shown in Table 11, the flame-retardant thermoplastic resin compositions of Examples 8-1 to 8-13 according to the present invention exhibit not only excellent flame retardance but also excellent weather resistance, impact resistance, fluidity, and color developing properties.

As shown in Table 12, the thermoplastic resin compositions of Comparative Examples 8-1 to 8-5 containing composite rubbers each having a tetrahydrofuran-soluble portion having a weight-average molecular weight and/or a degree of swelling outside the specified ranges exhibit poor balances between impact resistance, color developing properties, and weather resistance. The compositions of Comparative Examples 8-6 and 8-7 each containing an ABS resin as the graft copolymer exhibit insufficient weather resistance. The compositions of Comparative Examples 8-8 and 8-9 not containing a conjugated diene rubber polymer or acrylic ester polymer as the composite rubbers exhibit insufficient weather resistance. The composition of Comparative

TABLE 11

| | | Example | | | | | | | | | | | | |
|---|---|---|---|---|---|---|---|---|---|---|---|---|---|---|
| | | 8-1 | 8-2 | 8-3 | 8-4 | 8-5 | 8-6 | 8-7 | 8-8 | 8-9 | 8-10 | 8-11 | 8-12 | 8-13 |
| Graft copolymer (A) | A-1-1 | 20 | 30 | 50 | 30 | 30 | 30 | 30 | 30 | | | | | |
| | A-1-2 | | | | | | | | | 30 | | | | |
| | A-1-3 | | | | | | | | | | 30 | 50 | | |
| | A-1-4 | | | | | | | | | | | | 20 | 30 |
| Copolymer (B-1) | | 80 | 70 | 50 | 70 | 70 | 70 | 70 | 70 | 70 | 70 | 50 | 80 | 70 |
| Flame retardant (F) | F-1 | 10 | 10 | 10 | | | | | | 10 | | | | |
| | F-2 | | | | 10 | | | | | | 10 | 10 | | |
| | F-3 | | | | | 25 | | | | | | | | |
| | F-4 | | | | | | 28 | | | | | | 28 | 28 |
| | F-5 | | | | | | | 25 | | | | | | |
| | F-6 | | | | | | | | 23 | | | | | |
| Flame retardant aid | | | | | | | 5 | 5 | 5 | | | | 5 | 5 |
| Light stabilizer | | 0.4 | 0.4 | 0.4 | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 | 0.1 | 0.1 | 0.1 |
| Physical properties | Flame retardance | V-2 | V-2 | V-2 | V-2 | V-1 | V-0 | V-0 | V-0 | V-2 | V-2 | V-2 | V-0 | V-0 |
| | Impact resistance | 6 | 11 | 19 | 11 | 10 | 9 | 9 | 9 | 12 | 9 | 17 | 5 | 8 |
| | Fluidity | 43 | 36 | 28 | 46 | 21 | 23 | 19 | 25 | 38 | 34 | 27 | 32 | 23 |
| | Color developing property | 12.8 | 9.6 | 7.5 | 9.7 | 7.0 | 5.2 | 5.6 | 5.8 | 8.8 | 11.3 | 9.1 | 6.3 | 5.3 |
| | Weather resistance (color difference) | 3.8 | 4.0 | 4.3 | 4.5 | 9.5 | 7.5 | 11.5 | 18.5 | 3.4 | 4.7 | 5.0 | 7.1 | 7.4 |

TABLE 12

| | | Comparative Example | | | | | | | | | |
|---|---|---|---|---|---|---|---|---|---|---|---|
| | | 8-1 | 8-2 | 8-3 | 8-4 | 8-5 | 8-6 | 8-7 | 8-8 | 8-9 | 8-10 |
| Graft copolymer (A) | A-1-1 | | | | | | | | | | 30 |
| | A-1-5 | 30 | | | | | | | | | |
| | A-1-6 | | 30 | 20 | | | | | | | |
| | A-1-7 | | | | 30 | 50 | | | | | |
| | A-1-8 | | | | | | 30 | 30 | | | |
| | A-1-9 | | | | | | | | 30 | 30 | |
| Copolymer (B-1) | | 70 | 70 | 80 | 70 | 50 | 70 | 70 | 70 | 70 | 70 |
| Flame retardant (F) | F-1 | 10 | | 10 | | | 10 | | 10 | | 0.5 |
| | F-2 | | 10 | | | | | | | | |
| | F-3 | | | | | | | | | | |
| | F-4 | | | | 28 | 28 | | | | | |
| | F-5 | | | | | | | | | | |
| | F-6 | | | | | | | 23 | | 23 | |
| Flame retardant aid | | | | | 5 | 5 | | 5 | | 5 | |
| Light stabilizer | | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 |
| Physical properties | Flame retardance | V-2 | V-2 | V-2 | V-0 | V-0 | V-2 | V-0 | V-2 | V-0 | HB |
| | Impact resistance | 6 | 4 | 3 | 3 | 9 | 20 | 13 | 13 | 9 | 13 |
| | Fluidity | 35 | 45 | 50 | 25 | 15 | 47 | 36 | 48 | 37 | 15 |
| | Color developing property | 8.3 | 8.0 | 11.1 | 4.2 | 3.2 | 20.7 | 6.8 | 9.8 | 5.9 | 9.1 |
| | Weather resistance (color difference) | 6.1 | 7.1 | 5.9 | 8.5 | 8.9 | 10.2 | 27.0 | 8.2 | 25.0 | 2.2 |

Example 8-10 containing a small amount of a flame retardant exhibits insufficient flame retardance.

Examples 9-1 to 9-9 and Comparative Examples 9-1 to 9-5

Each of the graft copolymers (A-2-1) to (A-2-10) was used as a graft copolymer (A), the copolymer (B-2) was used as a copolymer (B), whereas the flame retardant (F) and the additives (flame retardant aid, light stabilizer, and ultraviolet absorber) were the same as those used in Examples 8-1 to 8-13. The formulations of the thermoplastic resin compositions used in Examples and Comparative Examples are shown in Table 13. The flame retardance, impact resistance, fluidity, color developing properties, and weather resistance were evaluated as in Examples 8-1 to 8-13.

Production of Copolymer (B-10-1)

A copolymer (B-10-1) composed of 75% styrene and 25% of acrylonitrile and having a weight-average molecular weight of 100000 was prepared by a known emulsion polymerization process.

Production of Copolymer (B-10-2)

A copolymer (B-10-2) composed of 75% styrene and 25% of acrylonitrile and having a weight-average molecular weight of 200000 was prepared by a known emulsion polymerization process.

Production of Copolymer (B-10-3)

A copolymer (B-10-3) composed of 75% styrene and 25% of acrylonitrile and having a weight-average molecular weight of 400000 was prepared by a known emulsion polymerization process.

TABLE 13

| | | Example | | | | | | | | | Comparative Example | | | | |
|---|---|---|---|---|---|---|---|---|---|---|---|---|---|---|---|
| | | 9-1 | 9-2 | 9-3 | 9-4 | 9-5 | 9-6 | 9-7 | 9-8 | 9-9 | 9-1 | 9-2 | 9-3 | 9-4 | 9-5 |
| Graft copolymer (A) | A-2-1 | 16 | 42 | 25 | 25 | 25 | 25 | 25 | | | | | | | 25 |
| | A-2-4 | | | | | | | | 25 | | | | | | |
| | A-2-5 | | | | | | | | | 25 | | | | | |
| | A-2-7 | | | | | | | | | | 42 | | | | |
| | A-2-8 | | | | | | | | | | | 25 | | | |
| | A-2-9 | | | | | | | | | | | | 25 | | |
| | A-2-10 | | | | | | | | | | | | | 25 | |
| Copolymer (B-2) | | 84 | 58 | 75 | 75 | 75 | 75 | 75 | 75 | 75 | 58 | 75 | 75 | 75 | 75 |
| Flame retardant (F) | F-1 | 10 | 10 | | | | | | 10 | | 10 | | | | 0.5 |
| | F-2 | | | 10 | | | | | | 10 | | 10 | | | |
| | F-3 | | | | 25 | | | | | | | | | | |
| | F-4 | | | | | 28 | | | | | | | | 28 | |
| | F-5 | | | | | | 25 | | | | | | | | |
| | F-6 | | | | | | | 23 | | | | | | 23 | |
| Flame retardant aid | | | | | | 5 | | 5 | | | | | 5 | 5 | |
| Light stabilizer | | 0.4 | 0.4 | 0.4 | 0.4 | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 | 0.1 | 0.1 | 0.1 | 0.1 |
| Physical properties | Flame retardance | V-2 | V-2 | V-2 | V-1 | V-0 | V-0 | V-0 | V-2 | V-2 | HB | HB | V-0 | V-0 | HB |
| | Impact resistance | 5 | 17 | 10 | 9 | 8 | 8 | 8 | 11 | 9 | 13 | 6 | 12 | 10 | 10 |
| | Fluidity | 45 | 29 | 47 | 22 | 24 | 20 | 26 | 37 | 46 | 27 | 44 | 33 | 23 | 21 |
| | Color developing property | 12.9 | 7.4 | 9.8 | 7.1 | 5.3 | 5.7 | 5.9 | 9.0 | 9.9 | 7.6 | 10.2 | 6.2 | 3.8 | 9.0 |
| | Weather resistance (color difference) | 3.9 | 4.9 | 4.8 | 9.5 | 7.6 | 11.5 | 18.4 | 4.3 | 4.7 | 4.9 | 4.4 | 16.1 | 24.9 | 4.3 |

As shown in Table 13, the thermoplastic resin compositions (Examples 9-1 to 9-9) of the present invention exhibit not only excellent flame retardance but also excellent weather resistance, impact resistance, fluidity, and color developing properties.

The thermoplastic resin compositions of Comparative Examples 9-1 and 9-2 containing the graft copolymers (A-2-7) and (A-2-8), respectively, containing composite rubber particles having an equivalent-circle diameter of 150 nm or less in an amount exceeding 50% exhibit insufficient flame retardance. The composition of Comparative Example 9-3 containing the graft copolymer (A-2-9) containing a conjugated diene rubber and the composition of Comparative Example 9-4 containing the graft copolymer (A-2-10) containing an acrylic rubber and a conjugated diene rubber exhibit insufficient weather resistance. The composition of Comparative Example 9-5 containing a small amount of a flame retardant exhibits insufficient flame retardance.

Examples 10-1 to 10-8 and Comparative Examples 10-1 to 10-5

Graft Copolymer (A)

Each of the graft copolymers (A-1-1) to (A-1-9) was used as a graft copolymer (A).

Additive

Light stabilizer: "Adeka Stab LA77Y" (trade name, manufactured by ADEKA Corporation)

Ultraviolet absorber: "Sumisorb 200" (trade name, manufactured by manufactured by Sumitomo Chemical Co., Ltd.)

Preparation of Sample

Pellet samples were each produced by mixing a graft copolymer (A), a copolymer (B), and additives (light stabilizer and ultraviolet absorber) at proportions shown in Table 14 and then melting and kneading the mixture with a 40-mm twin-screw extruder at 240° C. The resulting pellet samples were molded into extruded articles with an extruder set at 240° C., and the molded articles were evaluated for physical properties. The results are shown in Table 14. The evaluations were performed as follows.

Tensile Strength and Elongation

The pellet samples prepared in Examples and Comparative Examples were molded into sheets having a thickness of 100 μm with an extruder set at 240° C., and the sheets were each punched out into a dumbbell shape in accordance with JIS Z 1702 as a test piece for evaluation of the tensile strength and elongation. The maximum tensile stress was measured with AG-500C manufactured by Shimadzu Corporation at 23° C., an extension rate of 50 mm/min, and a distance between grips of 80 mm. The tensile strength and elongation were determined by the following expressions. The results are shown in Table 14.

Tensile strength (MPa)=maximum tensile stress (N)/
test piece cross section area (mm²)

Elongation (%)=(distance between grips at break (mm) −initial distance between grips (mm))/
initial distance between grips (mm)×100

Weather Resistance

The pellet samples produced in Examples and Comparative Examples were molded with an injection molding machine (SAV-30-30 manufactured by Sanjo Seiki Co., Ltd., cylinder temperature: 210° C., die temperature: 50° C.) into molded articles (90 mm×55 mm×2.5 mm), which were used for evaluation of weather resistance. The molded articles were subjected to an accelerated weathering test with a Sunshine Super Long Life Weather Meter, WEL-SUN-HCH-B, manufactured by Suga Test Instruments Co., Ltd. at 63° C. under rain for 500 hours. Colors before and after the exposure were measured with a colorimeter, and the color difference (ΔE) was determined.

A: a very slight change in hue, ΔE<3
B: a slight change in hue, 3≤ΔE<5
C: an acceptable change in hue, 5≤ΔE<10
D: an unacceptable change in hue, 10≤ΔE Die Swell Ratio A copolymer (B) was extruded with a capillary rheometer manufactured by Malvern Instruments Ltd. at 200° C., a shear velocity of 100 (1/sec), and an orifice diameter of 2.0 mm. The strand diameter was measured with calipers. The value obtained by dividing the strand diameter by the orifice diameter was used as the die swell ratio of the copolymer (B). When two or more copolymers (B) were used, the copolymers (B) were kneaded at a predetermined weight ratio with a Laboplastomill manufactured by Toyo Seiki Co., Ltd. at 200° C., 30 rpm, for 2 minutes. The resulting composition was similarly subjected to the measurement.

Heat Shrinkage

The pellet samples prepared in Examples and Comparative Examples were molded into sheets (thickness: 100 μm) by extrusion molding, and the sheets were used for evaluation of heat shrinkage. The sheets were each cut out into a 100 mm square. The sheets were arranged in a tray and were left to stand in an oven at 100° C. for 1 hour. The shrinkage in the flow direction was calculated by the following expression.

Heat shrinkage (%)=(size before heating (mm)−size
after heating (mm))/size before heating (mm)

A: a heat shrinkage of less than 0.30
B: a heat shrinkage of 0.30 or more and less than 0.40
C: a heat shrinkage of 0.40 or more and less than 0.50
D: a heat shrinkage of 0.50 or more

TABLE 14

| | | Example | | | | | | | | Comparative Example | | | | |
|---|---|---|---|---|---|---|---|---|---|---|---|---|---|---|
| | | 10-1 | 10-2 | 10-3 | 10-4 | 10-5 | 10-6 | 10-7 | 10-8 | 10-1 | 10-2 | 10-3 | 10-4 | 10-5 |
| Graft copolymer (A) | A-1-1 | 20 | 40 | 40 | 40 | 60 | | | | | | | | |
| | A-1-2 | | | | | | 40 | | | | | | | |
| | A-1-3 | | | | | | | 40 | | | | | | |
| | A-1-4 | | | | | | | | 40 | | | | | |
| | A-1-5 | | | | | | | | | 40 | | | | |
| | A-1-6 | | | | | | | | | | 40 | | | |
| | A-1-7 | | | | | | | | | | | 40 | | |
| | A-1-8 | | | | | | | | | | | | 40 | |
| | A-1-9 | | | | | | | | | | | | | 40 |
| Copolymer (B) | B-10-1 | 56 | 42 | | | 28 | 42 | 42 | 42 | 42 | 42 | 42 | 42 | 42 |
| | B-10-2 | | | 42 | | | | | | | | | | |
| | B-10-3 | 24 | 18 | 18 | 60 | 12 | 18 | 18 | 18 | 18 | 18 | 18 | 18 | 13 |
| Light stabilizer | | 0.4 | 0.4 | 0.4 | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 | 0.1 | 0.1 | 0.1 |
| Die swell ratio of copolymer (B) | | 1.8 | 1.8 | 1.5 | 1.2 | 1.8 | 1.8 | 1.8 | 1.8 | 1.8 | 1.8 | 1.8 | 1.8 | 1.8 |
| Physical properties | Tensile strength | 60 | 49 | 50 | 47 | 41 | 51 | 50 | 49 | 46 | 45 | 41 | 42 | 42 |
| | Elongation (%) | 30 | 33 | 38 | 30 | 37 | 34 | 32 | 33 | 31 | 22 | 24 | 33 | 26 |
| | Weather resistance (color difference) | B | B | B | B | B | B | B | B | C | C | C | D | C |
| | Heat shrinkage | B | B | A | B | B | B | B | B | B | C | C | D | C |

As shown in Table 14, the thermoplastic resin compositions of Examples 10-1 to 10-8 of the present invention exhibit excellent tensile strength, elongation, and weather resistance. In particular, the composition of Example 10-3 containing a copolymer (B) having a die swell ratio of 1.5 exhibits significantly low heat shrinkage of the extruded article, and thus excellent molding workability.

As shown in Table 14, the thermoplastic resin compositions of Comparative Examples 10-1 to 10-3 containing composite rubbers each having a tetrahydrofuran-soluble portion having a weight-average molecular weight and/or a degree of swelling outside the ranges of the present invention exhibit a poor balance between tensile strength, elongation, and weather resistance. The composition of Comparative Example 10-4 containing an ABS resin as the graft copolymer exhibits insufficient weather resistance. The composition of Comparative Example 10-5 not containing a conjugated diene rubber polymer or acrylic ester polymer as the composite rubber exhibits insufficient weather resistance.

Examples 11-1 to 11-7 and Comparative Examples 11-1 to 11-4

Each of the graft copolymers (A-2-1) to (A-2-10) was used as a graft copolymer (A), whereas the copolymers (B-10-1) to (B-10-3) and the additives (light stabilizer and ultraviolet absorber) were the same as those used in Examples 10-1 to 10-8.

Pellet samples were each produced by mixing a graft copolymer (A), a copolymer (B), and additives (light stabilizer and ultraviolet absorber) at proportions shown in Table 15 and then melting and kneading the mixture with a 40-mm twin-screw extruder at 240° C. The resulting pellet samples were each molded into a plate having a thickness of 3 mm and a width of 80 mm with a 40-mm single screw profile extruder at a die temperature of 220° C. The molded articles were evaluated for physical properties. The results are shown in Table 15. The evaluations were performed as follows.

The die swell ratio and weather resistance of the copolymer (B) were evaluated as in Examples 10-1 to 10-8.

Edge Shape

The shapes of both edges of the plate molded by extrusion molding were visually evaluated. The results are shown in Table 15.

A: the edges are accurately formed along the die shape

B: the edges have slight roundness, but are formed along the die shape

Surface Striations (Surface Streakes)

The surface flat portion of the plate formed by extrusion molding was visually evaluated. The results are shown in Table 15.

A: the surface is smooth without substantially no protrusions

B: the surface has striations along the receiving direction (caused by rubber agglomerates) with slight protrusions C: the surface has striations along the receiving direction (caused by rubber agglomerates) with noticeable protrusions (A-2-7) and (A-2-8), respectively, containing composite rubber particles having an equivalent-circle diameter of 150 nm or less in an amount exceeding 50% cause occurrence of striations on the surfaces. The composition of Comparative Example 11-3 containing the graft copolymer (A-2-9) containing a conjugated diene rubber exhibits insufficient weather resistance. The composition of Comparative Example 11-4 containing the graft copolymer (A-2-10) containing an acrylic rubber and a conjugated diene rubber exhibits insufficient weather resistance and shows surface striations caused by thermal agglomeration of the butyl acrylate rubber.

These results demonstrate a correlation between the quality in the edge shape and the die swell ratio. Specifically, a satisfactory edge shape can be provided at a die swell ratio within a range of 1.3 to 1.7. In particular, the formation of exact edge shapes is a great advantage for thermoplastic resin compositions for extrusion molding.

The results also show that occurrence of surface striations correlates to the residence heat stability and that thermal agglomeration is reduced with a decrease in particle diameter. This is assumed that particles having small diameters agglomerate and the agglomerated particles remaining near the surface form the protrusions which are observed as striations. This consideration, however, should not limit the present invention at all.

TABLE 15

|  |  | Example |  |  |  |  |  |  | Comparative Example |  |  |  |
|---|---|---|---|---|---|---|---|---|---|---|---|---|
|  |  | 11-1 | 11-2 | 11-3 | 11-4 | 11-5 | 11-6 | 11-7 | 11-1 | 11-2 | 11-3 | 11-4 |
| Graft copolymer (A) | A-2-1 | 16 | 33 | 50 |  |  | 33 | 33 |  |  |  |  |
|  | A-2-2 |  |  |  |  |  |  |  |  |  |  |  |
|  | A-2-3 |  |  |  |  |  |  |  |  |  |  |  |
|  | A-2-4 |  |  |  | 33 |  |  |  |  |  |  |  |
|  | A-2-6 |  |  |  |  |  | 33 |  |  |  |  |  |
|  | A-2-6 |  |  |  |  |  |  |  |  |  |  |  |
|  | A-2-7 |  |  |  |  |  |  |  | 33 |  |  |  |
|  | A-2-8 |  |  |  |  |  |  |  |  | 33 |  |  |
|  | A-2-9 |  |  |  |  |  |  |  |  |  | 33 |  |
|  | A-2-10 |  |  |  |  |  |  |  |  |  |  | 33 |
| Copolymer (B) | B-10-1 | 59 | 47 | 35 | 47 |  | 47 |  | 47 |  | 47 | 47 |
|  | B-10-2 |  |  |  |  | 47 |  |  |  | 47 |  |  |
|  | B-10-3 | 25 | 20 | 15 | 20 | 20 | 20 | 67 | 20 | 20 | 20 | 20 |
| Light stabilizer |  | 0.4 | 0.4 | 0.4 | 0.4 | 0.4 | 0.4 | 0.4 | 0.4 | 0.4 | 0.4 | 0.4 |
| Ultraviolet absorber |  | 0.1 | 0.1 | 0.1 | 0.1 | 0.1 | 0.1 | 0.1 | 0.1 | 0.1 | 0.1 | 0.1 |
| Die swell ratio of copolymer (B) |  | 1.8 | 1.8 | 1.8 | 1.8 | 1.6 | 1.8 | 1.2 | 1.8 | 1.6 | 1.8 | 1.8 |
| Physical properties | Weather resistance (color difference) | B | B | B | B | B | B | B | B | B | D | C |
|  | Edge shape | B | B | B | B | A | B | B | B | B | B | B |
|  | Surface streaks | A | A | A | A | A | A | A | B | C | A | B |

As shown in Table 15, the thermoplastic resin compositions (Examples 11-1 to 11-7) of the present invention exhibit excellent weather resistance and also exact edge shapes and substantially have no protrusions causing surface striations.

The thermoplastic resin compositions of Comparative Examples 11-1 and 11-2 containing the graft copolymers Examples 12-1 to 12-5 and Comparative Examples 12-1 to 12-4

The graft copolymer (A), the copolymer (B-1), and the additives (light stabilizer and ultraviolet absorber) used in Examples 1-1 to 1-8 and Comparative Examples 1-1 to 1-7 were used.

Pellet samples were each produced as in Examples 1-1 to 1-8 by mixing the graft copolymer (A), the copolymer (B-1), and the additives (light stabilizer and ultraviolet absorber) at proportions shown in Table 16. The pellet samples were used for physical evaluation. The results are shown in Table 16. The evaluations were performed as follows.

Impact Resistance, Fluidity, and Weather Resistance

The impact resistance, fluidity, and weather resistance were evaluated as in Examples 1-1 to 1-8.

Tapping Strength

Each molded article (disc having a diameter of 130 mm and a thickness of 3 mm) including a boss portion having an internal diameter of 3.2 mm, an external diameter of 9.0 mm, and a height of 25 mm at the center was molded with an injection molding machine. JIS type 2 M4×12 mm self-tapping screws and washers having a thickness of 1 mm were inserted into the boss portion of the molded article under an environment of a temperature of −10° C. and were fastened with a torque of 1.5 Nm. Cracking in the boss portion was visually observed and evaluated by the following criteria. The results are shown in Table 16.

A: no fracture or cracking
B: slight cracking
C: noticeable cracking and fracture weather resistance. The composition of Comparative Example 12-7 not containing a conjugated diene rubber polymer or acrylic ester polymer as the composite rubber exhibits insufficient weather resistance.

Examples 13-1 to 13-5 and Comparative Examples 13-1 to 13-4

Each of the graft copolymers (A-2-1) to (A-2-10) was used as a graft copolymer (A), and the copolymer (B-2) was used as a copolymer (B), whereas the additives (light stabilizer and ultraviolet absorber) were the same as those used in Examples 1-1 to 1-8 and Comparative Examples 1-1 to 1-7.

Pellet samples were each produced by mixing the graft copolymer (A), the copolymer (B-2), and the additives (light stabilizer and ultraviolet absorber) at proportions shown in Table 17 and then by the same process as that in Examples 1-1 to 1-8. The pellet samples were used for physical evaluation. The results are shown in Table 17. The evaluations were performed as follows.

Impact Resistance, Fluidity, Weather Resistance, and Tapping Strength

The impact resistance, fluidity, and weather resistance were evaluated as in Examples 1-1 to 1-8, and the tapping strength was evaluated as in Examples 12-1 to 12-5. The results are shown in Table 17.

TABLE 16

|  |  | Example |  |  |  |  | Comparative Example |  |  |  |  |  |  |
|---|---|---|---|---|---|---|---|---|---|---|---|---|---|
|  |  | 12-1 | 12-2 | 12-3 | 12-4 | 12-5 | 12-1 | 12-2 | 12-3 | 12-4 | 12-5 | 12-6 | 12-7 |
| Graft | A-1-1 | 30 | 50 |  |  |  | 10 | 75 |  |  |  |  |  |
| copolymer | A-1-2 |  |  | 30 |  |  |  |  |  |  |  |  |  |
| (A) | A-1-3 |  |  |  | 60 |  |  |  |  |  |  |  |  |
|  | A-1-4 |  |  |  |  | 20 |  |  |  |  |  |  |  |
|  | A-1-5 |  |  |  |  |  |  |  | 30 |  |  |  |  |
|  | A-1-6 |  |  |  |  |  |  |  |  | 30 |  |  |  |
|  | A-1-7 |  |  |  |  |  |  |  |  |  | 30 |  |  |
|  | A-1-8 |  |  |  |  |  |  |  |  |  |  | 30 |  |
|  | A-1-9 |  |  |  |  |  |  |  |  |  |  |  | 30 |
| Copolymer (B-1) |  | 70 | 50 | 70 | 40 | 80 | 90 | 25 | 70 | 70 | 70 | 70 | 70 |
| Light stabilizer |  | 0.4 | 0.4 | 0.4 | 0.4 | 0.4 | 0.4 | 0.4 | 0.4 | 0.4 | 0.4 | 0.4 | 0.4 |
| Ultraviolet absorber |  | 0.1 | 0.1 | 0.1 | 0.1 | 0.1 | 0.1 | 0.1 | 0.1 | 0.1 | 0.1 | 0.1 | 0.1 |
| Physical | Impact resistance | 13 | 21 | 14 | 33 | 8 | 4 | 36 | 8 | 6 | 5 | 32 | 13 |
| properties | Fluidity | 16 | 8 | 18 | 4 | 25 | 35 | 4 | 16 | 16 | 19 | 17 | 18 |
|  | Weather resistance (color difference) | 4.2 | 4.5 | 3.7 | 4.7 | 3.8 | 3.5 | 5.0 | 6.5 | 7.0 | 5.8 | 10.3 | 8.3 |
|  | Tapping strength | A | A | A | A | A | C | A | C | C | C | A | A |

As shown in Table 16, the thermoplastic resin compositions (Examples 12-1 to 12-5) of the present invention exhibit not only excellent impact resistance, fluidity, and weather resistance but also excellent tapping strength.

The thermoplastic resin composition of Comparative Example 12-1 containing a small amount of graft copolymer (A) and a large amount of copolymer (B) exhibits not only insufficient impact resistance but also insufficient tapping strength. The composition of Comparative Example 12-2 containing a large amount of graft copolymer (A) and a small amount of copolymer (B) exhibits insufficient fluidity. The compositions of Comparative Examples 12-3 to 12-5 containing the graft copolymers (A-1-5) to (A-1-7), respectively, each containing a composite rubber having a tetrahydrofuran-soluble portion having a weight-average molecular weight and/or a degree of swelling outside the specified ranges exhibit insufficient tapping strength. The composition of Comparative Example 12-6 containing an ABS resin as the graft copolymer (A) exhibits insufficient Deposition Appearance The pellet samples of Examples and Comparative Examples were each allowed to stay in the cylinder of an injection molding machine set at 260° C. for 0 min (without residence) or for 15 min and was then molded into a plate. The surface of each plate was subjected to deposition treatment. A difference in the degree of clouding of the deposition appearance between the plate staying for 0 min in the injection molding machine and the plate staying for 15 min was judged as follows. The results are shown in Table 17.

A: no substantial difference between the plate staying for 0 min and the plate staying for 15 min in the degree of clouding of the deposition appearance B: a clear difference between the plate staying for 0 min and the plate staying for 15 min in the degree of clouding of the deposition appearance

TABLE 17

|  |  | Example | | | | | Comparative Example | | | | | |
| --- | --- | --- | --- | --- | --- | --- | --- | --- | --- | --- | --- | --- |
|  |  | 13-1 | 13-2 | 13-3 | 13-4 | 13-5 | 13-1 | 13-2 | 13-3 | 13-4 | 13-5 | 13-6 |
| Graft copolymer (A) | A-2-1 | 25 | 41 |  |  |  | 8 | 75 |  |  |  |  |
|  | A-2-2 |  |  |  |  |  |  |  |  |  |  |  |
|  | A-2-3 |  |  |  |  | 50 |  |  |  |  |  |  |
|  | A-2-4 |  |  | 25 |  |  |  |  |  |  |  |  |
|  | A-2-5 |  |  |  | 25 |  |  |  |  |  |  |  |
|  | A-2-6 |  |  |  |  |  |  |  |  |  |  |  |
|  | A-2-7 |  |  |  |  |  |  |  | 25 |  |  |  |
|  | A-2-8 |  |  |  |  |  |  |  |  | 25 |  |  |
|  | A-2-9 |  |  |  |  |  |  |  |  |  | 25 |  |
|  | A-2-10 |  |  |  |  |  |  |  |  |  |  | 25 |
| Copolymer (B-2) |  | 75 | 59 | 75 | 75 | 50 | 92 | 25 | 75 | 75 | 75 | 75 |
| Light stabilizer |  | 0.4 | 0.4 | 0.4 | 0.4 | 0.4 | 0.4 | 0.4 | 0.4 | 0.4 | 0.4 | 0.4 |
| Ultraviolet absorber |  | 0.1 | 0.1 | 0.1 | 0.1 | 0.1 | 0.1 | 0.1 | 0.1 | 0.1 | 0.1 | 0.1 |
| Physical properties | Impact resistance | 10 | 16 | 10 | 9 | 18 | 4 | 35 | 8 | 7 | 21 | 12 |
|  | Fluidity | 20 | 13 | 21 | 19 | 9 | 40 | 2 | 18 | 17 | 16 | 17 |
|  | Weather resistance (color difference) | 4.4 | 4.6 | 4.2 | 4.1 | 5.1 | 4.5 | 5.5 | 4.4 | 4.3 | 10.3 | 8.3 |
|  | Tapping strength | A | A | A | A | A | C | A | B | C | A | A |
|  | Deposition appearance | A | A | A | A | A | A | B | B | B | A | A |

As shown in Table 17, the thermoplastic resin compositions (Examples 13-1 to 13-5) of the present invention exhibit not only excellent impact resistance, fluidity, and weather resistance but also excellent tapping strength and deposition appearance.

The thermoplastic resin composition of Comparative Example 13-1 containing a small amount of graft copolymer (A) and a large amount of copolymer (B) exhibits not only insufficient impact resistance but also insufficient tapping strength. The composition of Comparative Example 13-2 containing a large amount of graft copolymer (A) and a small amount of copolymer (B) exhibits not only insufficient fluidity but also insufficient deposition appearance. The compositions of Comparative Examples 13-3 and 13-4 containing the graft copolymers (A-2-7) and (A-2-8), respectively, containing composite rubber particles having an equivalent-circle diameter of 150 nm or less in an amount exceeding 50% exhibit insufficient tapping strength and deposition appearance. The composition of Comparative Example 13-5 containing the graft copolymer (A-2-9) containing a conjugated diene rubber and the composition of Comparative Example 13-6 containing the graft copolymer (A-2-10) containing an acrylic rubber and a conjugated diene rubber exhibit insufficient weather resistance.

It is believed that a thermoplastic resin composition having excellent tapping strength not only has a high strength but also has appropriate flexibility. For example, the thermoplastic resin composition may be particularly excellent in application to a lamp housing having a portion into which a screw is to be inserted. This consideration, however, should not restrict the present invention.

A thermoplastic resin composition having excellent deposition appearance has a high efficiency of light reflection and is therefore particularly excellent in application to lighting equipment. The excellent deposition appearance may be provided, for example, by that the number of particles having small particle diameters is small or by that the surface has higher uniformity. This consideration, however, should not restrict the present invention.

Examples 14-1 to 14-5 and Comparative Examples 14-1 to 14-7

The styrene-butadiene rubber latex (1) was used as a styrene-butadiene rubber latex having a small particle diameter. The agglomerated rubber polymer (2) was used as an agglomerated styrene-butadiene rubber latex. The composite rubber (a-1-4) was used as a composite rubber latex (a).

The graft copolymer (A-1-4) was used as a graft copolymer (A). The weight-average particle diameter of the composite rubber latex (a-1-4) was calculated using the powder of the graft copolymer (A-1-4) as follows: A pellet sample of the thermoplastic resin composition was prepared by melting and kneading 30 parts of the powder of the graft copolymer (A-1-4) and 70 parts of the powder of the copolymer (B-1). The pellet was cut with a cryomicrotome in a −85° C. atmosphere. The resulting section was stained with ruthenium tetraoxide ($RuO_4$) and was photographed with a transmission electron microscope (JEM-1400, manufactured by JEOL Ltd.). The areas of 1000 composite rubber particles were measured with an image processor (IP-1000PC manufactured by Asahi Kasei Corporation). The equivalent-circle sizes (diameters) were determined, and the weight-average particle diameter of the composite rubber latex (a-1-4) was calculated. The weight-average particle diameter was 420 nm.

The copolymer latex (B-1) was prepared and was then salted-out, dehydrated, and dried into a powdered copolymer (B-1) as a copolymer (B).

Each of the graft copolymers (G-1) to (G-3) of which production processes are described below was used as a graft copolymer (G).

Production of Acrylic Ester Rubber Polymer Latex (g-1)

A nitrogen-purged glass reactor was charged with 150 parts by weight of deionized water, 10 parts by weight of styrene, 10 parts by weight of butyl acrylate, 0.05 parts by weight of allyl methacrylate, 0.3 parts by weight (in terms of solid content) of dipotassium alkenylsuccinate, and 0.2 parts by weight of potassium persulfate, followed by a reaction at 65° C. for 1 hour. Subsequently, a liquid mixture composed of 80 parts by weight of butyl acrylate and 0.45 parts by weight of allyl methacrylate and an aqueous emulsifier solution prepared by dissolving 0.7 parts by weight (in terms of solid content) of dipotassium alkenylsuccinate in 20 parts by weight of deionized water were successively dropwise added to the reaction mixture over 4 hours, followed by polymerization at 65° C. for 3 hours. The polymerization was then stopped to yield an acrylic ester rubber polymer latex (g-1).

Production of Acrylic Ester Rubber Polymer Latex (g-2)

A nitrogen-purged glass reactor was charged with 180 parts by weight of deionized water, 15 parts by weight of butyl acrylate, 0.1 parts by weight of allyl methacrylate, 0.25 parts by weight (in terms of solid content) of dipotassium alkenylsuccinate, and 0.15 parts by weight of potassium persulfate, followed by a reaction at 65° C. for 1 hour. Subsequently, a liquid mixture composed of 85 parts by weight of butyl acrylate and 0.53 parts by weight of allyl methacrylate and an aqueous emulsifier solution prepared by dissolving 0.2 parts by weight (in terms of solid content) of dipotassium alkenylsuccinate in 20 parts by weight of deionized water were successively dropwise added to the reaction mixture over 3 hours. After the dropping, the reaction mixture was retained for 3 hours to yield an acrylic ester rubber polymer latex (g-2).

Production of Graft Copolymers (G-1) to (G-2)

Graft copolymer latexes (G-1) and (G-2) were produced as in graft copolymer (A) except that the acrylic ester rubber polymer latexes (g-1) and (g-2) were respectively used instead of the composite rubber latex (a-1-4) and were then salted-out, dehydrated, and dried into powdered graft copolymers (G-1) and (G-2).

The weight-average particle diameters of the acrylic ester rubber polymer latexes (g-1) and (g-2) were calculated using the powders of the graft copolymers (G-1) and (G-2), respectively, as in the weight-average particle diameter of the composite rubber latex (a-1-4). The weight-average particle diameters of the acrylic ester rubber polymer latexes (g-1) and (g-2) were respectively 130 nm and 150 nm.

Production of Graft Copolymer (G-3)

A glass reactor was charged with 50 parts by weight (in terms of solid content) of an agglomerated styrene-butadiene rubber latex, followed by nitrogen purging. The inner temperature of the nitrogen-purged tank was increased to 65° C., and then an aqueous solution prepared by dissolving 0.2 parts by weight of lactose, 0.1 parts by weight of sodium pyrophosphate dehydrate, and 0.005 parts by weight of ferrous sulfate in 10 parts by weight of deionized water was added to the container, followed by heating to 70° C. Subsequently, a liquid mixture composed of 15 parts by weight of acrylonitrile, 35 parts by weight of styrene, 0.05 parts by weight of tertiary-dodecyl mercaptan, and 0.3 parts by weight of cumene hydroperoxide and an aqueous emulsifier solution prepared by dissolving 1.0 parts by weight of potassium oleate in 20 parts by weight of deionized water were successively dropwise added to the container over 4 hours. After the dropping, the reaction mixture was retained for 3 hours to yield a graft copolymer latex (G-3), which was then salted out, dehydrated, and dried into a powdered graft copolymer (G-3).

Additive

Light stabilizer: Adeka Stab LA77Y manufactured by ADEKA Corporation

Ultraviolet absorber: Sumisorb 200 manufactured by manufactured by Sumitomo Chemical Co., Ltd.

Preparation of Sample

Pellet samples were each produced by mixing a graft copolymer (A), a copolymer (B), a graft copolymer (G), and additives (light stabilizer and ultraviolet absorber) at proportions shown in Table 18 and then melting and kneading the mixture with a 40-mm twin-screw extruder at 240° C. The pellet samples were molded into molded articles with an injection molding machine set at 250° C., and physical properties were evaluated. The results are shown in Table 18. The evaluations were performed as follows.

Impact Resistance, Fluidity, Color Developing Properties, and Weather Resistance The impact resistance, fluidity, color developing properties, and weather resistance were evaluated as in Examples 1-1 to 1-8 and Comparative Examples 1-1 to 1-7. The results are shown in Table 18.

Gloss

The gloss was evaluated using a molded article (60 mm ×60 mm×2 mm) formed from the pellet sample of each of Examples and Comparative Examples with an injection molding machine (J-150EP manufactured by The Japan Steel Works, Ltd., cylinder temperature: 230° C., die temperature: 60° C.) at an injection pressure that allows to exactly fill the mold with the molten resin. The glossiness Gs)(60° was determined by measurement in accordance with JIS-Z8741 using a digital variable gloss meter, UGV-6P, manufactured by Suga Test Instruments Co., Ltd.

TABLE 18

| | | Example | | | | | Comparative Example | | | | | | |
|---|---|---|---|---|---|---|---|---|---|---|---|---|---|
| | | 14-1 | 14-2 | 14-3 | 14-4 | 14-5 | 14-1 | 14-2 | 14-3 | 14-4 | 14-5 | 14-6 | 14-7 |
| Graft copolymer (A-1-4) | | 7.5 | 15 | 25 | 22.5 | 15 | | 4.5 | 25.5 | 30 | 50 | 15 | |
| Copolymer (B-1) | | 70 | 70 | 50 | 70 | 70 | 70 | 70 | 70 | 70 | 50 | 70 | 70 |
| Graft copolymer (G-1) | | 22.5 | 15 | 25 | 7.5 | | 30 | 25.5 | 4.5 | | | | |
| Graft copolymer (G-2) | | | | | | 15 | | | | | | | |
| Graft copolymer (G-3) | | | | | | | | | | | | 15 | 30 |
| Light stabilizer | | 0.4 | 0.4 | 0.4 | 0.4 | 0.4 | 0.4 | 0.4 | 0.4 | 0.4 | 0.4 | 0.4 | 0.4 |
| Ultraviolet absorber | | 0.1 | 0.1 | 0.1 | 0.1 | 0.1 | 0.1 | 0.1 | 0.1 | 0.1 | 0.1 | 0.1 | 0.1 |
| Weight ratio of graft copolymer (A) to graft copolymer (G) | | 25/75 | 50/50 | 50/50 | 75/25 | 50/50 | — | 15/85 | 85/15 | — | — | 50/50 | — |
| Physical properties | Impact resistance | 7 | 11 | 20 | 12 | 11 | 3 | 4 | 11 | 12 | 20 | 18 | 22 |
| | Fluidity | 20 | 19 | 10 | 18 | 19 | 23 | 22 | 18 | 17 | 8 | 17 | 17 |
| | Color developing property | 10.7 | 10.0 | 9.0 | 9.5 | 9.2 | 11.0 | 10.9 | 9.2 | 9.0 | 8.0 | 15.3 | 20.2 |
| | Gloss (%) | 95.6 | 95.3 | 93.6 | 94.4 | 95.2 | 95.6 | 95.6 | 93.1 | 92.5 | 91.0 | 92.6 | 93.0 |
| | Weather resistance | 3.6 | 3.8 | 4.2 | 4.1 | 3.9 | 3.3 | 3.7 | 4.2 | 4.3 | 4.7 | 7.2 | 10.3 |

As shown in Table 18, the thermoplastic resin compositions of Examples 14-1 to 14-5 according to the present invention exhibit excellent weather resistance, impact resistance, fluidity, color developing properties, and gloss.

As shown in Table 18, the thermoplastic resin compositions of Comparative Examples 14-1 to 14-5 containing the graft copolymer (A) or (G) alone or in an amount outside the range of the present invention exhibit insufficient physical properties such as impact resistance and gloss. The composition of Comparative Example 14-6 containing the graft copolymer (A) as a mixture with an ABS resin exhibits insufficient weather resistance. The composition of Comparative Example 14-7 containing an ABS resin alone as the graft copolymer exhibits excellent impact resistance, fluidity, and color developing properties, but insufficient weather resistance and gloss.

INDUSTRIAL APPLICABILITY

The thermoplastic resin composition comprising a graft copolymer according to the first aspect of the present invention has excellent weather resistance, impact resistance, fluidity, and color developing properties and therefore has high versatility for, in particular, exterior parts for vehicles and outdoor products.

The thermoplastic resin composition comprising a graft copolymer according to the second aspect of the present invention has excellent weather resistance, impact resistance, fluidity, and residence heat stability and therefore has high versatility for, in particular, exterior parts for vehicles and outdoor products.

The thermoplastic resin composition comprising a graft copolymer according to the third aspect of the present invention has excellent weather resistance and also excellent impact resistance and color developing properties and therefore has high versatility for, in particular, exterior parts for vehicles and outdoor products.

The thermoplastic resin composition according to the fifth aspect of the present invention has an excellent balance between physical properties, such as impact resistance, fluidity, heat resistance, weather resistance, and light resistance, and also excellent residence heat stability and, surface appearance and therefore has high versatility for, in particular, exterior parts for vehicles and outdoor products.

The thermoplastic resin composition according to the seventh aspect of the present invention has an excellent balance between physical properties, such as impact resistance, fluidity, and heat resistance, and also excellent weather resistance and chemical resistance and therefore has high versatility for, in particular, exterior parts for vehicles and outdoor products.

The flame-retardant thermoplastic resin composition according to the ninth aspect of the present invention has excellent weather resistance, impact resistance, fluidity, and color developing properties and therefore has high versatility for, in particular, exterior parts for vehicles and outdoor products.

The thermoplastic resin composition for extrusion molding according to the eleventh aspect of the present invention has, excellent elongation, weather resistance, and tensile strength and also excellent molding workability and therefore has high versatility for, in particular, exterior parts for vehicles and outdoor products.

The thermoplastic resin composition for a lighting equipment according to the thirteenth aspect of the present invention has excellent impact resistance, fluidity, and weather resistance and also excellent tapping strength and deposition appearance and therefore has high versatility for lighting equipments, in particular, lamp housings for vehicles used at receiving portions for stop lamps or blinkers for example.

The thermoplastic resin composition according to the fifteenth aspect of the present invention has excellent weather resistance, impact resistance, and fluidity and also excellent color developing properties and gloss and therefore has high versatility for, in particular, exterior parts for vehicles and outdoor products.

The sixteenth aspect of the present invention can provide the thermoplastic resin composition of the present invention and therefore has high versatility for, in particular, exterior parts for vehicles and outdoor products.

REFERENCE SIGN LIST

1: outer layer
2: boundary (interface) between outer layer and inner layer
3: conjugated diene rubber polymer particles having weight-average particle diameter of 50 to 300 nm

The invention claimed is:

1. A graft copolymer, wherein
the graft copolymer is a graft copolymer (A) prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 100 parts by weight), wherein
the composite rubber (a1) has a tetrahydrofuran-soluble portion having a weight-average molecular weight of 50000-100000 in terms of polystyrene and has a degree of swelling in toluene of 7.0-13.0.

2. A graft copolymer, wherein
the graft copolymer is a graft copolymer (A) prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 100 parts by weight), wherein
in the composite rubber contained in the graft copolymer, the number of particles having an equivalent-circle diameter of 150 nm or less is 50% or less of the total number of the composite rubber particles.

3. A graft copolymer, wherein
the graft copolymer is a graft copolymer (A) prepared by graft polymerization of 20 to 90 parts by weight of at least one monomer (a2) selected from aromatic vinyl monomers, vinyl cyanide monomers, and other vinyl monomers copolymerizable with these monomers onto 10 to 80 parts by weight of a composite rubber (a1) comprising 5% to 50% by weight of a conjugated diene rubber polymer and 50% to 95% by weight of a cross-linked acrylic ester polymer (provided that the total amount of the composite rubber (a1) and the monomer (a2) is 100 parts by weight), wherein
the composite rubber (a1) has a multilayer structure comprising an inner layer and an outer layer;
the inner layer is mainly composed of the conjugated diene rubber polymer or a mixture of the conjugated diene rubber polymer and the cross-linked acrylic ester polymer and contains two or more particles of the conjugated diene rubber polymer having a weight-average particle diameter of 50 to 300 nm; and the outer layer is mainly composed of the cross-linked acrylic ester polymer and has an average thickness of 5 to 100 nm.

4. The graft copolymer according to claim 1, wherein the conjugated diene rubber polymer has a weight-average particle diameter of 150 to 800 nm by agglomeration of a conjugated diene rubber polymer having a weight-average particle diameter of 50 to 300 nm.

5. A thermoplastic resin composition comprising:
the graft copolymer (A) according to claim 1; and
a copolymer (B) prepared by copolymerization of, at least, an aromatic vinyl monomer and a vinyl cyanide monomer.

6. A thermoplastic resin composition comprising:
10 to 90 parts by weight of the graft copolymer (A) according to claim 1;
0 to 50 parts by weight of a copolymer (B) prepared by copolymerization of, at least, an aromatic vinyl monomer and a vinyl cyanide monomer; and
10 to 90 parts by weight of a polycarbonate resin (C) (provided that the total amount of the graft copolymer (A), the copolymer (B), and the polycarbonate resin (C) is 100 parts by weight).

7. The thermoplastic resin composition according to claim 6, comprising:
15 to 70 parts by weight of the graft copolymer (A),
0 to 40 parts by weight of the copolymer (B), and
30 to 80 parts by weight of the polycarbonate resin (C) (provided that the total amount of the graft copolymer (A), the copolymer (B), and the polycarbonate resin (C) is 100 parts by weight).

8. A molded article produced from the thermoplastic resin composition according to claim 6.

9. The thermoplastic resin composition according to claim 5, further comprising:
a polyamide resin (D); wherein
the copolymer (B) includes an unsaturated carboxylic-modified copolymer (E) prepared by copolymerization of, at least, an unsaturated carboxylic acid monomer, in addition to the aromatic vinyl monomer and the vinyl cyanide monomer, wherein
the amount of the graft copolymer (A) is 20 to 79 parts by weight,
the amount of the copolymer (B) excluding the unsaturated carboxylic-modified copolymer (E) is 0 to 50 parts by weight,
the amount of the unsaturated carboxylic-modified copolymer (E) is 1 to 40 parts by weight, and
the amount of the polyamide resin (D) is 20 to 79 parts by weight,
provided that the total amount of the graft copolymer (A), the copolymer (B), and the polyamide resin (D) is 100 parts by weight.

10. A molded article produced from the thermoplastic resin composition according to claim 9.

11. A flame-retardant thermoplastic resin composition comprising:
100 parts by weight of the thermoplastic resin composition according to claims 5, and
1 to 40 parts by weight of a flame retardant (F).

12. A molded article produced from the flame-retardant thermoplastic resin compostion according to claim 11.

13. A thermoplastic resin composition for extrusion molding comprising:
the thermoplastic resin composition according to claim 5, wherein
the amount of the graft copolymer (A) is 20 to 70 parts by weight, and
the amount of the copolymer (B) is 30 to 80 parts by weight,
provided that the total amount of the graft copolymer (A) and the copolymer (B) is 100 parts by weight.

14. The thermoplastic resin composition for extrusion molding according to claim 13, wherein
the copolymer (B) has a die swell ratio of 1.3 to 1.7 measured at 200° C. and a shear velocity of 100 (1/sec).

15. An extruded article produced by extrusion molding of the thermoplastic resin composition for extrusion molding according to claim 13.

16. A thermoplastic resin composition for a lighting equipment comprising:
the thermoplastic resin composition according to claim 5, wherein
the amount of the graft copolymer (A) is 20 to 70 parts by weight, and
the amount of the copolymer (B) is 30 to 80 parts by weight,
provided that the total amount of the graft copolymer (A) and the copolymer (B) is 100 parts by weight.

17. A molded article produced from the thermoplastic resin composition for lighting equipment according to claim 16.

18. A thermoplastic resin composition comprising:
the graft copolymer (A) according to claim 1; and
a graft copolymer (G) prepared by graft polymerization of 20 to 90 parts by weight of at least one monomer (g2)selected from aromatic vinyl monomers, vinyl cyanide monomers, and other vinyl monomers copolymerizable with these monomers onto 10 to 80 parts by weight of an acrylic ester rubber polymer (g1)having a weight-average particle diameter of 70 to 200 nm (provided that the total amount of the acrylic ester rubber polymer (g1)and the monomer (g2)is 100 parts by weight), wherein
the amount of the graft copolymer (A) is 20 to 80 parts by weight, and
the amount of the graft copolymer (G) is 20 to 80 parts by weight,
provided that the total amount of the graft copolymer (A) and the graft copolymer (G) is 100 parts by weight.

19. The thermoplastic resin composition according to claim 18, wherein the composite rubber of the graft copolymer (A) has a weight-average particle diameter of 200 to 600 nm.

20. The thermoplastic resin composition according to claim 18, further comprising a copolymer (B) of, at least, an aromatic vinyl monomer and a vinyl cyanide monomer.

21. A method for producing the graft copolymer (A) according to claim 1, the method comprising:
retaining a composition containing 0 to 0.15 parts by weight of an emulsifier, 5 to 50 parts by weight of a conjugated diene rubber polymer, and 5 to 33 parts by weight of an acrylic ester monomer for 0.5 to 2.0 hours (provided that the total amount of the conjugated diene rubber polymer and the acrylic ester monomer used for producing the composite rubber (a1)is 100 parts by weight); and
successively adding 0.03 to 0.18 parts by weight of a polymerization initiator, 0.2 to 1.5 parts by weight of an emulsifier, and 17 to 90 parts by weight of an acrylic ester monomer to the retained composition in the range of temperature from 35° C. to 60° C. over 1 to 6 hours (provided that the total amount of the conjugated diene rubber polymer and the acrylic ester monomer used for producing the composite rubber (a1) is 100 parts by weight).

\* \* \* \* \*